(12) United States Patent
Chang et al.

(10) Patent No.: US 10,690,883 B2
(45) Date of Patent: *Jun. 23, 2020

(54) OPTICAL IMAGE CAPTURING SYSTEM

(71) Applicant: ABILITY OPTO-ELECTRONICS TECHNOLOGY CO., LTD., Taichung (TW)

(72) Inventors: Yeong-Ming Chang, Taichung (TW); Hung-Wen Lee, Taichung (TW); Chien-Hsun Lai, Taichung (TW); Yao-Wei Liu, Taichung (TW)

(73) Assignee: ABILITY OPTO-ELECTRONICS TECHNOLOGY CO., LTD., Taichung (TW)

( * ) Notice: Subject to any disclaimer, the term of this patent is extended or adjusted under 35 U.S.C. 154(b) by 91 days.

This patent is subject to a terminal disclaimer.

(21) Appl. No.: 16/036,136

(22) Filed: Jul. 16, 2018

(65) Prior Publication Data

US 2019/0278056 A1    Sep. 12, 2019

(30) Foreign Application Priority Data

Mar. 9, 2018  (TW) .............................. 107108117 A

(51) Int. Cl.
| | |
|---|---|
| *G02B 9/60* | (2006.01) |
| *G02B 13/18* | (2006.01) |
| *G02B 9/62* | (2006.01) |
| *G02B 27/00* | (2006.01) |
| *G02B 7/04* | (2006.01) |

(52) U.S. Cl.
CPC ................. *G02B 9/62* (2013.01); *G02B 7/04* (2013.01); *G02B 27/0037* (2013.01)

(58) Field of Classification Search
CPC ......... G02B 9/62; G02B 7/04; G02B 27/0037
USPC .................................. 359/714, 753, 763–769
See application file for complete search history.

(56) References Cited

U.S. PATENT DOCUMENTS

| | | | |
|---|---|---|---|
| 10,338,345 B2 * | 7/2019 | Lai | ..................... G02B 13/0045 |
| 2016/0091691 A1 | 3/2016 | Son | |

FOREIGN PATENT DOCUMENTS

| | | |
|---|---|---|
| CN | 105044888 A | 11/2015 |
| TW | 201734539 A | 10/2017 |

* cited by examiner

*Primary Examiner* — William Choi
(74) *Attorney, Agent, or Firm* — Muncy, Geissler, Olds & Lowe, P.C.

(57) ABSTRACT

An optical image capturing system includes, along the optical axis in order from an object side to an image side, a first lens, a second lens, a third lens, a fourth lens, and a fifth lens. At least one lens among the first to the fifth lenses has positive refractive power. The fifth lens can have negative refractive power, wherein both surfaces thereof are aspheric, and at least one surface thereof has an inflection point. The lenses in the optical image capturing system which have refractive power include the first to the fifth lenses. The optical image capturing system can increase aperture value and improve the imaging quality for use in compact cameras.

25 Claims, 25 Drawing Sheets

OPTICAL IMAGE CAPTURING SYSTEM

BACKGROUND OF THE INVENTION

1. Technical Field

The present invention relates generally to an optical system, and more particularly to a compact optical image capturing system for an electronic device.

2. Description or Related Art

In recent years, with the rise of portable electronic deuces having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image sensing device, the development of the optical image capturing system towards the field of high pixels. Therefore, the requirement for high imaging quality is rapidly raised.

The conventional optical system of the portable electronic device usually has three or four lenses. However, the optical system is asked to take pictures in a dark environment, in other words, the optical system is asked to have a large aperture. The conventional optical system provides high optical performance as required.

It is an important issue to increase the quantity of light entering the lens. In addition, the modern lens is also asked to have several characters, including high image quality.

BRIEF SUMMARY OF THE INVENTION

The aspect of embodiment of the present disclosure directs to an optical image capturing system and an optical image capturing lens which use combination of refractive powers, convex and concave surfaces of five-piece optical lenses (the convex or concave surface in the disclosure denotes the geometrical shape of an image-side surface or an object-side surface of each lens on an optical axis) to increase the quantity of incoming light of the optical image capturing system, and to improve imaging quality for image formation, so as to be applied to minimized electronic products.

The term and its definition to the lens parameter in the embodiment of the present are shown as below for further reference.

The lens parameter related to a length or a height in the lens:

A height for image formation of the optical image capturing system is denoted by HOI. A height of the optical image capturing system is denoted by HOS. A distance from the object-side surface of the first lens to the image-side surface of the fifth lens is denoted by InTL. A distance from the first lens to the second lens is denoted by IN12 (instance). A central thickness of the first lens of the optical image capturing system on the optical axis is denoted by TP1 (instance).

The lens parameter related to a material in the lens:

An Abbe number of the first lens in the optical image capturing system is denoted by NA1 (instance). A refractive index of the first lens is denoted by Nd1 (instance).

The lens parameter related to a view angle in the lens:

A view angle is denoted by AF. Half of the view angle is denoted by HAF. A major light angle is denoted by MRA.

The lens parameter related to exit/entrance pupil in the lens:

An entrance pupil diameter of the optical image capturing system is denoted by HEP. An exit pupil of the optical image capturing system refers to the image of the aperture stop imaged in the imaging space after passing through the lens behind the aperture stop, and the exit pupil diameter is denoted by HXP. For any surface of any lens, a maximum effective half diameter (EHD) is a perpendicular distance between an optical axis and a crossing point on the surface where the incident light with a max viewing angle of the system passing the very edge of the entrance pupil. For example, the maximum effective half diameter of the object-side surface of the first lens is denoted by EHD11, the maximum effective half diameter of the image-side surface of the first lens is denoted by ERD12, the maximum effective half diameter of the object-side surface of the second lens is denoted by EHD21, the maximum effective half diameter of the image-side surface of the second lens is denoted by EHD22, and so on. In the optical image capturing system, a maximum effective diameter of the image-side surface of the lens closest to the image plane is denoted by PhiA, which satisfies the condition: PhiA=2*EHD. If said surface is aspheric, a cut-off point of the maximum effective diameter is a cut-off point containing the aspheric surface. An ineffective half diameter (IHD) of any surface of one single lens refers to a surface segment between cut-off points of the maximum effective half diameter of the same surface extending in a direction away from the optical axis, wherein said a cut-off point is an end point of the surface having an aspheric coefficient if said surface is aspheric. In the optical image capturing system, a maximum diameter of the image-side surface of the lens closest to the image plane is denoted by PhiB, which satisfies the condition: PhiB=2*(maximum effective half diameter EHD+maximum ineffective half diameter IHD)=PhiA+2*(maximum ineffective half diameter IHD).

In the optical image capturing system, a maximum effective diameter of the image-side surface of the lens closest to the image plane (i.e., the image space) could be also called optical exit pupil, and is denoted by PhiA. If the optical exit pupil is located on the image-side surface of the third lens, then it is denoted by PhiA3; if the optical exit pupil is located on the image-side surface of the fourth lens, then it is denoted by PhiA4; if the optical exit pupil is located on the image-side surface of the fifth lens, then it is denoted by PhiA5; if the optical exit pupil is located on the image-side surface of the sixth lens, then it is denoted by PhiA6. If the optical image capturing system has more lenses with different refractive powers the optical exit pupil of each lens is denoted in this manner. The pupil magnification ratio of an the optical image capturing system is denoted by PMR, which satisfies the condition: PMR=PhiA/HEP.

The lens parameter related to an arc length of the shape of a surface and a surface profile:

For any surface of any lens, a profile curve length of the maximum effective half diameter is, by definition, measured from a start point where the optical axis of the belonging optical image capturing system passes through the surface of the lens, along a surface profile of the lens, and finally to an end point of the maximum effective half diameter thereof. In other words, the curve length between the aforementioned start and end points is the profile curve length of the maximum effective half diameter, which is denoted by ARS. For example, the profile curve length of the maximum effective half diameter of the object-side surface of the first lens is denoted by ARS11, the profile curve length of the maximum effective half diameter of the image-side surface of the first lens is denoted by ARS12, the profile curve length of the maximum effective half diameter of the object-side surface of the second lens is denoted by ARS21, the profile curve length of the maximum effective half diameter of the image-side surface of the second lens is denoted by ARS22, and so on.

For any surface of any lens, a profile curve length of a half of the entrance pupil diameter (HEP) is, by definition, measured from a start point where the optical axis of the belonging optical image capturing system passes through the surface of the lens, along a surface profile of the lens, and finally to a coordinate point of a perpendicular distance where is a half of the entrance pupil diameter away from the optical axis. In other words, the curve length between the aforementioned stat point and the coordinate point is the profile curve length of a half of the entrance pupil diameter (HEP), and is denoted by ARE. For example, the profile curve length of a half of the entrance pupil diameter (HEP) of the object-side surface of the first lens is denoted by ARE11, the profile curve length of a half of the entrance pupil diameter (HEP) of the image-side surface of the first lens is denoted by ARE12, the profile curve length of a half of the entrance pupil diameter (HEP) of the object-side surface of the second lens is denoted by ARE21, the profile curve length of a half of the entrance pupil diameter (HEP) of the image-side surface of the second lens is denoted by ARE22, and so on.

The lens parameter related to a depth of the lens shape:

A displacement from a point on the object-side surface of the fifth lens, which is passed through by the optical axis, to a point on the optical axis, where a projection of the maximum effective semi diameter of the object-side surface of the fifth lens ends, is denoted by InRS51 (the depth of the maximum effective semi diameter). A displacement from a point n the image-side surface of the fifth lens, which is passed through by the optical axis, to a point on the optical axis, where a projection of the maximum effective semi diameter of the image-side surface of the fifth lens ends, is denoted by InRS52 (the depth of the maximum effective semi diameter). The depth of the maximum effective semi diameter (sinkage) on the object-side surface or the image-side surface of any other lens is denoted in the same manner.

The lens parameter related to the lens shape:

A critical point C is a tangent point on a surface of a specific lens, and the tangent point is tangent to a plane perpendicular the optical axis and the tangent point cannot be a crossover point on the optical axis. To follow the past, a distance perpendicular to the optical axis between a critical point C41 on the object-side surface of the fourth lens and the optical axis is HVT41 (instance), and a distance perpendicular to the optical axis between a critical point C42 on the image-side surface of the fourth lens and the optical axis is HVT42 (instance). A distance perpendicular to the optical axis between a critical point C51 on the object-side surface of the fifth lens and the optical axis is HVT51 (instance), and a distance perpendicular to the optical axis between a critical point C52 on the image-side surface of the fifth lens and the optical axis is HVT52 (instance). A distance perpendicular to the optical axis between a critical point on the object-side or image-side surface of other lenses the optical axis is denoted in the same manner.

The object-side surface of the fifth lens has one inflection point IF511 which is nearest to the optical axis, and the sinkage value of the inflection point IF511 is denoted by SGI511 (instance). A distance perpendicular to the optical axis between the inflection point IF511 and the optical axis is HIF511 (instance). The image-side surface of the fifth lens has one inflection point IF521 which is nearest to the optical axis, and the sinkage value of the inflection point IF521 is denoted by SGI521 (instance). A distance perpendicular to the optical axis between the infection point IF521 and the optical axis is HIF521 (instance).

The object-side surface of fifth lens has one inflection point IF512 which is the second nearest to the optical axis, and the sinkage value of the inflection point IF512 is denoted by SGI512 (instance). A distance perpendicular to the optical axis between the inflection point IF512 and the optical axis is HIF512 (instance). The image-side surface of the fifth lens has one inflection point IF522 which is the second mares: to the optical axis, and the sinkage value of the inflection point IF522 is denoted by SGI522 (instance). A distance perpendicular to the optical axis between the inflection point IF522 and the optical axis is HIF522 (instance).

The object-side surface of the fifth lens has one inflection point IF513 which is the third nearest to the optical axis, and the sinkage value of the inflection point IF513 is denoted by SGI513 (instance). A distance perpendicular to the optical axis between the inflection point IF513 and the optical axis is HIF513 (instance). The image-side surface of the fifth lens has one inflection point IF523 which is the third nearest to the optical axis, and the sinkage value of the inflection point IF523 is denoted by SGI523 (instance). A distance perpendicular to the optical axis between the inflection point IF523 and the optical axis is HIF523 (instance).

The object-side surface of the fifth lens has one inflection point IF514 which is the fourth nearest to the optical axis, and the sinkage value of the inflection point IF514 is denoted by SGI514 (instance). A distance perpendicular to the optical axis between the inflection point IF514 and the optical axis is HIF514 (instance). The image-side surface of the fifth lens has one inflection point IF524 which is the fourth nearest to the optical axis, and the sinkage value of the inflection point IF524 is denoted by SGI524 (instance). A distance perpendicular to the optical axis between the inflection point IF524 and the optical axis is HIF524 (instance).

An inflection point, a distance perpendicular to the optical axis between the inflection point and the optical axis, and a sinkage value thereof on the object-side surface or image-side surface of otter lenses is denoted in the same manner.

The lens parameter related to an aberration:

Optical distortion for image formation in the optical image capturing, system is denoted by ODT. TV distortion for image formation in the optical image capturing system is denoted by TDT. Further, the range of the aberration offset for the view of image formation may be limited to 50%-400% field. An offset of the spherical aberration is denoted by DFS. An offset of the coma aberration is denoted by DFC.

A modulation transfer function (MTF) graph of an optical image capturing system is used to test and evaluate the contrast and sharpness of the generated images. The vertical axis of the coordinate system of the MTF graph represents the contrast transfer rate, of which the value is between 0 and 1, and the horizontal axis of the coordinate system represents the spatial frequency, of which the unit is cycles/mm or lp/mm, i.e., line pairs per millimeter. Theoretically, a perfect optical image capturing system can present all detailed contrast and every line of an object in an image. However, the contrast transfer rate of a practical optical image capturing system along a vertical axis thereof would be less than 1. In addition, peripheral areas in an image would have poorer realistic effect than a center area thereof has. For visible spectrum, the values of MTF in the spatial frequency of 55 cycles/mm at the optical axis, 0.3 field of view, and 0.7 field of view on an image plane are respectively denoted by MTFE0, MTFE3, and MTFE7; the values of MTF in the spatial frequency of 110 cycles/mm at the optical axis, 0.3 field of view, and 0.7 field of view on an image plane are respectively denoted by MTFQ0, MTFQ3, and MTFQ7; the values of MTF in the spatial frequency of 220 cycles/mm at the optical axis, 0.3 field of view, and 0.7 field of view on an image plane are respectively denoted by MTFH0, MTFH3, and MTFH7; the values of MTF in the spatial frequency of 440 cycles/mm at the optical axis, 0.3 field of view, and 0.7 field of view on the image plane are respectively denoted by MTF0, MTF3, and MTF7. The three aforementioned fields of view respectively represent the center, the inner field of view, and the outer field of view of a lens, and, therefore, can be used to evaluate the performance of an optical image capturing system. If the optical image capturing system provided in the present invention corresponds to photosensitive components which provide pixels having a size no large than 1.12 micrometer, a quarter of the spatial frequency, a half of the spatial frequency (half frequency), and the full spatial frequency (full frequency) of the MTF diagram are respectively at least 110 cycles/mm, 220 cycles/mm and 440 cycles/mm.

If an optical image capturing system is required to be able also to image for infrared spectrum, e.g., to be used in low-light environments, then the optical image capturing system should be workable in wavelengths of 850 nm or 800 nm. Since the main function for an optical image capturing system used in low-light environment is to distinguish the shape of objects by light and shade, which does not require high resolution, it is appropriate to only use spatial frequency less than 110 cycles/mm for evaluating the performance of optical image capturing system in the infrared spectrum. When the aforementioned wavelength of 850 nm focuses on the image plane, the contrast transfer rates (i.e., the values of MTF) in spatial frequency of 55 cycles/mm at the optical axis, 0.3 field of view, and 0.7 field of view on an image plane are respectively denoted by MTF10, MTF13, and MTF17. However, infrared wavelengths of 1850 nm or 800 nm are far away from the wavelengths of visible light; it would be difficult to design an optical image capturing system capable of focusing visible and infrared light (i.e., dual-mode) at the same time and achieving certain performance.

The present invention provides an optical image capturing system, in which the fifth lens is provided with an inflection point at the object-side surface or at the image-side surface to adjust the incident angle of each view field and modify the ODT and the TDT. In addition, the surfaces of the fifth lens are capable of modifying the optical path to improve the imagining quality.

The optical image capturing system of the present invention includes a first lens, a second lens, a third lens, a fourth lens, a fifth lens, and an image plane in order along an optical axis from an object side to an image side. At least one surface of each of at least two lenses among the first lens to the fifth lens has at least one inflection point thereon. At least one lens among the first lens to the fifth lens has positive refractive power. The optical image capturing system satisfies:

$$1.0 \leq f/HEP \leq 10;\ 0.5 \leq HOS/f \leq 30;\ 0 < PhiA5/InTL \leq 1.6;$$
$$\text{and } 0.5 \leq SETP/STP < 1;$$

where f is a focal length of the optical image capturing system; HEP is an entrance pupil diameter of the optical image capturing system; HOS is a distance in parallel with the optical axis between an object-side surface, which face the object side, of the first lens and the image plane; InTL is a distance from the object-side surface of the first lens to the image-side surface of the fifth lens on the optical axis; PhiA5 is a maximum effective diameter of the image-side surface of the fifth lens; HOI is a maximum height for image formation perpendicular to the optical axis on the image plane; ETP1, ETP2, ETP3, ETP4, and ETP5 are respectively a thickness in parallel with the optical axis at a height of ½ HEP of the first lens to the fifth lens, wherein SETP is a sum of the aforementioned ETP1 to ETP5; TP1, TP2, TP3, TP4, and TP5 are respectively a thickness at the optical axis of the first lens to the fifth lens, wherein STP is a sum of the aforementioned TP1 to TP5.

The present invention further provides an optical image capturing system, including, in order along an optical axis from an object side to an image side, a first lens, a second lens, a third lens, a fourth lens, a fifth lens, an image plane, and a first lens positioning member. The first lens positioning member includes a lens bolder, which is hollow and opaque. The lens holder has a barrel portion and a base portion which are connected to each other, wherein the barrel portion is adapted to receive the first to the fifth lenses, and the base portion is located between the fifth lens and the image plane. An outer peripheral edge of the base portion is greater than an outer peripheral edge of the barrel portion. A maximum length of a shortest edge of a plane of the base portion perpendicular to the optical axis is denoted by PhiD. The optical image capturing system satisfies:

$$1.0 \leq f/HEP \leq 10;\ 0.5 \leq HOS/f \leq 30;\ 0\text{ mm} < PhiD \leq 16\text{ mm};$$
$$\text{and } 0.2 \leq EIN/ETL < 1;$$

where f is a focal length of the optical image capturing system; HEP is an entrance pupil diameter of the optical image capturing system; HOS is a distance between an object-side surface, which face the object side, of the first lens and the image plane on the optical axis; InTL is a distance from the object-side surface of the first lens to the image-side surface of the fifth lens on the optical axis; HOI is a maximum height for image formation perpendicular to the optical axis on the image plane; PhiA5 is a maximum effective diameter of the image-side surface of the fifth lens; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the fifth lens.

The present invention further provides an optical image capturing system, including, in order along an optical axis from an object side to an image side, a first lens, a second lens, a third lens, a fourth lens, a fifth lens, an image plane, a first lens positioning member, and a second lens positioning member. The first lens positioning member includes a lens holder, which is hollow and opaque. The lens holder has a barrel portion and a base portion which are connected to each other, wherein the barrel portion is adapted to receive the first to the fifth lenses, and the base portion is located between the filth lens and the image plane. An outer peripheral edge of the base portion is greater than an outer peripheral edge of the barrel portion. A maximum length of a shortest edge of a plane of the base portion perpendicular to the optical axis is denoted by PhiD. The second lens positioning member is provided in the lens holder, and includes a positioning portion and a connecting portion, wherein the positioning portion is hollow, and is adapted to directly contact with any one of the lenses to accommodate it, so that the lenses are arranged along the optical axis. The connecting portion is provided at the outside of the positioning portion, wherein the connections portion directly contacts with an inner peripheral edge of the barrel portion. A maximum outer diameter of the connecting portion on the plane perpendicular to the optical axis is denoted by PhiC. The optical image capturing system consists of the five lenses having refractive power. At least one surface of at least one lens among the first lens to the fifth lens has at least an inflection point thereon. The optical image capturing system satisfies:

$1.0 \leq f/HEP \leq 10$; $0.5 \leq HOS/f \leq 30$; $0 < PhiA5/InTL \leq 1.6$; and $PhiC < PhiD$; $0 \text{ mm} < PhiD \leq 16 \text{ mm}$; and $0.2 \leq EIN/ETL < 1$;

where f is a focal length of the optical image capturing system; HEP is an entrance pupil diameter of the optical image capturing system; HOS is a distance between tan object-side surface, which face the object side, of the first lens and the image plane on the optical axis; InTL is a distance from the object-side surface of the first lens to the image-side surface of the fifth lens on the optical axis; HOI is a maximum height for image formation perpendicular to the optical axis on the image plane; PhiA5 is a maximum effective diameter of the image-side surface of the fifth lens; ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the fifth lens.

For any lens, the thickness at the height of a half of the entrance pupil diameter (HEP) particularly affects the ability of correcting aberration and differences between optical paths of light in different fields of view of the common region of each field of view of light within the covered range at the height of a half of the entrance pupil diameter (HEP). With greater thickness, the ability to correct aberration is better. However, the difficulty of manufacturing increases as well. Therefore, the thickness at the height of a half of the entrance pupil diameter (HEP) of any lens has to be controlled. The ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness at the height of a half of the entrance pupil diameter (HEP) of the second lens is denoted by ETP2, and the thickness at the height of a half of the entrance pupil diameter (HEP) of any other lens in the optical image capturing system is denoted in the same manner. The optical image capturing system of the present invention satisfies:

$0.3 \leq SETP/EIN < 1$;

where SETP is the sum of the aforementioned ETP1 to ETP5.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) has to be particularly controlled. For example, the thickness at the height of a half of the entrance pupil diameter (HEP) of the first lens is denoted by ETP1, the thickness of the first lens on the optical axis is TP1, and the ratio between these two parameters is ETP1/TP1; the thickness at the height of a half of the entrance pupil diameter (HEP) of the first lens is denoted by ETP2, the thickness of the second lens on the optical axis is TP2, and the ratio between these two parameters is ETP2/TP2. The ratio between the thickness at the height of a half of the entrance pupil diameter (HEP) and the thickness of any other lens in the optical image capturing system is denoted in the same manner. The optical image capturing system of the present invention satisfies:

$0.2 \leq ETP/TP \leq 3$.

The horizontal distance between t two neighboring lenses at the height of a half of the entrance pupil diameter (HEP) is denoted by ED, wherein the aforementioned horizontal distance (ED) is parallel to the optical axis of the optical image capturing system, and particularly affects the ability of correcting aberration and differences between optical paths of light in different fields of view of the common region of each field of view of light at the height of a half of the entrance pupil diameter (HEP). With longer distance, the ability to correct aberration is potential to be better. However, the difficulty of manufacturing increases, and the feasibility of "slightly shorten" the length of the optical image capturing system is limited as well. Therefore, the horizontal distance (ED) between two specific neighboring lenses at the height of a half of the entrance pupil diameter (HEP) has to be controlled.

In order to enhance the ability of correcting aberration and to lower the difficulty of "slightly shorten" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) has to be particularly controlled. For example, the horizontal distance between the first lens and the second lens at the height of a half of the entrance pupil diameter (HEP) is denoted by ED12, the horizontal distance between the first lens and the second lens on the optical axis is denoted by IN12, and the ratio between these two parameters is ED12/IN12; the horizontal distance between the second lens and the third lens at the height of a half of the entrance pupil diameter (HEP) is denoted by ED23, the horizontal distance between the second lens and the third lens on the optical axis is denoted by IN23, and the ratio between these two parameters is ED23/IN23. The ratio between the horizontal distance between any two neighboring lenses at the height of a half of the entrance pupil diameter (HEP) and the horizontal distance between these two neighboring lenses on the optical axis is denoted in the same manner.

The horizontal distance in parallel with the optical axis between a coordinate point at the height of ½ HEP on the image-side surface of the fifth lens and image surface is denoted by EBL. The horizontal distance in parallel with the optical axis between the point on the image-side surface of the fifth lens where the optical axis passes through and the image plane is denoted by BL. In order to enhance the ability to correct aberration and to preserve more space for other optical components, the optical image capturing system of the present invention can satisfy: $0.25 \leq EBL/BL \leq 1$. The optical image capturing system can further include a filtering component, which is provided between the fifth lens and the image plane, wherein the horizontal distance in parallel with the optical axis between the coordinate point at the height of ½ HEP on the image-side surface of the fifth lens and the filtering component is denoted by EIR, and the horizontal distance in parallel with the optical axis between the point on the image-side surface of the fifth lens where the optical axis passes through and the filtering component is denoted by PIR. The optical image capturing system of the present invention can satisfy: 0.1≤EIR/PIR≤1.

In an embodiment, a height of the optical image capturing system (HOS) can be reduced while |f1|>f5.

In an embodiment, when the lenses satisfy f2|+|f3|+|f5|, at least one lens among the second to the fourth lenses could have weak positive refractive power or weak negative refractive power. Herein the weak refractive power means the absolute value of the focal length of one specific lens is greater than 10. When at least one lens among the second to the fourth lenses has weak positive refractive power, it may share the positive refractive power of the first lens, and on the contrary, when at least one lens among the second to the fourth lenses has weak negative refractive power, it may fine tune and correct the aberration of the system.

In an embodiment, the fifth lens could have negative refractive power, and an image-side surface thereof is concave, it may reduce hack fiscal length and size. Besides, the fifth lens can have at least an inflection point on at least a surface thereof, which may reduce an incident angle of the light of an off-axis field of view and correct the aberration of the off-axis field of view.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
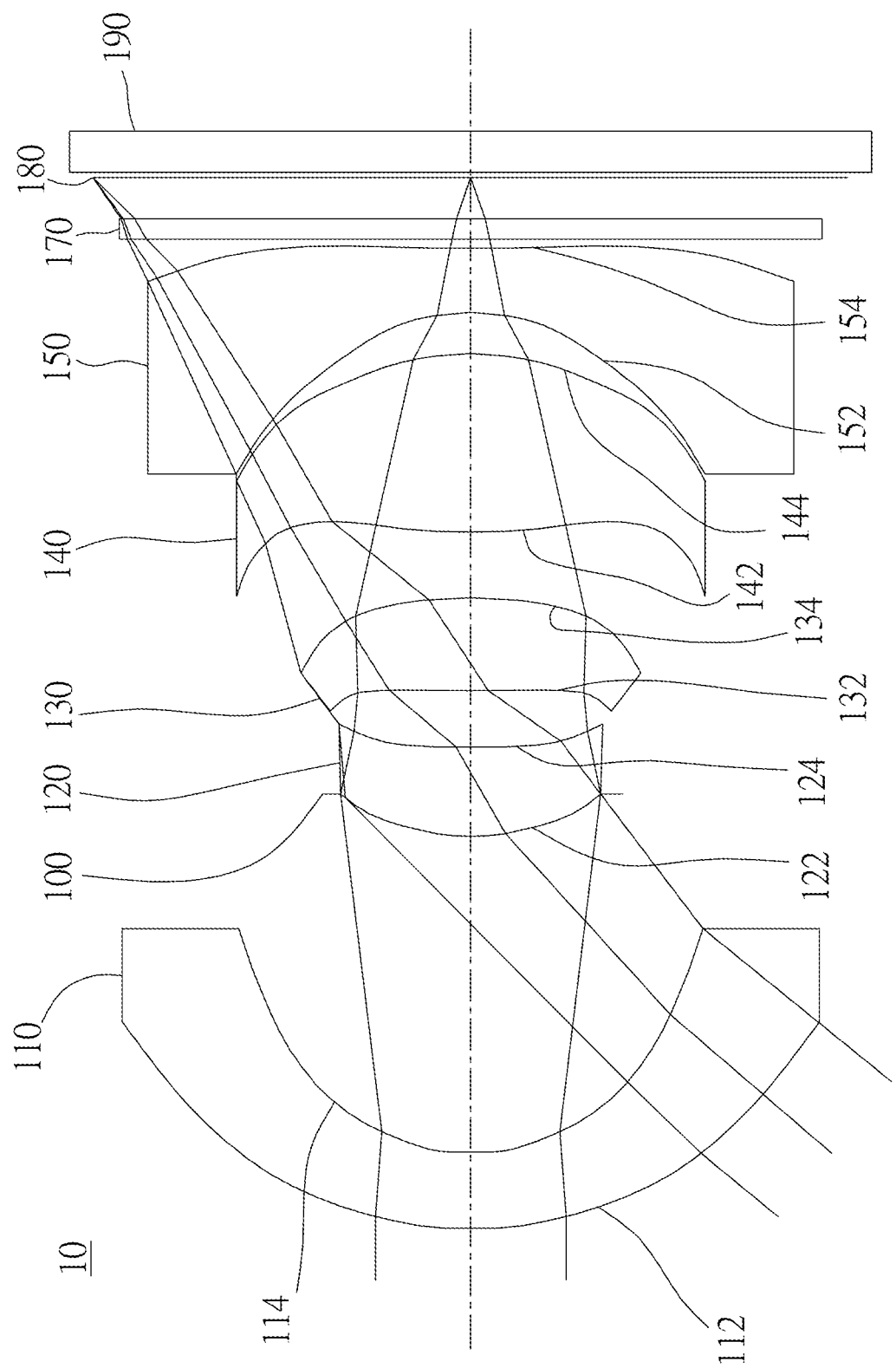
FIG. 1A is a schematic diagram of a first embodiment of the present invention.

An optical image capturing system of the present invention includes a first lens, a second lens, a third lens, a fourth lens, a fifth lens, and an image plane from an object side to an image side. The optical image capturing system further is provided with an image sensor at an image plane.

The optical image capturing system can work in three wavelengths, including 486.1 nm, 587.5 nm and 656.2 nm, wherein 587.5 nm is the main reference wavelength and is the reference wavelength for obtaining the technical characters. The optical image capturing system can also work in five wavelengths, including 480 nm, 510 nm, 555 nm, 610 nm, and 650 nm wherein 555 nm is the main reference wavelength, and is the reference wavelength for obtaining the technical characters.

The optical image capturing, system of the present invention satisfies $0.5 \leq \Sigma PPR/|\Sigma NPR| \leq 3.0$, and a preferable range is $1 \leq \Sigma PPR/|\Sigma NPR| \leq 2.5$, where PPR is a ratio of the focal length f of the optical image capturing system to a focal length fp of each of lenses with positive refractive power; NPR is a ratio of the focal length f of the optical image capturing system to a focal length fn of each of lenses with negative refractive power; $\Sigma PPR$ is a sum of the PPRs of each positive lens; and $\Sigma NPR$ is a sum of the NPRs of each negative lens. It is helpful for control of an entire refractive power and an entire length of the optical image capturing system.

The image sensor is provided on the image plane. The optical image capturing system of the present invention satisfies $HOS/HOI \leq 25$ and $0.5 \leq HOS/f \leq 25$, and a preferable range is $1 \leq HOS/HOI \leq 20$ and $1 \leq HOS/f \leq 20$, where HOI is a half of a diagonal of an effective sensing area of the image sensor, i.e., the maximum image height, and HOS is a height of the optical image capturing system, i.e. a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture, wherein the front aperture is provided between the object and the first lens, and the middle is provided between the first lens and the image plane. The front aperture provides a long distance between an exit pupil of the system and the image plane, which allows more elements to be installed. The middle could enlarge a view angle of view of the system and increase the efficiency of the image sensor. The optical image capturing, system satisfies $0.2 \leq InS/HOS \leq 1.1$, where InS is a distance between the aperture and the image plane. It is helpful for size reduction and wide angle.

The optical image capturing system of the present invention satisfies $0.1 \leq \Sigma TP/InTP \leq 0.9$, where InTL is a distance between the object-side surface of the first lens and the image-side surface of the fifth lens, and $\Sigma TP$ is a sum of central thicknesses of the lenses on the optical axis. It is helpful for the contrast of image and yield rate of manufacture and provides a suitable back focal length for installation of other elements.

The optical image capturing system of the present invention satisfies $0.01<|R1/R2|<100$, and a preferable range is $0.05<|R1/R2|<80$, where R is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies $-50<(R9-R10)/(R9+R10)<50$, where R9 is a radius of curvature of the object-side surface of the fifth lens and R10 is a radius of curvature of the image-side surface of the fifth lens. It may modify the astigmatic field curvature.

The optical image capturing system of the present invention satisfies $IN12/f \leq 5.0$, where IN12 is a distance on the optical axis between the first lens and the second lens. It may correct chromatic aberration and improve the performance.

The optical image capturing system of the present invention satisfies $IN45/f \leq 5.0$, where IN45 is a distance on the optical axis between the fourth lens and the fifth lens. It may correct chromatic aberration and improve the performance.

The optical image capturing system of the present invention satisfies $0.1 \leq (TP1+IN12)/TP2 \leq 50.0$, where TP1 is a central thickness of the first lens on the optical axis, and TP2 is a central thickness of the second lens on the optical axis. It may control the sensitivity of manufacture of the system and improve the performance.

The optical image capturing system of the present invention satisfies $0.1 \leq (TP5+IN45)/TP4 \leq 50.0$, where TP4 is a central thickness of the fourth lens on the optical axis, TP5 is a central thickness of the fifth lens on the optical axis, and IN45 is a distance between the fourth lens and the fifth lens, it may control the sensitivity of manufacture of the system and improve the performance.

The optical image capturing system of the present invention satisfies $0.1 \leq TP3/(IN23+TP3+IN34) < 1$, where TP2 is a central thickness of the second lens on the optical axis, TP3 is a central thickness of the third lens on the optical axis, TP4 is a central thickness of the fourth lens on the optical axis, IN23 is a distance on the optical axis between the second lens and the third lens, IN34 is a distance on the optical axis between the third lens and the fourth lens, and InTL is a distance between the object-side surface of the first lens and the image-side surface of the fifth lens. It may fine tune and correct the aberration of the incident rays layer by layer, and reduce the height of the system.

The optical image capturing system satisfies $0 \text{ mm} \leq HVT51 \leq 3 \text{ mm}$; $0 \text{ mm} < HVT52 \leq 6 \text{ mm}$; $0 \leq HVT51/HVT52$; $0 \text{ mm} \leq |SGC51| \leq 0.5 \text{ mm}$; $0 \text{ mm} < |SGC52| \leq 2 \text{ mm}$; and $0 < |SGC52|/(SGC52|+TP5) \leq 0.9$, where HVT51 a distance perpendicular to the optical axis between the critical point C51 on the object-side surface of the fifth lens and the optical axis; HVT52 a distance perpendicular to the optical axis between the critical point C52 on the image-side surface of the fifth lens and the optical axis; SGC51 is a distance in parallel with the optical axis between an point on the object-side surface of the fifth lens where the optical axis passes through and the critical point C51; SGC52 is a distance in parallel with the optical axis between an point on the image-side surface of the fifth lens where the optical axis passes through and the critical point C52. It is helpful to correct the off-axis view field aberration.

The optical image capturing system satisfies $0.2 \leq HVT521/HOI \leq 0.9$, and preferably satisfies $0.3 \leq HVT52/HOI \leq 0.8$. It may help to correct the peripheral aberration.

The optical image capturing system satisfies $0 \leq HVT52/HOS \leq 0.5$, and preferably satisfies $0.2 \leq HVT52/HOS \leq 0.45$. It may help to correct the peripheral aberration.

The optical image capturing system of the present invention satisfies $0<SGI511/(SGI511+TP5) \leq 0.9$; $0<SGI521/(SGI521+TP5) \leq 0.9$, and it is preferable to satisfy $0.1 \leq SGI511/(SCI511+TP5) \leq 0.6$; $0.1 \leq SGI521/(SGI521+TP5) \leq 0.6$, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

The optical image capturing system of the present invention satisfies 0<SGI512/(SGI512+TP5)≤0.9; 0<SGI522/(SGI522+TP5)≤0.9, and it is preferable to satisfy 0.1≤SGI512/(SGI512+TP5)≤0.6; 0.1≤SGI522/(SGI522+TP5)≤0.6, where SGI512 is a displacement in parallel with the optical axis, from a point on the object-side surface of the fifth lens, through which the optical axis passes, to the inflection point on the object-side surface, which is the second closest to the optical axis, and SGI522 is a displacement in parallel with the optical axis, from a point on the in age-side surface of the fifth lens, through which the optical axis passes, to the inflection point on the image-side surface, which is the second closest to the optical axis.

The optical image capturing system, of the present invention satisfies 0.001 mm≤|HIF511|≤5 mm; 0.001 mm≤|HIF521|≤5 mm, and it is preferable to satisfy 0.1 mm≤|HIF511|≤3.5 mm; 1.5 mm≤|HIF521|≤3.5 mm, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

The optical image capturing system of the present invention satisfies 0.001 mm≤|HIF512|≤5 mm; 0.001 mm≤|HIF522|≤5 mm; and it is preferable to satisfy 0.1 mm≤|HIF522|≤3.5 mm; 0.1 mm≤|HIF512|≤3.5 mm, where HIF512 is a distance perpendicular to the optical axis between the infection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

The optical image capturing system of the present invention satisfies 0.001 mm≤|HIF513|≤5 mm; 0.001 mm≤|HIF523|≤5 mm, and it is preferable to satisfy 0.1 mm≤|HIF523|≤3.5 mm; 0.1 mm≤|HIF513|≤3.5 mm, where HIF513 is a distance perpendicular to the optical axis between the inflection point on the object-side surface of the fifth lens, which is the third closest to the optical axis, and the optical axis; HIF523 is a distance perpendicular to the optical axis between the inflection point on the image-side surface of the fifth lens, which is the third closest to the optical axis, and the optical axis.

The optical image capturing system of the present invention satisfies 0.001 mm≤|HIF514|≤5 mm; 0.001 mm≤|HIF524|≤5 mm, and it is preferable to satisfy 0.1 mm≤|HIF524|≤3.5 mm; 0.1 mm≤|HIF514|≤3.5 mm, where HIF514 is a distance perpendicular to the optical axis between the inflection point on the object-side surface of the fifth lens, which is the fourth closest to the optical axis, and the optical axis; HIF524 is a distance perpendicular to the optical axis between the inflection point on the image-side surface of the fifth lens, which is the fourth closest to the optical axis, and the optical axis.

In an embodiment, the lenses of high Abbe number and the lenses of low Abbe number are arranged in an interlaced arrangement that could be helpful for correction of aberration of the system.

An equation of aspheric surface is $$z = ch^2/[1+[1(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \ldots \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the fifth lenses could be aspheric that can obtain more control parameters to reduce aberration. The number of aspheric glass lenses could be less than the conventional spherical glass lenses, which is helpful for reduction of the height of the system.

When the lens has a convex surface which means that the surface is convex around a position, through which the optical axis passes, and when the lens has a concave surface, which means that the surface is concave around a position, through which the optical axis passes.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

To meet different requirements, at least one lens among the first lens to the fifth lens of the optical image capturing system of the present invention can be a light filter, which filters out light of wavelength shorter than 500 nm. Such effect can be achieved by coating on at least one surface of the lens, or by using materials capable of filtering out short waves to make the lens.

To meet different requirements, the image plane of the optical image capturing system in the present invention can be either flat or curved. If the image plane is curved (e.g., a sphere with a radius of curvature), the incidence angle required for focusing light on the image plane can be decreased, which is not only helpful to shorten the length of the system (TTL), but also helpful to increase the relative illuminance.

We provide several embodiments in conjunction with the accompanying drawings for the best understanding, which are:

First Embodiment

Figure 1B:
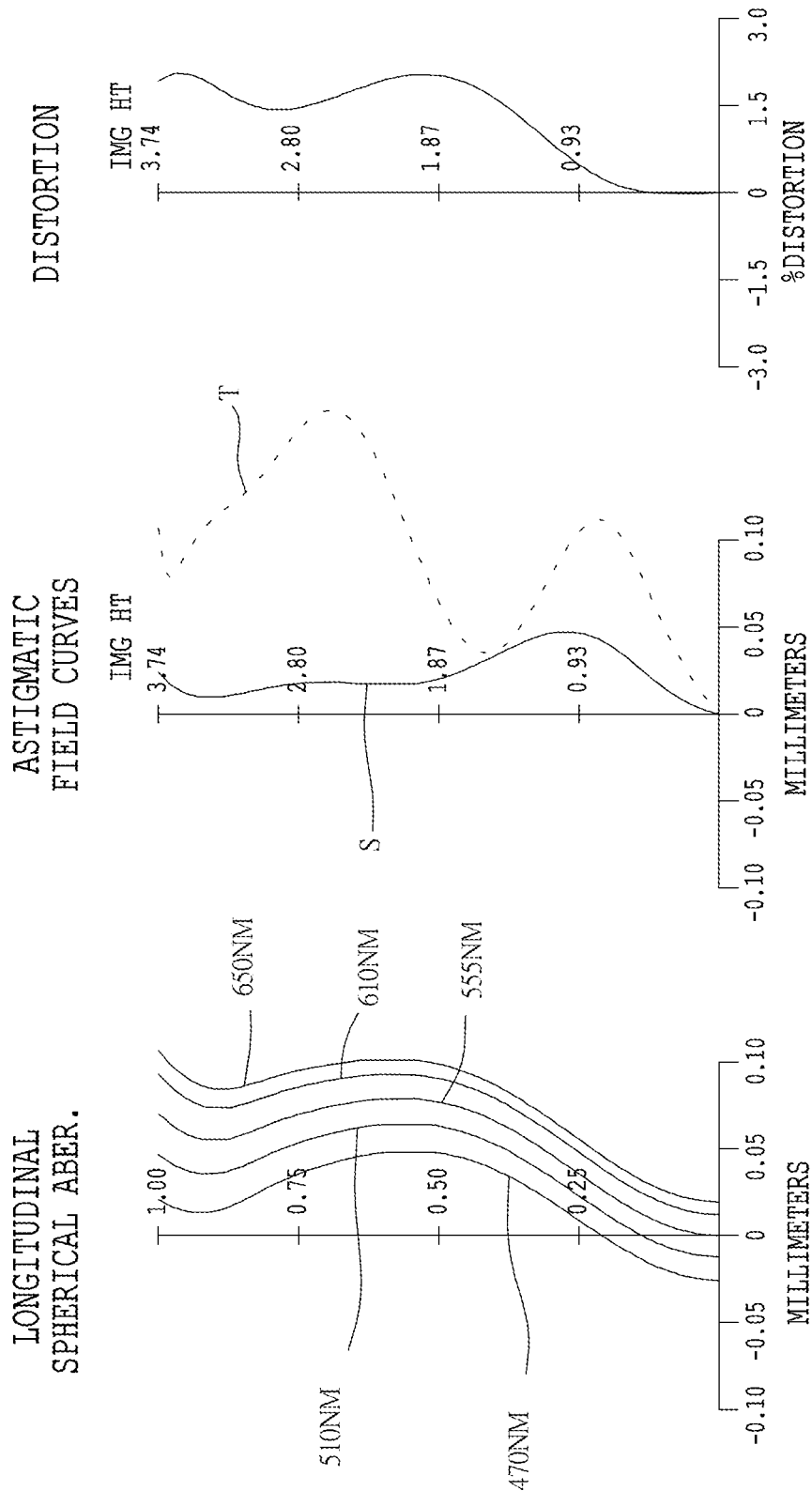
FIG. 1B shows curve diagrams of longitudinal spherical aberration, astigmatic field, and optical distortion of the optical image capturing system in the order from left to right of the first embodiment of the present application.
Figure 1C:
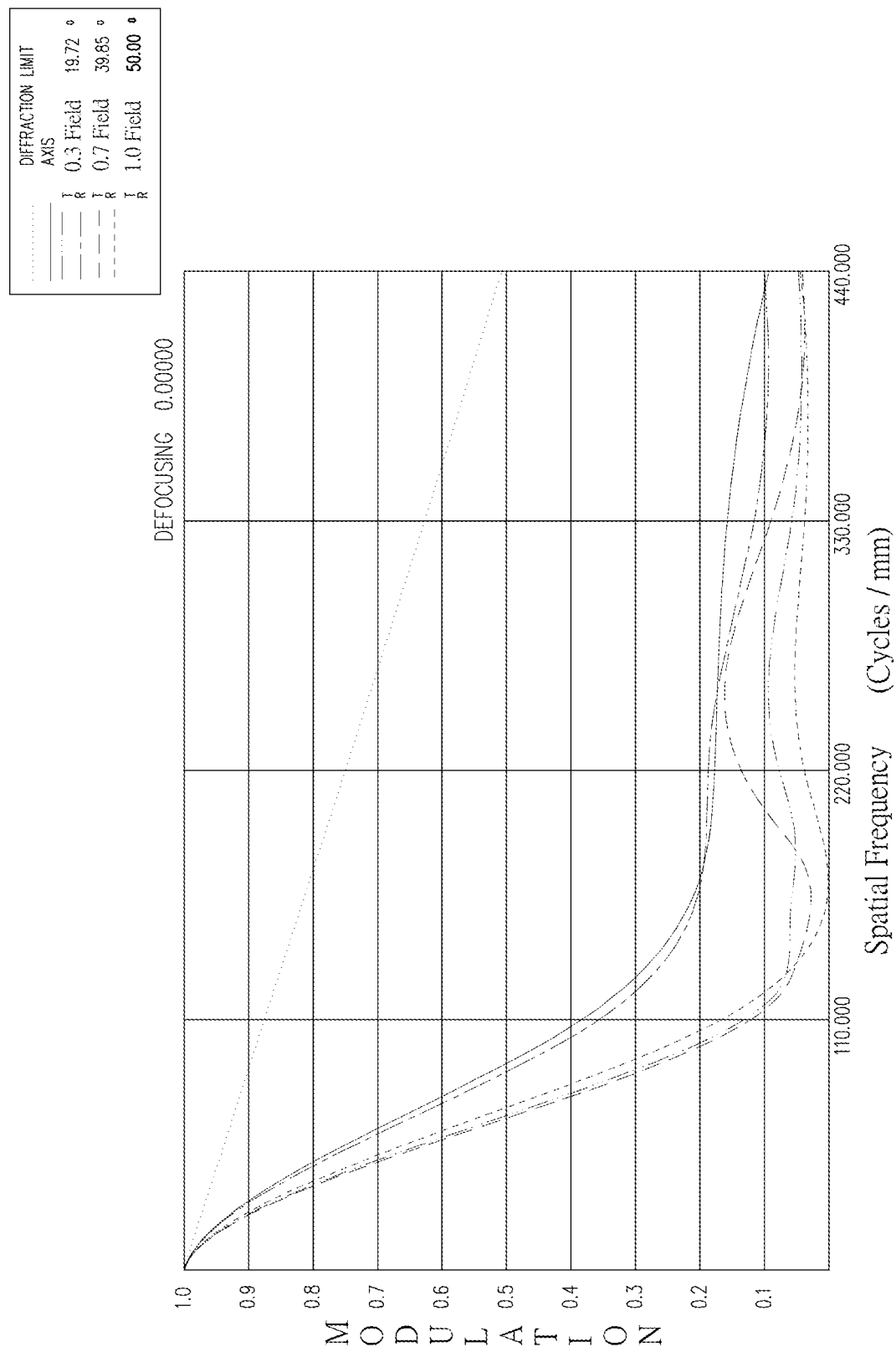
FIG. 1C shows a feature map of modulation transformation of the optical image capturing system of the first embodiment of the present application in visible spectrum.
Figure 1D:
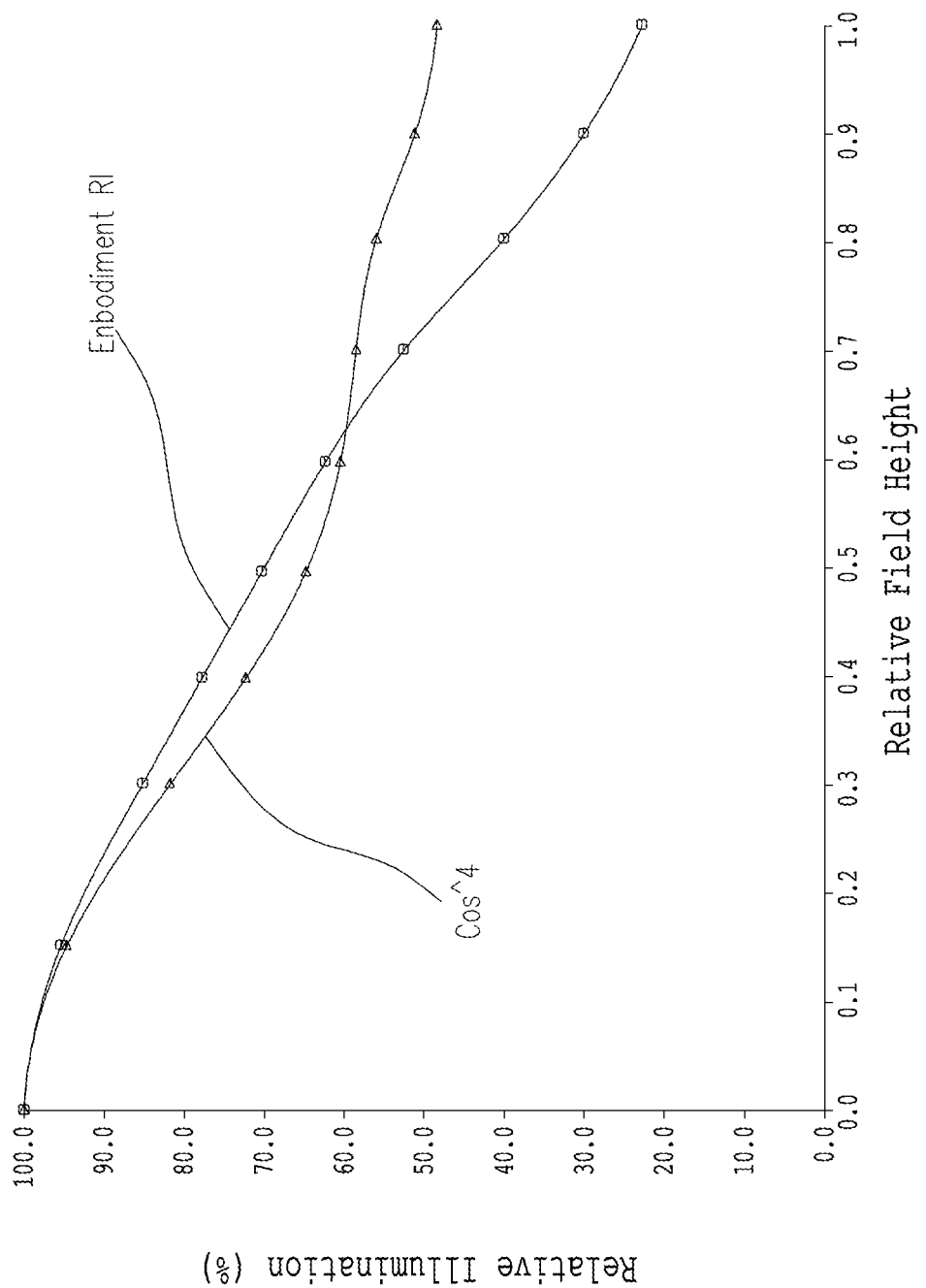
FIG. 1D is a graphic, showing the relative illuminance of each field of view on the image plane of the optical image capturing; system of the first embodiment of the present invention.

As shown in FIG. 1A and FIG. 1B, an optical image capturing system 10 of the first embodiment of the present invention includes, along an optical axis from an object side to an image side, a first lens 110, an aperture 100, a second lens 120, a third lens 130, a fourth lens 140, a fifth lens 150, an infrared rays filter 170, an image plane 180, and an image sensor 190. FIG. 1C shows a modulation transformation of the optical image capturing system 10 of the first embodiment of the present application. FIG. 1D is a graphic, showing the relative illuminance of each field of view on the image plane of the optical image capturing system of the first embodiment of the present invention.

The first lens 110 has negative refractive power and is made of plastic. An object-side surface 112 thereof, which faces the object side, is a convex aspheric surface, and an image-side surface 114 thereof, which faces the image side, is a concave aspheric surface. The object-side surface 112 has an inflection point thereon. A thickness of the first lens 110 on the optical axis is TP1, and a thickness of the first lens 110 at the height of a half of the entrance pupil diameter (HEP) is denoted by ETP1.

The first lens satisfies SGI111=1.96546 mm; |SGI111|/(|SGI111|+TP1)=0.72369, where SGI111 is a displacement ire parallel with the optical axis from a point on the object-side surface of the first lens, through which the optical axis passes, to the inflection point on the object-side surface, which is the closest to the optical axis, and SGI121 is a displacement in parallel with the optical axis from a point on the image-side surface of the first lens, through which the optical axis passes, to the inflection point on the image-side surface, which is the closest to the optical axis.

The first lens satisfies HIF111=3.38542 mm; HIF111/HOI=0.90519, where HIF111 is a displacement perpendicular to the optical axis from a point on the object-side surface of the first lens, through which the optical axis passes, to the inflection point, which is the closest to the optical axis; HIF121 is a displacement perpendicular to the optical axis from a point on the image-side surface of the first lens, through which the optical axis passes, to the inflection point, which is the closest to the optical axis.

The second lens 120 has positive refractive power and is made of plastic. An object-side surface 122 thereof, which faces the object side, is a convex aspheric surface, and an image-side surface 124 thereof, which faces the image side, is a concave aspheric surface. A thickness of the second lens 120 on the optical axis is TP2, and thickness of the second lens 120 at the height of a half of the entrance pupil diameter (HEP) is denoted by ETP2.

For the second lens, a displacement in parallel with the optical axis from a point on the object-side surface of the second lens, through which the optical axis passes, to the inflection point on the image-side surface, which is the closest to the optical axis is denoted by SGI211, and a displacement in parallel with the optical axis from a point on the image-side surface of the second lens, through which the optical axis passes, to the inflection point on the image-side surface, which is the closest to the optical axis is denoted by SGI221.

For the second lens, a displacement perpendicular to the optical axis from a point on the object-side surface of the second lens, through which the optical axis passes, to the inflection point, which is the closest to the optical axis is denoted by HIF211, and a displacement perpendicular to the optical axis from a point on the image-side surface of the second lens, through which the optical axis passes, to the inflection point, which is the closest to the optical axis is denoted by HIF221.

The third lens 130 has positive refractive power and is made of plastic. An object-side surface 132, which faces the object side, is a convex aspheric surface, and an image-side surface 134, which faces the image side, is a convex aspheric surface. The object-side surface 132 has an inflection point. A thickness of the third lens 130 on the opt al axis is TP3, and a thickness of the third lens 130 at the height of a half of the entrance pupil diameter (HEP) is denoted by ETP3.

The third lens 130 satisfies SGI311=0.00388 mm; |SGI311|/(|SGI311|+TP3)=0.00414, where SGI311 is a displacement in parallel with the optical axis, from a point on the object-side surface of the third lens, through which the optical axis passes, to the inflection point on the object-side surface, which is the closest to the optical axis, and SGI321 is a displacement in parallel with the optical axis, from a point on the image-side surface of the third lens, through which the optical axis passes, to the inflection point on the image-side surface, which is the closest to the optical axis.

For the third lens 130, SGI312 is a displacement in parallel with the optical axis, from a point on the object-side surface of the third lens, through which the optical axis passes, to the inflection point on the object-side surface, which is the second closest to the optical axis, and SGI322 is a displacement in parallel with the optical axis, from a point on the image-side surface of the third lens, through which the optical axis passes, to the inflection point on the object-side surface, which is the second closest to the optical axis.

The third lens 130 further satisfies HIF311=0.38898 mm; HIF311/HOI=0.10400, where HIF311 is a distance perpendicular to the optical axis between the inflection point on the object-side surface of the third lens, which is the closest to the optical axis, and the optical axis; HIF321 is a distance perpendicular to the optical axis between the inflection point on the image-side surface of the third lens, which is the closest to the optical axis, and the optical axis.

For the third lens 130, HIF312 is a distance perpendicular to the optical axis between the inflection point on the object-side surface of the third lens, which is the second closest to the optical axis, and the optical axis; HIF322 is a distance perpendicular to the optical axis between the inflection point on the image-side surface of the third lens, which is the second closest to the optical axis, and the optical axis.

The fourth lens 140 has positive refractive power and is made of plastic. An object-side surface 142, which faces the object side, is a convex aspheric surface, and an image-side surface 144, which faces the image side, is a convex aspheric surface. The object-side surface 142 has an inflection point. A thickness of the fourth lens 140 on the optical axis is TP4, and a thickness of the fourth lens 140 at the height of a half of the entrance pupil diameter (HEP) is denoted by ETP4.

The fourth lens 140 satisfies SGI421=0.0650 mm; |SGI421|/(|SGI421|+TP4)=0.03459, where SGI411 is a displacement in parallel with the optical axis, from a point on the object-side surface of the fourth lens, through which the optical axis passes, to the inflection point on the object-side surface, which is the closest to the optical axis, and SGI421 is a displacement in parallel with the optical axis, from a point on the image-side surface of the fourth lens, through which the optical axis passes, to the inflection point on the image-side surface, which is the closest to the optical axis.

For the fourth lens 140, SGI412 is a displacement in parallel with the optical axis, from a point on the object-side surface of the fourth lens, through which the optical axis passes, to the inflection point on the object-side surface, which is the second closest to the optical axis, and SGI422 is a displacement in parallel with the optical axis, from a point on the image-side surface of the fourth lens, through which the optical axis passes, to the inflection point on the object-side surface, which is the second closest to the optical axis.

The fourth lens 140 further satisfies HIF421=0.85606 mm; HIF421/HOI=0.22889, where HIF411 is a distance perpendicular to the optical axis between the inflection point on the object-side surface of the fourth lens, which is the closest to the optical axis, and the optical axis; HIF421 is a distance perpendicular to the optical axis between the inflection point on the image-side snake of the fourth lens, which is the closest to the optical axis, and the optical axis.

For the fourth lens 140, HIF412 is a distance perpendicular to the optical axis between the inflection point on the object-side surface of the fourth lens, which is the second closest to the optical axis, and the optical axis; HIF422 is a distance perpendicular to the optical axis between the inflection point on the image-side surface of the fourth lens, which is the second closest to the optical axis, and the optical axis.

The fifth lens 150 has negative refractive power and is made of plastic. An object-side surface 152, which faces the object side, is a concave aspheric surface, and an image-side surface 154, which faces the image side, is a concave aspheric surface. The object-side surface 152 and the image-side surface 154 both have an inflection point. A thickness of the fifth lens 150 on the optical axis is TP5, and a thickness of the fifth lens 150 at the height of a half of the entrance pupil diameter (HEP) is denoted by ETP5.

The fifth lens 150 satisfies SGI511=−1.51505 mm; |SGI511|/(|SGI511|+TP5)=0.70144; SGI521=0.01229 mm; |SGI521|/(|SGI521|+TP5)=0.01870, where SGI511 is a displacement in parallel with the optical axis, from a point on the object-side surface of the fifth lens, through which the optical axis passes, to the inflection point on the object-side surface, which is the closest to the optical axis, and SGI521 is a displacement in parallel with the optical axis, from a point on the image-side surface of the fifth lens, through which the optical axis passes, to the inflection point on the image-side surface, which is the closest to the optical axis.

For the fifth lens 150, SGI512 is a displacement in parallel with the optical axis, from a point on the object-side surface of the fifth lens through which the optical axis passes, to the inflection point on the object-side surface, which is the second closest to the optical axis, and SGI522 is a displacement in parallel with the optical axis, from a point on the image-side surface of the fifth lens, through which the optical axis passes, to the inflection point on the object-side surface, which is the second closest to the optical axis.

The fifth lens 150 further satisfies HIF511=2.25435 mm; HIF511/HOI=0.60277; HIF521=0.82313 mm; HIF521/HOI=0.22009, where HIF511 is a distance perpendicular to the optical axis between the inflection point on the object-side surface of the fifth lens, which is the closest to the optical axis, and the optical axis; HIF521 is a distance perpendicular to the optical axis between the inflection point on the image-side surface of the fifth lens, which is the closest to the optical axis, and the optical axis.

For the fifth lens 150. HIF512 is a distance perpendicular to the optical axis between the inflection point on the object-side surface of the fifth lens, which is the second closest to the optical axis, and the optical axis; HIF522 is a distance perpendicular to the optical axis between the inflection point on the image-side surface of the fifth lens, which is the second closest to the optical axis, and the optical axis.

A distance in parallel with the optical axis between a coordinate point at a height of ½ HEP on the object-side surface of the first lens 110 and the image plane is ETL, and a distance in parallel with the optical axis between the coordinate point at the height of ½ HEP on the object-side surface of the first lens 110 and a coordinate point at a height of ½ HEP on the image-side surface of the fourth lens 140 is EIN, which satisfy: ETL=10.449 mm; EIN=9.752 mm; EIN/ETL=0.933.

The optical image capturing system of the first embodiment satisfies: ETP1=0.870 mm; ETP2=0.780 mm; ETP3=0.825 mm; ETP4=1.562 mm; ETP5=0.923 mm. The sum of the aforementioned ETP1 to ETP5 is SETP, wherein SETP=4.960 mm. In addition, TP1=0.750 mm; TP2=0.895 mm; TP3=0.932 mm; TP4=1.816 mm; TP5=0.645 mm. The sum of the aforementioned TP1 to TP5 is STP, wherein STP=5.039 mm; SETP/STP=0.984.

In order to enhance the ability of correcting aberration and to lower the difficulty of manufacturing at the same time, the ratio between the thickness (ETP) at the height of a half of the entrance pupil diameter (HEP) and the thickness (TP) of any lens on the optical axis (i.e., ETP/TP) in the optical image capturing system of the first embodiment is particularly controlled, which satisfies: ETP1/TP1=1.160; ETP2/TP2=0.871; ETP3/TP3=0.885; ETP4/TP4=0.860; ETP5/TP5=1.431.

In order to enhance the ability of correcting aberration, lower the difficulty of manufacturing, and "slightly shortening" the length of the optical image capturing system at the same time, the ratio between the horizontal distance (ED) between two neighboring lenses at the height of a half of the entrance pupil diameter (HEP) and the parallel distance (IN) between these two neighboring lens on the optical axis (i.e., ED/IN) in the optical image capturing system of the first embodiment is particularly controlled, which satisfies: the horizontal distance between the first lens 110 and the second lens 120 at the height of a half of the entrance pupil diameter (HEP) is denoted by ED12, wherein ED12=3.152 mm; the horizontal distance between the second lens 120 and the third lens 130 at the height of a half of the entrance pupil diameter (HEP) is denoted by ED23, wherein ED23=0.478 mm; the horizontal distance between the third lens 130 and the fourth lens 140 at the height of a half of the entrance pupil diameter (HEP) is denoted by ED34, wherein ED34=0.843 mm; the horizontal distance between the fourth lens 140 and the fifth lens 150 at the height of a half of the entrance pupil diameter (MEP) is denoted by ED45, wherein ED45=0.320 mm. The sum of the aforementioned ED12 to ED45 is SED, wherein SED=4.792 mm.

The horizontal distance between the first lens 110 and the second lens 120 on the optical axis is denoted by IN12, wherein IN12=3.190 mm, and ED12/IN12=0.988. The horizontal distance between the second lens 120 and the third lens 130 on the optical axis is denoted by IN23, wherein IN23=0.561 mm, and ED23/IN23=0.851. The horizontal distance between the third lens 130 and the fourth lens 140 on the optical axis is denoted by IN34, wherein IN34=0.656 mm, and ED34/IN34=1.284. The horizontal distance between the fourth lens 140 and the fifth lens 150 on the optical axis is denoted by IN45, wherein IN45=0.405 mm, and ED45/IN45=0.792. The sum of the aforementioned IN12 to EN45 is denoted by SIN, wherein SIN=0.999 mm, and SED/SIN=1.083.

The optical image capturing system of the first embodiment satisfies: ED12/ED23=6.599; ED23/ED34=0.567; ED34/ED45=2.630; IN12/IN23=5.687; IN23/IN34=0.855; IN34/IN45=1.622.

The horizontal distance in parallel with the optical axis between a coordinate point at the height of ½ HEP on the image-side surface of the fifth lens 150 and image surface is denoted by EBL, wherein EBL=0.697 mm. The horizontal distance in parallel with the optical axis between the point on the image-side surface of the fifth lens 150 where the optical axis passes through and the image plane is denoted by BL, wherein BL=0.71184 mm. The optical image capturing system of the first embodiment satisfies: EBL/BL=0.979152. The horizontal distance in parallel with the optical axis between the coordinate point at the height of ½ HEP on the image-side surface of the fifth lens 150 and the infrared rays filter 190 is denoted by EIR, wherein EIR=0.085 mm. The horizontal distance in parallel with the optical axis between the point on the image-side surface of the fifth lens 150 where the optical axis passes through and the infrared rays filter 190 is denoted by PIR, wherein PIR=0.100 mm, and it satisfies: EIR/PIR=0.847.

The infrared rays filter 170 is made of glass and between the fifth lens 150 and the image plane 180. The infrared rays filter 170 gives no contribution to the focal length of the system.

The optical image capturing system 10 of the first embodiment has the following parameters, which are f=3.03968 mm; f/HEP=1.6; HAF=50.001 degrees; and tan (HAF)=1.1918, where f is a focal length of the system; HAF is a half of the maximum field angle; and HEP is an entrance pupil diameter.

The parameters of the lenses of the first embodiment are f1=−9.24529 mm; |f/f1|=0.32.878; f5=2.32439; and |f1|>f5, where f1 is a focal length of the first lens 110; and f5 is a focal length of the fifth lens 150.

The first embodiment further satisfies |f2|+|f3|+|f4|=17.3009 mm; |f1|+|f5|=11.5697 mm and |f2|+|f3|+|f4|>|f1|+|f5|, where f2 is a focal length of the second lens 120, f3 is a focal length of the third lens 130, f4 is a focal length of the fourth lens 140, and f5 is a focal length of the fifth lens 150.

The optical image capturing system 10 of the first embodiment further satisfies ΣPPR=f/f2+f/f3+f/f4=1.86768; ΣNPR=f/f1+f/f5=−1.63651; ΣPPR/|ΣNPR|=1.14125; |f/f2|=0.47958; |f/f3|=0.38289; |f/f4|=1.00521; |f/f5|=1.30773, where PPR is a ratio of a focal length f of the optical image capturing system to a focal length fp of each of the lenses with positive refractive power; and NPR is a ratio of a focal length f of the optical image capturing system to a focal length fn of each of lenses with negative refractive power.

The optical image capturing system 10 of the embodiment further satisfies InTL+BFL=HOS; HOS=10.56320 mm; HOI=3.7400 mm; HOS/HOI=2.8244; HOS/f=3.4751; InS=6.21073 mm; and InS/HOS=0.5880, where InTL is a distance between the object-side surface 112 of the first lens 110 and the image-side surface 154 of the fifth lens 150; HOS is a height of the image capturing system, i.e. a distance between the object-side surface 112 of the first lens 110 and the image plane 180; InS is a distance between the aperture 100 and the image plane 180; HOI is a half of a diagonal of an effective sensing area of the image sensor 190, i.e., the maximum image height; and BFL is a distance between the image-side surface 154 of the fifth lens 150 and the image plane 180.

The optical in age capturing system 10 of the first embodiment further satisfies ΣTP=5.0393 mm; InTL=9.8514 mm and ΣTP/InTL=0.5115, where ΣTP is a sum of the thicknesses of the lenses 110-150 with refractive power, it is helpful for the contrast of image and yield rate of manufacture and provides a suitable back focal length for installation of other elements.

The optical image capturing system 10 of the first embodiment further satisfies |R1/R2|=1.96712, where R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies (R9−R10)/(R9+R10)=−1.1505, where R9 is a radius of curvature of the object-side surface 152 of the fifth lens 150, and R10 is a radius of curvature of the image-side surface 154 of the fifth lens 150. It may modify the astigmatic field curvature.

The optical image capturing system 10 of the first embodiment further satisfies ΣPP=f2f3+f4=17.30090 mm; and f2/(f2+f3+f4)=0.36635, where ΣPP is a sum of the focal lengths fp of each lens with positive refractive power, it is helpful to share the positive refractive power of the second lens 120 to other positive lenses to avoid the significant aberration caused by the incident rays.

The optical image capturing system 10 of the first embodiment further satisfies ΣNP=f1+f5=−11.56968 mm; and f5/(f1f5)=0.20090, where ΣNP is a sum of the focal lengths fn of each lens with negative refractive power. It is helpful to share the negative refractive power of the fifth lens 150 to the other negative lens, which avoids the significant aberration caused by the incident rays.

The optical image capturing system 10 of the first embodiment further satisfies INT12=3.19016 mm; IN12/f=1.04951, where IN12 is a distance on the optical axis between the first lens 110 and the second lens 120. It may correct chromatic aberration and improve the performance.

The optical in age capturing system 10 of the first embodiment further satisfies IN45=0.40470 mm; IN45/f=0.13314, where IN45 is a distance on the optical axis between the fourth lens 140 and the fifth lens 150. It may correct chromatic aberration and improve the performance.

The optical image capturing system 10 of the first embodiment further satisfies TP1=0.75043 mm; TP2=0.89543 mm; TP3=0.93225 mm; and (TP1+IN12)/TP2=4.40078, where TP1 is a central thickness of the first lens 110 on the optical axis, TP2 is a central thickness of the second lens the optical axis, and TP3 is a central thickness of the third lens 130 on the optical axis. It may control the sensitivity of manufacture of the system and improve the performance.

The optical image capturing system 10 of the first embodiment further satisfies TP4=1.81634 mm; TP5=0.64488 mm; and (TP5+IN45)/TP4=0.57785, where TP4 is a central thickness of the fourth lens 140 on the optical axis, TP5 is a central thickness of the fifth lens 150 on the optical axis, and IN45 is a distance on the optical axis between the fourth lens 140 and the fill lens 150. It may control the sensitivity of manufacture of the system and lower the total height of the system.

The optical image capturing system 10 of the first embodiment further satisfies TP2/TP3=0.96051; TP3/TP4=0.51325; TP4/TP5=2.81657; and TP3/(IN23+TP3+IN34)=0.43372, where IN34 is a distance on the optical axis between the third lens 130 and the fourth lens 140. It may control the sensitivity of manufacture of the system and lower the total height of the system.

The optical image capturing system 10 of the first embodiment further satisfies InRS41=−0.09737 mm; InRS42=−1.31040 mm; |InRS41/TP4=0.05361 and |InRS42|/TP4=0.72145, where InRS41 is a displacement from a point on the object-side surface 142 of the fourth lens passed through by the optical axis to a point on the optical axis where a projection of the maximum effective semi diameter of the object-side surface 142 of the fourth lens ends; InRS42 is a displacement from a point on the it rage-side surface 144 of the fourth lens passed through by the optical axis to a point on the optical axis where a projection of the maximum effective semi diameter of the image-side surface 144 of the fourth lens ends; and TP4 is a central thickness of the fourth lens 140 on the optical axis. It is helpful for manufacturing and shaping of the lenses and is helpful to reduce the size.

The optical image capturing system 10 of the first embodiment further satisfies HVT41=1.41740 mm; HVT42=0, where HVT41 a distance perpendicular to the optical axis between the critical point on the object-side surface 142 of the fourth lens and the optical axis; and HVT42 a distance perpendicular to the optical axis between the critical point on the image-side surface 144 of the fourth lens and the optical axis.

The optical image capturing system 10 of the first embodiment further satisfies InRS51=−1.63543 mm; InRS52=−0.34495 mm; |InRS51|/TP5 2.53604 and |InRS52|/TP5=0.53491, where InRS51 is a displacement from a point on the object-side surface 152 of the fifth lens passed through by the optical axis to a point on the optical axis where a projection of the maximum effective semi diameter of the object-side surface 152 of the fifth lens ends; InRS52 is a displacement from a point on the image-side surface 154 of the fifth lens passed through by the optical axis to a point on the optical axis where a projection of the maximum effective semi diameter of the image-side surface 154 of the fifth lens ends; and TP5 is a central thickness of the fifth lens 150 on the optical axis. It is helpful for manufacturing and shaping of the lenses and is helpful to reduce the size.

The optical image capturing system 10 of the first embodiments satisfies HVT51−0; HVT52=1.35891 mm; and HVT51/HVT52=0, where HVT51 a distance perpendicular to the optical axis between the critical point on the object-side surface 152 of the fifth lens and the optical axis; and HVT52 a distance perpendicular to the optical axis between the critical point on the image-side surface 154 of the fifth lens and the optical axis.

The optical image capturing system 10 of the first embodiment satisfies HVT52/HOI=0.36334. It is helpful for correction of the aberration of the peripheral view field of the optical image capturing system.

The optical image capturing system 10 of the first embodiment satisfies HVT52/HOS=0.12865. It is helpful for correction of the aberration of the peripheral view field of the optical image capturing system.

The third lens 130 and the fifth lens 150 have negative refractive power. The optical image capturing system 10 of the first embodiment further satisfies NA5/NA3=0.368966, where NA3 is an Abbe number of the third lens 130; and NA5 is an Abbe number of the fifth lens 150. It may correct the aberration of the optical image capturing system.

The optical image capturing system 10 of the first embodiment further satisfies |TDT|=0.63350%; |ODT|=2.06135%, where TDT is TV distortion; and ODT is optical distortion.

For the optical image capturing system of the first embodiment, the values of MTF in the spatial frequency of 55 cycles/mm at the optical axis, 0.3 field of view, and 0.7 field of view on an image plane are respectively denoted by MTFE0, MTFE3, and MTFE7, wherein MTFE0 is around 0.65, MTFE3 is around 0.47, and MTFE7 is around 0.39; the values of MTF in the spatial frequency of 110 cycles/mm at the optical axis, 0.3 field of view, and 0.7 field of view on an image plane are respectively denoted by MTFQ0, MTFQ3, and MTFQ7, wherein MTFQ0 is around 0.38, MTFQ3 is around 0.14, and MTFQ7 is around 0.13; the values of modulation transfer function (MTF) in the spatial frequency of 220 cycles/mm at the optical axis, 0.3 field of view, and 0.7 field of view on an image plane are respectively denoted by MTFH0, MTFH3, and MTFH7, wherein. MTFH0 is around 017, MTFH3 is around 0.07, and MTFH7 is around 0.14.

For the optical image capturing system of the first embodiment, when the infrared of wavelength of 850 nm focuses on the image plane, the values of MTF in spatial frequency (55 cycles/mm) at the optical axis, 0.3 HOI, and 0.7 HOI on an image plane are respectively denoted by WTF10, MTF13, and MTF17, wherein MTF10 is around 0.05, MTF13 is around 0.12, and MTF17 is around 0.11.

As shown in FIG. 1D, which is a graphic showing the relative illuminance of each field of view on the image plane of the optical image capturing system of the first embodiment of the present invention, the relative illuminances corresponding to the optical axis (i.e., the 0.0 field of view), 0.1 field of view, 0.2 field of view, 0.3 field of view, 0.4 field of view, 0.5 field of view, 0.6 field of view, 0.7 field of view, 0.8 field of view, 0.9 field of view, and 1.0 field of view are respectively denoted by RI1, RI2, RI3, RI4, RI5, RI6, RI7, RI8, RI9, and RI10, wherein the relative illuminances of 0.9 field of view is around 30%.

Figure 7:
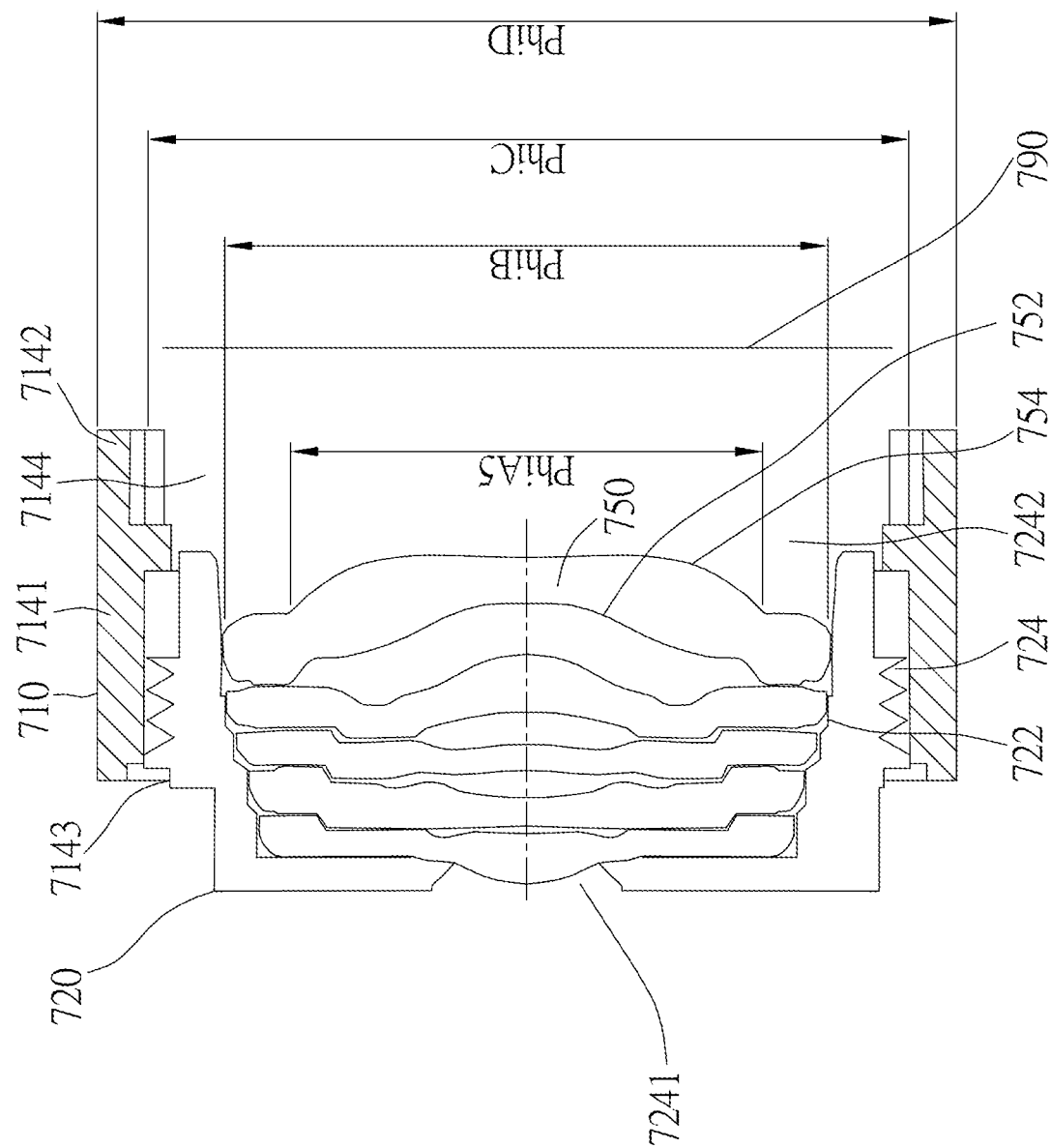
FIG. 7 is a schematic view for the optical image capturing system of the present invention, showing the maximum effective diameter PhiA5 of the image-side surface of the fifth lens, the maximum diameter PhiB of the image-side surface of the fifth lens, the length PhiD of the shortest edge of the plane of the base portion perpendicular to the optical axis, and the maximum outer diameter PhiC of the connecting portion of the second lens positioning member on the plane perpendicular to the optical axis.

As shown in FIG. 7, the optical image capturing system of the first embodiment of the present invention could include an image sensing module (not show which includes a substrate and a photosensitive member provided on the substrate. The optical image capturing system could further include a first lens positioning member 710. The first lens positioning member 710 includes a base 712 and a lens holder 714, wherein the base has an open receiving space, and is provided on the substrate in a way that the photosensitive member could be received in the receiving space. The lens holder 714, which could be made integrally, is hollow and opaque, wherein the lens holder 714 has a barrel portion 7141 and a base portion 7142 which are connected to each other. Furthermore, the lens holder 714 has a first through hole 7143 and a second through hole 7144 at two opposite ends thereof, wherein the first through hole 7143 communicates with the barrel portion, while the second through hole 7144 communicates with the base portion. The maximum length of the shortest edge of the plane of the base portion perpendicular to the optical axis is denoted by PhiD, which satisfies the condition: PhiD=6.838 mm.

The optical image capturing system of the first embodiment of the present invention further includes a second lens positioning member 720, which is provided in the lens holder 714 of the first lens positioning member 710, and includes a positioning portion 722 and a connecting, portion 724. The positioning portion 722 is hollow, and respectively has a third through hole 7241 and a fourth through hole 7242 at two opposite ends in the direction of the optical axis, wherein the third through hole 7241 communicates with the positioning portion 722, while the fourth through hole 7242 communicates with the base portion 7142. The positioning portion 722 directly contacts with any one of the lenses of the first embodiment to receive said lens, and therefore to arrange and position the lenses on the optical axis. The connecting portion 724 is provided at the outside of the positioning portion 722, and could be directly engaged with the barrel portion 741, so that the second lens positioning n ember 720 could be received in the lens holder 714 of the first lens positioning member 710 to make the optical image capturing system provide the function of adjusting focal length and positioning in the direction of the optical axis. The maximum outer diameter of the plane of the connecting portion 724 perpendicular to the optical axis is denoted by PhiC, which satisfies the condition: PhiC=6.638 mm. The maximum inner diameter of the fourth through hole 7242 is denoted by Phi4. Said connecting portion 724 has a threaded segment to engage the second lens positioning member 720 in the lens holder 714 of the first lens positioning member 714 by screwing.

Each lens of the optical image capturing system of the first embodiment is provided in the first lens positioning member 710 through the second lens positioning member 720, and is closer to the third through hole 7241 than the photosensitive member. Each lens aligns with the photosensitive member.

In the first embodiment, the fifth lens 150 is the lens closest to the image plane, wherein the maximum effective diameter of the image-side surface thereof is denoted by PhiA5, which satisfies the condition: PhiA5=2*EHDS52=6.438 mm. Said surface is aspheric, the cut-off point of the maximum effective diameter is the cut-off point containing the aspheric surface. The ineffective half diameter (IHD) of the image-side surface of the fifth lens 150 refers to a surface segment between cat-off points of the maximum effective half diameter of the same surface extending in a direction away from the optical axis. In the first embodiment, the fifth lens 150 is the lens closest to the image plane, wherein the maximum diameter of the image-side surface thereof is denoted by PhiB, which satisfies the condition: PhiB=2*(maximum effective half diameter EHD52+maximum ineffective half diameter IHD)=PhiA+2*(maximum ineffective half diameter IHD)=6.5 mm.

In the first embodiment, a maximum effective diameter of the image-side surface of the lens closest to the image plane (i.e., the image space) could be also called optical exit pupil, and is denoted by PhiA5. The pupil magnification ratio thereof is denoted by PMR, which satisfies the condition: PMR=PhiA/HEP=3.3888. The pupil-image ratio thereof is denoted by PMMR, which satisfies the condition: PMMR=PhiA5/2HOI=0.8607. The miniature ratio thereof is denoted by PSMR, which satisfies the condition: PSMR=PhiA5/InTL=0.6535.

In the current embodiment, a maximum effective diameter of the object-side surface of the first lens is denoted by PhiA11, and a maximum effective diameter of the image-side surface of the first lens is denoted by PhiA12, which satisfies the condition: PhiA11=6.932 mm and PhiA12=4.644 mm.

The ratio between the maximum effective diameter of the object-side surface of the first lens PhiA11 and the maximum effective diameter of the image-side surface of the fifth lens PhiA5 is denoted by SFR (Slim Frme Ratio), which satisfies the condition: SFR=PhiA11/PhiA5=1.079.

The parameters of the lenses of the first embodiment are listed in Table 1 and Table 2.

TABLE 1 f = 3.03968 mm; f/HEP = 1.6; HAF = 50.0010 deg

| Surface | | Radius of curvature (mm) | Thickness (mm) | Material | Refractive index | Abbe number | Focal length (mm) |
|---|---|---|---|---|---|---|---|
| 0 | Object | plane | infinity | | | | |
| 1 | $1^{st}$ lens | 4.01438621 | 0.750 | plastic | 1.514 | 56.80 | −9.24529 |
| 2 | | 2.040696375 | 3.602 | | | | |
| 3 | Aperture | plane | −0.412 | | | | |
| 4 | $2^{nd}$ lens | 2.45222384 | 0.895 | plastic | 1.565 | 58.00 | 6.33819 |
| 5 | | 6.705898264 | 0.561 | | | | |
| 6 | $3^{rd}$ lens | 16.39663088 | 0.932 | plastic | 1.565 | 58.00 | 7.93877 |
| 7 | | −6.073735083 | 0.656 | | | | |
| 8 | $4^{th}$ lens | 4.421363446 | 1.816 | plasiic | 1.565 | 58.00 | 3.02394 |
| 9 | | −2.387933519 | 0.405 | | | | |
| 10 | $5^{th}$ lens | −1.646639396 | 0.645 | plastic | 1.650 | 21.40 | −2.32439 |
| 11 | | 23.53222697 | 0.100 | | | | |
| 12 | Infrared rays filter | 1E+18 | 0.200 | BK7_SCH | 1.517 | 64.20 | |
| 13 | | 1E+18 | 0.412 | | | | |
| 14 | Image plane | 1E+18 | | | | | |

Reference wavelength: 555 nm.

TABLE 2

Coefficients of the aspheric surfaces

| | Surface | | | | |
|---|---|---|---|---|---|
| | 1 | 2 | 4 | 5 | 6 |
| k | −1.882119E−01 | −1.927558E+00 | −6.483417E+00 | 1.766123E+01 | −5.000000E+01 |
| A4 | 7.686381E−04 | 3.070422E−02 | 5.439775E−02 | 7.241691E−03 | −2.985209E−02 |
| A6 | 4.630306E−04 | −3.565153E−03 | −7.980567E−03 | −8.359563E−03 | −7.175713E−03 |
| A8 | 3.178966E−05 | 2.062259E−03 | −3.537039E−04 | 1.303430E−02 | 4.284107E−03 |
| A10 | −1.773597E−05 | −1.571117E−04 | 2.844845E−03 | −6.955350E−03 | −5.492349E−03 |
| A12 | 1.620619E−06 | −4.694004E−05 | −1.025049E−03 | 1.366262E−03 | 1.232072E−03 |
| A14 | −4.916041E−08 | 7.399980E−06 | 1.913679E−04 | 3.588298E−04 | −4.107269E−04 |
| A16 | 0.000000E−00 | 0.000000E+00 | 0.000000E+00 | 0.000000E+00 | 0.000000E+00 |
| A18 | 0.000000E−00 | 0.000000E+00 | 0.000000E+00 | 0,000000E+00 | 0.000000E+00 |
| A20 | 0.000000E−00 | 0.000000E+00 | 0.000000E+00 | 0.000000E+00 | 0.000000E+00 |

TABLE 2-continued

Coefficients of the aspheric surfaces

| | Surface | | | | |
|---|---|---|---|---|---|
| | 7 | 8 | 9 | 10 | 11 |
| k | −3.544648E+01 | −3.167522E+01 | −2.470764E+00 | −1.570351E+00 | 4.928899E+01 |
| A4 | −6.315366E−02 | −1.903506E−03 | −2.346908E−04 | −4.250059E−04 | −4.625703E−03 |
| A6 | 6.038040E−03 | −1.806837E−03 | 2.481207E−03 | −1.591781E−04 | −7.108872E−04 |
| A8 | 4.674156E−03 | −1.670355E−03 | −5.862277E−04 | −3.752177E−05 | 3.429244E−05 |
| A10 | −8.031117E−03 | 4.791024E−04 | −1.955029E−04 | −9.210114E−05 | 2.887298E−06 |
| A12 | 3.319791E−03 | −5.594125E−05 | 1.880941E−05 | −1.101797E−05 | 3.684628E−07 |
| A14 | −5.356799E−04 | 3.704401E−07 | 1.132586E−06 | 3.536320E−06 | −4.741322E−08 |
| A16 | 0.000000E+00 | 0.000000E+00 | 0.000000E+00 | 0,000000E+00 | 0.000000E+00 |
| A18 | 0.000000E+00 | 0.000000E+00 | 0.000000E+00 | 0,000000E+00 | 0.000000E+00 |
| A20 | 0.000000E+00 | 0.000000E+00 | 0.000000E+00 | 0,000000E+00 | 0.000000E+00 |

The detail parameters of the first embodiment are listed in Table 1, in which the unit of the radius of curvature, thickness, and focal length are millimeter, and surface 0-10 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it main.

Second Embodiment

Figure 2A:
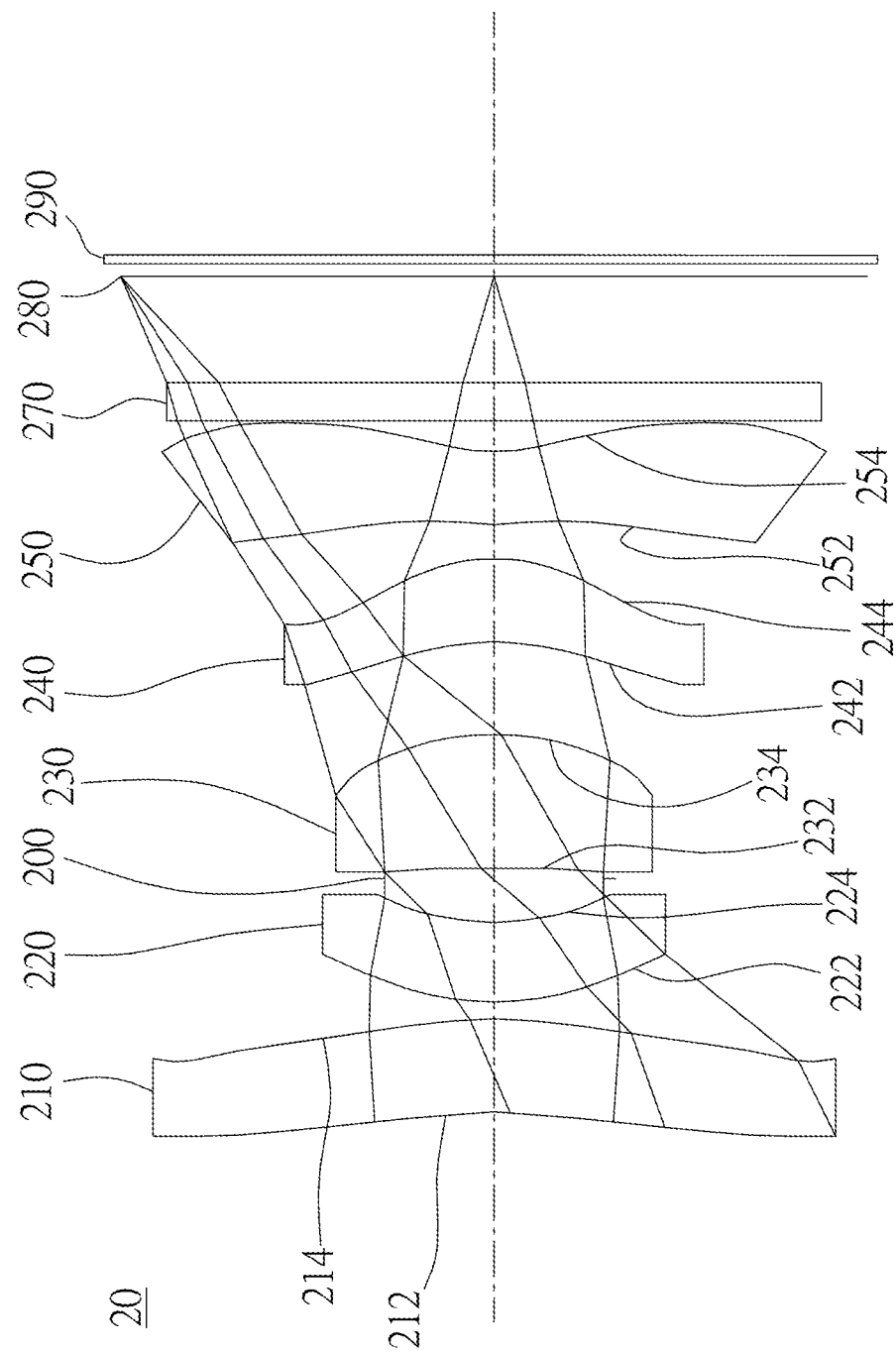
FIG. 2A is a schematic diagram of a second embodiment of the present invention.
Figure 2B:
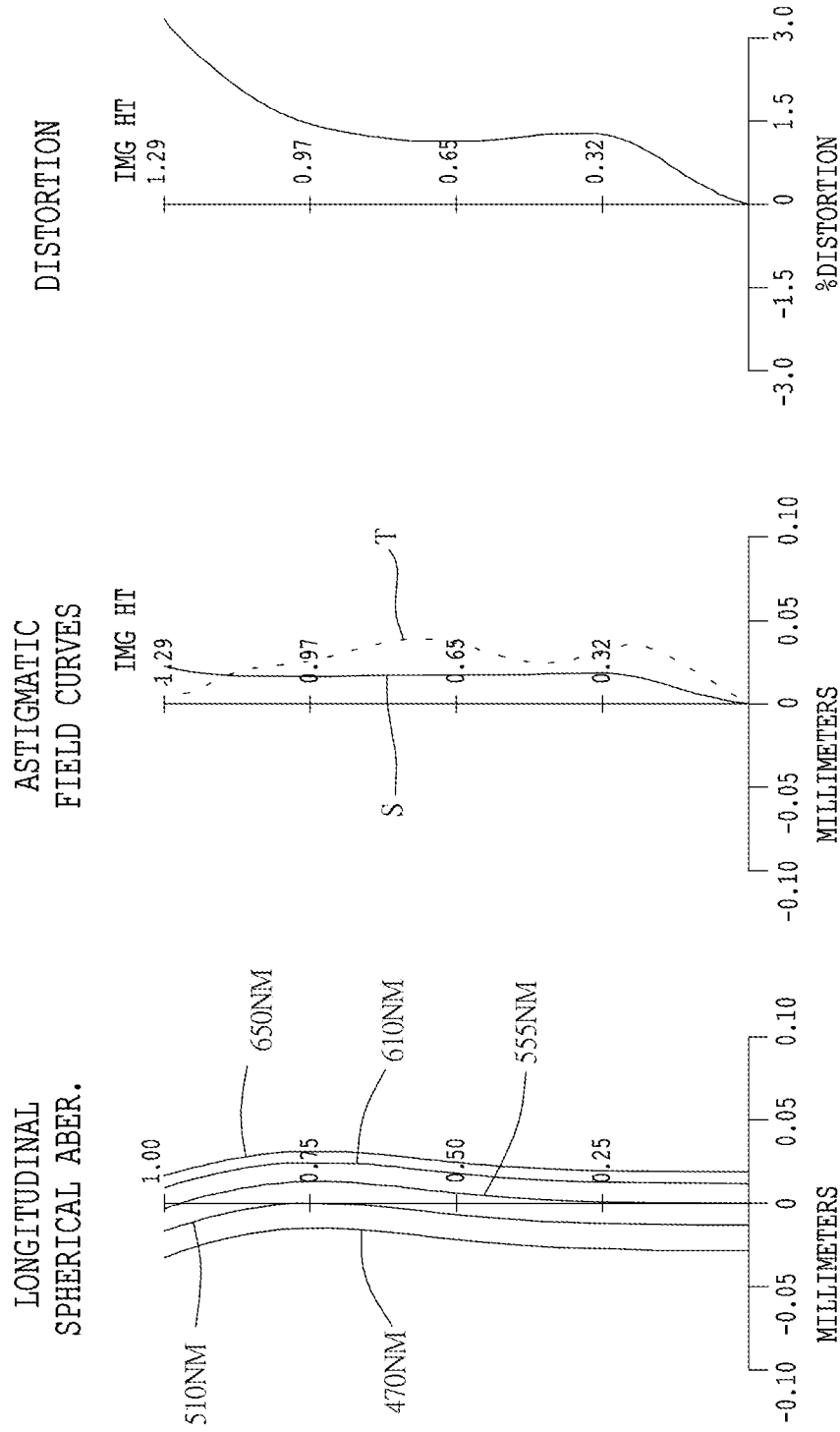
FIG. 2B shows curve diagram of longitudinal spherical aberration, astigmatic field, and optical distortion of the optical image capturing system in the order from left to right of the second embodiment of the present application.
Figure 2C:
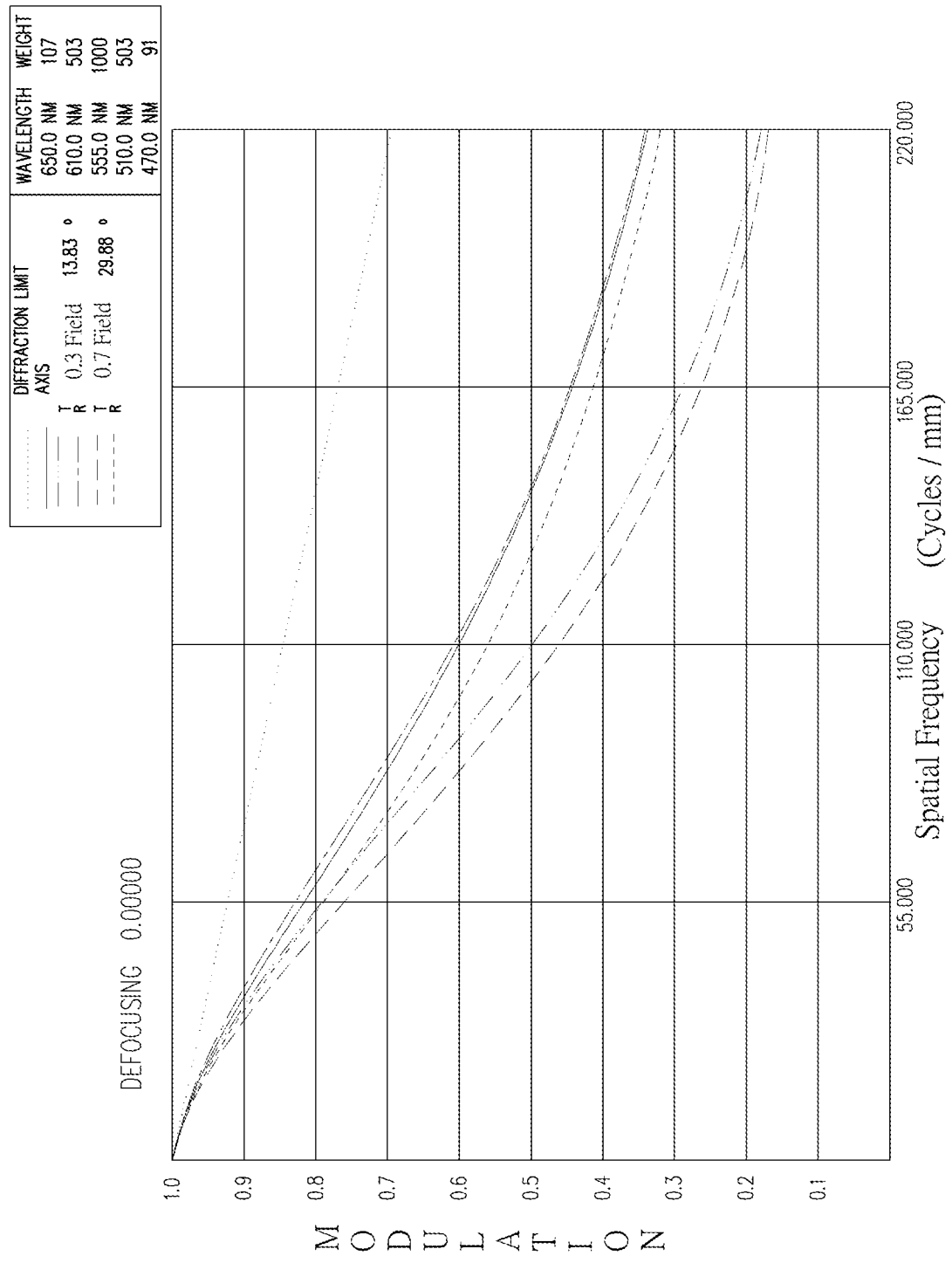
FIG. 2C shows a feature map of modulation transformation of the optical image capturing system of the second embodiment of the present application in visible spectrum.
Figure 2D:
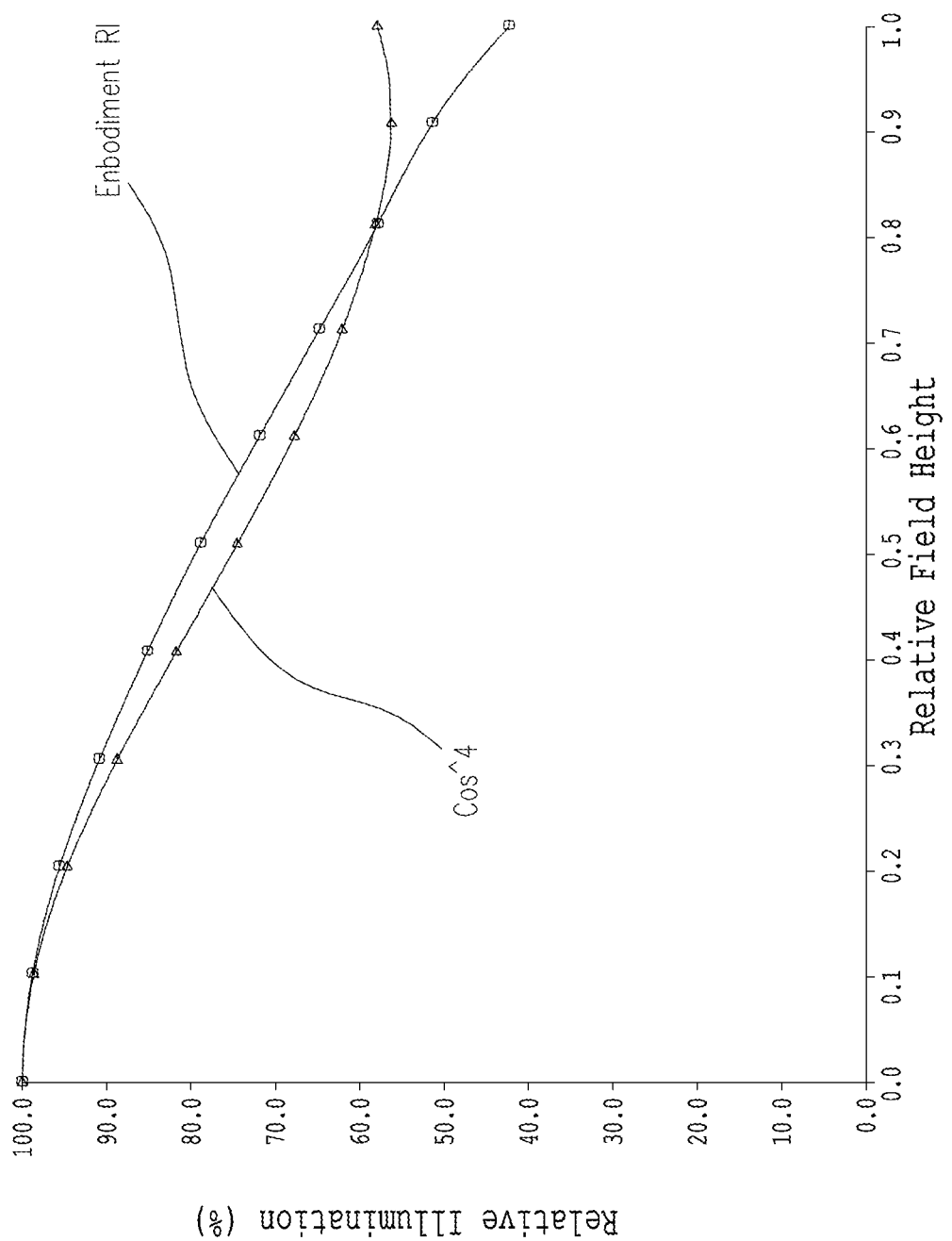
FIG. 2D is a graphic, showing the relative illuminance of each field of view on the image plane of the optical image capturing system of the second embodiment of the present invention.

As shown in FIG. 2A and FIG. 2B, an optical image capturing system 20 of the second embodiment of the present invention includes, along an optical axis from an object side to an image side, a first lens 210, an aperture 200, a second lens 220, a third lens 230, a fourth lens 240, a fifth lens 250, an infrared rays filter 270, an image plane 280, and an image sensor 290. FIG. 2C shows a modulation transformation of the optical image capturing system 20 of the second embodiment of the present application. FIG. 2D is a graphic, showing the relative illuminance of each field of view on the image plane of the optical image capturing system of the second embodiment of the present invention.

The first lens 210 has positive refractive power and is made of plastic. An object-side surface 212 thereof, which faces the object side, is a concave aspheric surface, and an image-side surface 214 thereof, which faces the image side, is a convex aspheric surface. The object-side surface 212 and the image-side surface 214 both have an inflection point.

The second lens 220 has positive refractive power and is made of plastic. An object-side surface 222 thereof, which faces the object side, is a convex aspheric surface, and an image-side surface 224 thereof, which faces the image side, is a concave aspheric surface. The object-side surface 222 has an inflection point.

The third lens 230 has positive refractive power and is made of plastic. An object-side surface 232, which faces the object side, is a concave aspheric surface, and an image-side surface 234, which faces the image side, is a convex aspheric surface.

The fourth lens 240 has positive refractive power and is made of plastic. An object-side surface 242, which faces the object side, is a concave aspheric surface, and an image-side surface 244, which faces the image side, is a convex aspheric surface. The object-side surface 242 has two inflection points, and the image-side surface 244 has an inflection point.

The fifth lens 250 has negative refractive power and is made of plastic. An object-side surface 252, which faces the object side, is a convex surface, and an image-side surface 254, which faces the image side, is a concave surface. The object-side surface 242 has three inflection points, and the image-side surface 244 has an inflection point. It may help to shorten the back focal length to keep small in size. In addition, it may reduce an incident angle of the light of an off-axis field of view and correct the aberration of the off-axis field of view.

The infrared rays filter 270 is made of glass and between the fifth lens 250 and the image plane 280. The infrared rays filter 270 gives no contribution to the focal length of the system.

The parameters of the lenses of the second embodiment are listed in Table 3 and Table 4.

TABLE 3 f = 1.5415 mm; f/HEP = 1.93; HAF = 38.4105 deg

| Surface | Radius of curvature (mm) | | Thickness (mm) | Material | Refractive index | Abbe number | Focal length (mm) |
|---|---|---|---|---|---|---|---|
| 0 | Object | 1E+18 | 600 | | | | |
| 1 | 1$^{st}$ lens | −1.930642964 | 0.349 | plastic | 1.6355 | 23.891 | 22.676 |
| 2 | | −1.824355046 | 0.064 | | | | |
| 3 | 2$^{nd}$ lens | 0.864090754 | 0.298 | plastic | 1.6355 | 23.891 | 21.118 |
| 4 | | 0.798892993 | 0.161 | | | | |
| 5 | Aperture | 1E+18 | 0.040 | | | | |
| 6 | 3$^{rd}$ lens | −64.06432934 | 0.501 | plastic | 1.5445 | 55.961 | 1.833 |
| 7 | | −0.988415976 | 0.347 | | | | |
| 8 | 4$^{th}$ lens | −0.947579604 | 0.312 | plastic | 1.6355 | 23.891 | 1.368 |

TABLE 3-continued f = 1.5415 mm; f/HEP = 1.93; HAF = 38.4105 deg

| Surface | Radius of curvature (mm) | Thickness (mm) | Material | Refractive index | Abbe number | Focal length (mm) |
|---|---|---|---|---|---|---|
| 9 | −0.513605355 | 0.130 | | | | |
| 10 | 5$^{th}$ lens 4.257386191 | 0.274 | plastic | 1.6355 | 23.891 | −1.224 |
| 11 | 0.645065676 | 0.113 | | | | |
| 12 | Infrared rays filter 1E+18 | 0.145 | NBK7 | | | |
| 13 | 1E+18 | 0.400 | | | | |
| 14 | Image plane 1E+18 | 0.000 | | | | |

Reference wavelength: 555 nm; the position of blocking light: the clear aperture of the first surface is 1.190 mm; the clear aperture of the seventh surface is 0.549 mm; the clear aperture of the eleventh surface is 1.154.

TABLE 4

Coefficients of the aspheric surfaces

| | Surface | | | | |
|---|---|---|---|---|---|
| | 1 | 2 | 3 | 4 | 6 |
| k | −2.394145E+01 | −1.711018E+01 | 0.000000E+00 | 0.000000E+00 | −4.440465E+02 |
| A4 | 1.075266E−01 | 5.004383E−02 | −4.232571E−02 | −4.530624E−01 | −1.498334E−01 |
| A6 | −8.472163E−02 | −6.507436E−02 | 1.785630E−03 | −8.828287E−01 | −3.376742E+00 |
| A8 | 4.034019E−02 | −1.300507E−01 | −2.119148E+00 | 5.609652E+01 | 3.639328E+01 |
| A10 | −2.095356E−01 | 5.495669E−01 | 5.794099E+00 | −8.021996E+02 | −2.396738E+01 |
| A12 | 6.643886E−01 | −3.772797E−01 | 1.433358E+01 | 5.764079E+03 | −8.904600E+03 |
| A14 | −8.982875E−01 | −6.033942E−01 | −7.471523E+01 | −2.050736E+04 | 1.486657E+05 |
| A16 | 6.207288E−01 | 1.141976E+00 | 6.391191E+01 | 2.644244E+04 | −1.167773E+06 |
| A18 | −2.188432E−01 | −6.967751E−01 | 0.000000E+00 | 0.000000E+00 | 4.589857E+06 |
| A20 | 3.150344E−02 | 1.529107E−01 | 0.000000E+00 | 0.000000E+00 | −7.341800E+06 |

| | Surface | | | | |
|---|---|---|---|---|---|
| | 7 | 8 | 9 | 10 | 11 |
| k | 1.707761E+00 | −1.511830E−01 | −4.693982E+00 | 1.419530E+01 | −7.565456E+00 |
| A4 | −3.351104E−03 | 2.247877E−01 | −1.801112E+00 | −1.307624E+00 | −7.443779E−01 |
| A6 | 1.199041E+00 | −2.395828E+00 | 7.238279E+00 | 3.951689E+00 | 1.588520E+00 |
| A8 | −1.478839E+01 | 3.596671E+01 | −1.464858E+01 | −7.541878E+00 | −2.361927E+00 |
| A10 | 8.635234E+01 | −1.573099E+02 | 3.308455E+01 | 8.458061E+00 | 2.110800E+00 |
| A12 | −3.208815E+02 | 3.555173E+02 | −5.018212E+01 | −4.597918E+00 | −1.039543E+00 |
| A14 | 6.681199E+02 | −4.280946E+02 | 2.856991E+01 | 4.267867E−01 | 2.258647E−01 |
| A16 | −6.302459E+02 | 2.073839E+02 | 0.000000E+00 | 3.569766E−01 | −8.705618E−03 |
| A18 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 |

An equation of the aspheric surfaces of the second embodiment is the same as that of the first embodiment, and the definitions are the same as well.

The exact parameters of the second embodiment based on Table 3 and Table 4 are listed in the following table:

| Second embodiment (Reference wavelength: 555 nm) | | | | | |
|---|---|---|---|---|---|
| ETP1 | ETP2 | ETP3 | ETP4 | ETP5 | BL |
| 0.345 | 0.307 | 0.430 | 0.262 | 0.342 | 0.6582 |
| ETP1/TP1 | ETP2/TP2 | ETP3/TP3 | ETP4/TP4 | ETP5/TP5 | EBL/BL |
| 0.989 | 1.032 | 0.859 | 0.841 | 1.249 | 0.8979 |
| ETL | EBL | EIN | EIR | PIR | EIN/ETL |
| 3.162 | 0.591 | 2.572 | 0.046 | 0.113 | 0.813 |
| SETP/EIN | EIR/PIR | SETP | STP | SETP/STP | SED/SIN |
| 0.656 | 0.403 | 1.686 | 1.733 | 0.973 | 1.193 |

-continued

| Second embodiment (Reference wavelength: 555 nm) | | | | | |
|---|---|---|---|---|---|
| ED12 | ED23 | ED34 | ED45 | SED | SIN |
| 0.175 | 0.103 | 0.356 | 0.251 | 0.885 | 0.742 |
| ED12/IN12 | ED23/IN23 | ED34/IN34 | ED45/IN45 | | |
| 2.728 | 0.512 | 1.025 | 1.934 | | |
| $|f/f1|$ | $|f/f2|$ | $|f/f3|$ | $|f/f4|$ | $|f/f5|$ | $|f1/f2|$ |
| 0.06798 | 0.07299 | 0.84116 | 1.12703 | 1.25985 | 1.07379 |
| ΣPPR | ΣNPR | ΣPPR/|ΣNPR| | IN12/f | IN45/f | $|f2/f3|$ |
| 1.2000 | 2.1690 | 0.5533 | 0.0417 | 0.0843 | 11.5236 |
| TP3/(IN23 + TP3 + IN34) | | (TP1 + IN12)/TP2 | | (TP5 + IN45)/TP4 | |
| 0.47751 | | 1.38844 | | 1.29370 | |
| HOS | InTL | HOS/HOI | InS/HOS | ODT % | TDT % |
| 3.13323 | 2.47499 | 2.41948 | 0.72159 | 3.054 | 1.93118 |
| HVT11 | HVT12 | HVT21 | HVT22 | HVT31 | HVT32 |
| 1.07957 | 0 | 0 | 0 | 0 | 0 |
| HVT41 | HVT42 | HVT51 | HVT52 | HVT52/HOI | HVT52/HOS |
| 0.00000 | 0.69364 | 0.24538 | 0.73234 | 0.18948 | 0.07831 |
| TP2/TP3 | TP3/TP4 | InRS51 | InRS52 | |InRS51|/TP5 | |InRS52|/TP5 |
| 0.59501 | 1.60456 | −0.069148 | 0.051513 | 0.25278 | 0.18831 |
| PhiA11 | PhiA12 | PhiA5 | PhiB | PhiC | PhiD |
| 2.38 mm | 2.236 mm | 2.308 mm | 2.3398 mm | 2.5398 mm | 2.7398 mm |
| PhiA5/InTL | PhiA5/2HOI | PhiA11/2HOI | SFR (PhiA11/PhiA5) | RI9 | |
| 0.9325 | 0.9189 | 0.8911 | 1.0312 | 40% | |
| MTFE0 | MTFE3 | MTFE7 | MTFQ0 | MTFQ3 | MTFQ7 |
| 0.82 | 0.79 | 0.76 | 0.6 | 0.5 | 0.46 |

The results of the equations of the second embodiment based on Table 3 and Table 4 are listed in the following table:

| Values related to the inflection points of the second embodiment (Reference wavelength: 555 nm) | | | | | | | |
|---|---|---|---|---|---|---|---|
| HIF111 | 0.4385 | HIF111/HOI | 0.3386 | SGI111 | −0.0368 | |SGI111|/(|SGI111| + TP1) | 0.0953 |
| HIF121 | 0.6491 | HIF121/HOI | 0.5012 | SGI121 | −0.0796 | |SGI121|/(|SGI121| + TP1) | 0.1857 |
| HIF211 | 0.5501 | HIF211/HOI | 0.4248 | SGI211 | 0.1541 | |SGI211|/(|SGI211| + TP2) | 0.3409 |
| HIF411 | 0.4046 | HIF411/HOI | 0.3124 | SGI411 | −0.0815 | |SGI411|/(|SGI411| + TP4) | 0.2072 |
| HIF412 | 0.5721 | HIF412/HOI | 0.4417 | SGI412 | −0.1345 | |SGI412|/(|SGI412| + TP4) | 0.3013 |
| HIF421 | 0.4169 | HIF421/HOI | 0.3219 | SGI421 | −0.1444 | |SGI421|/(|SGI421| + TP4) | 0.3164 |
| HIF511 | 0.1322 | HIF511/HOI | 0.1021 | SGI511 | 0.0017 | |SGI511|/(|SGI511| + TP5) | 0.0061 |
| HIF512 | 0.6996 | HIF512/HOI | 0.5402 | SGI512 | −0.0393 | |SGI512|/(|SGI512| + TP5) | 0.1256 |
| HIF513 | 0.8501 | HIF513/HOI | 0.6564 | SGI513 | −0.0615 | |SGI513|/(|SGI513| + TP5) | 0.1837 |
| HIF521 | 0.2798 | HIF521/HOI | 0.2160 | SGI514 | 0.0447 | |SGI514|/(|SGI514| + TP5) | 0.1406 |

Third Embodiment

Figure 3A:
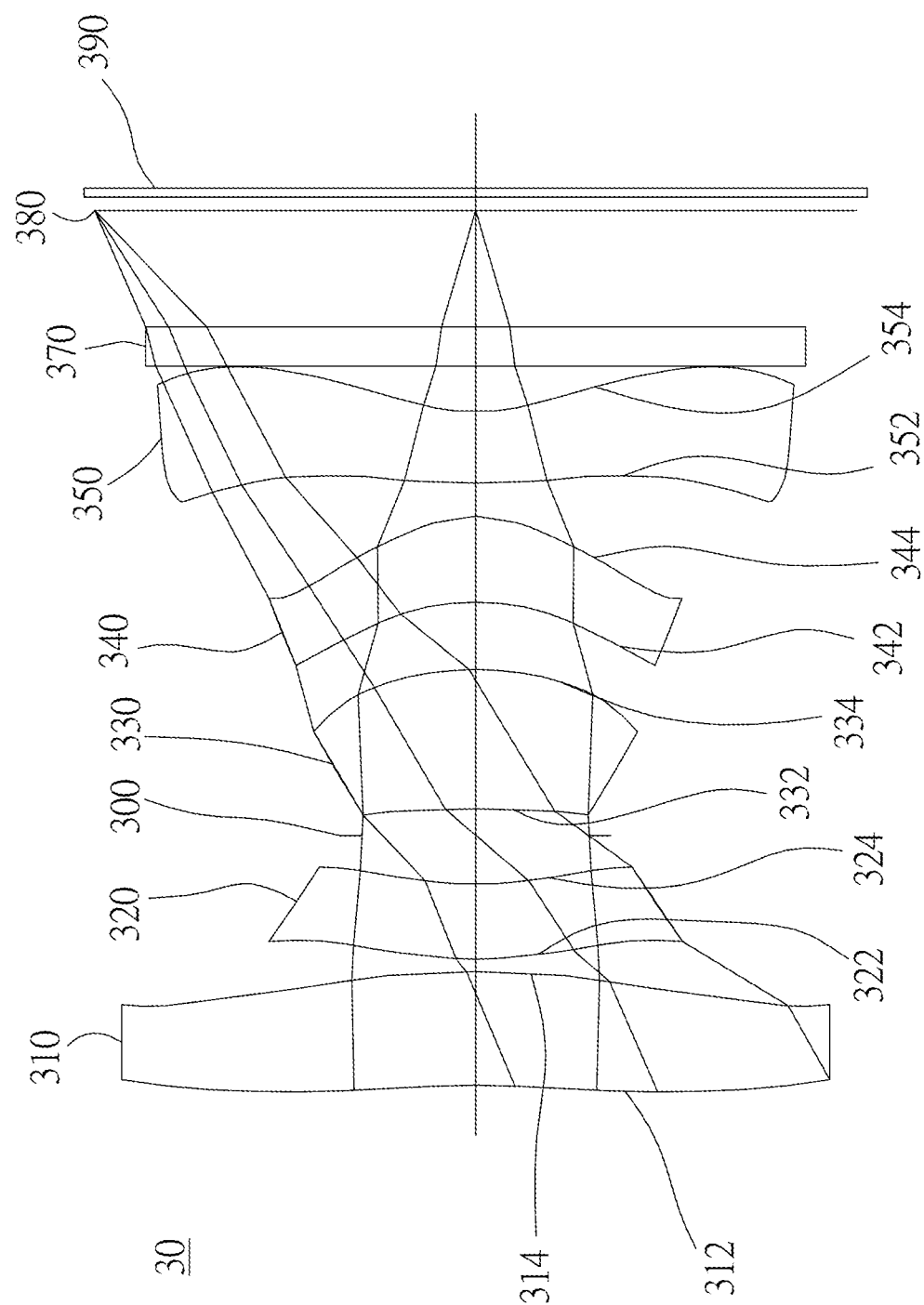
FIG. 3A is a schematic diagram of a third embodiment of the present invention.
Figure 3B:
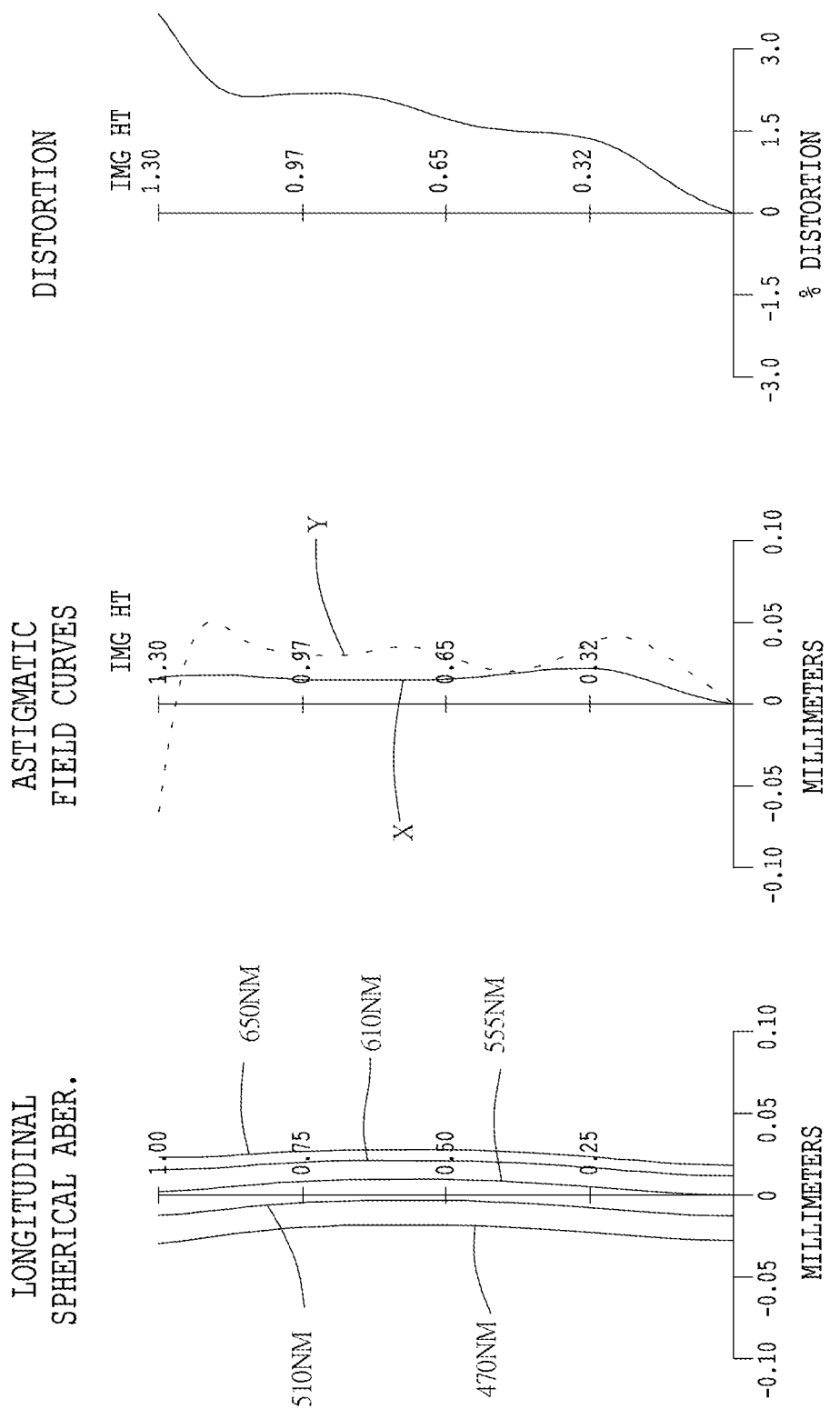
FIG. 3B shows curve diagrams of longitudinal spherical aberration, astigmatic field, and optical distortion of the optical image capturing system in the order from left to right of the third embodiment of the present application.
Figure 3:
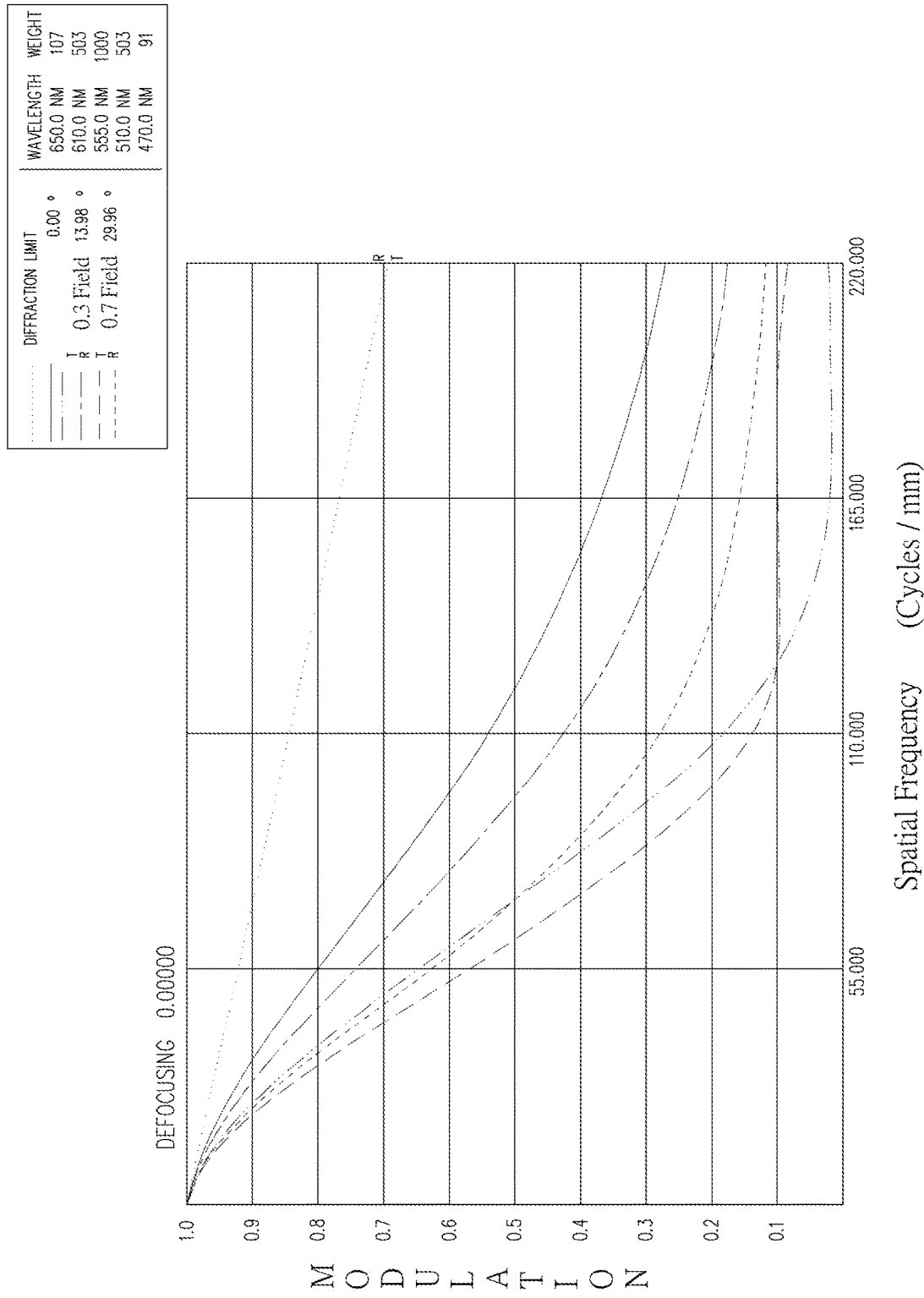
FIG. 3C shows a feature map of modulation transformation of the optical image capturing system f the third embodiment of the present application in visible spectrum.
FIG. 3D is a graphic, showing the relative illuminance of each field of view on the image plane of the optical image capturing; system of the third embodiment of the present invention.
Figure 3D:
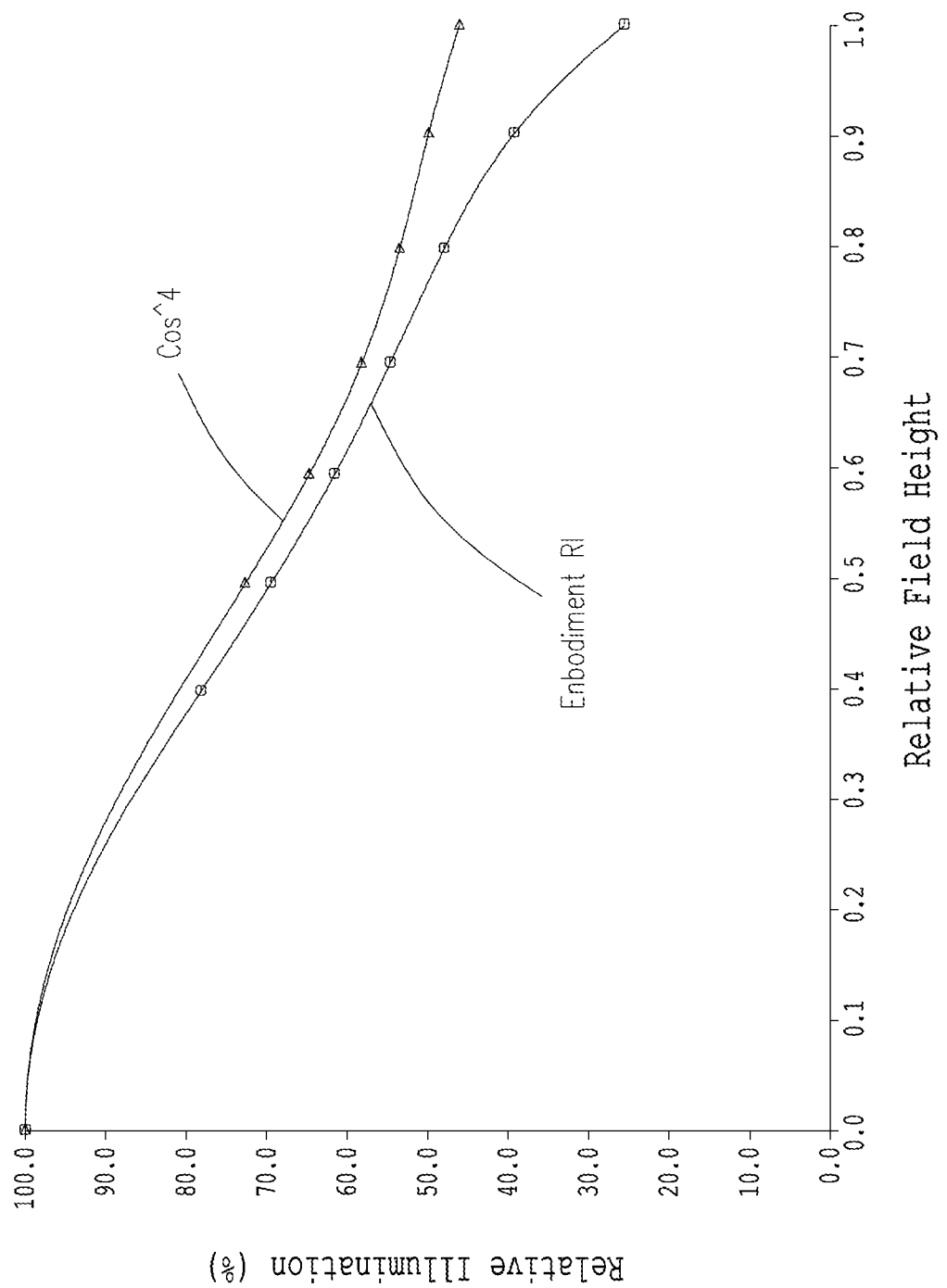

As shown in FIG. 3A and FIG. 3B, an optical image capturing system of the third embodiment of the present invention includes, along an optical axis from an object side to an image side, a first lens 310, a second lens 320, an aperture 300, a third lens 330, a fourth lens 340, a fifth lens 350, an infrared rays filter 370, an image plane 380, and an image sensor 390. FIG. 3C shows a modulation transformation of the optical image capturing system 30 of the third embodiment of the present application. FIG. 3D is a graphic, showing the relative illuminance of each field of view on the image plane of the optical image capturing system of the third embodiment of the present invention.

The first lens 310 has positive refractive power and is made of plastic. An object-side surface 312 thereof, which faces the object side, is a concave aspheric surface, and an image-side surface 314 thereof, which faces the image side, is a convex aspheric surface. The object-side surface 312 and the image-side surface 314 both have an inflection point.

The second lens 320 has negative refractive power and is made of plastic. An object-side surface 322 thereof, which faces the object side, is a convex aspheric surface, and an image-side surface 324 thereof, which faces the image side, is a concave aspheric surface. The object-side surface 322 and the image-side surface 324 both have two inflection points.

The third lens 330 has positive refractive power and is made of plastic. An object-side surface 332 thereof which faces the object side, is a convex surface, and an image-side surface 334 thereof, which faces the image side, is a convex aspheric surface. The object-side surface 332 has two inflection points, and the image-side surface 334 has tin inflection point.

The fourth lens 340 has positive refractive power and is made of plastic. An object-side surface 342, which faces the object side, is a concave aspheric surface, and an image-side surface 344, which faces the image side, is a convex aspheric surface. The object-side surface 342 and the image-side surface 344 both have an inflection point.

The fifth lens 350 has negative refractive power and is made of plastic. An object-side surface 352, which faces the object side, is a convex surface, and an image-side surface 354, which faces the image side, is a concave surface. The object-side surface 352 and the image-side surface 354 both have an inflection point. It may help to shorten the back focal length to keep small in size.

The infrared rays filter 370 is made of glass and between the fifth lens 350 and the image plane 380. The infrared rays filter 390 gives no contribution to the focal length of the system.

The parameters of the lenses of the third embodiment are listed in Table 5 and Table 6.

TABLE 5 f = 1.5576 mm; f/HEP = 1.93; HAF = 38.5078 deg

| Surface | | Radius of curvature (mm) | Thickness (mm) | Material | Refractive index | Abbe number | Focal length (mm) |
|---|---|---|---|---|---|---|---|
| 0 | Object | 1E+18 | 600 | | | | |
| 1 | 1st lens | −3.479539822 | 0.411 | plastic | 1.6355 | 23.891 | 7.348 |
| 2 | | −2.074836314 | 0.048 | | | | |
| 3 | 2nd lens | 1.354556207 | 0.274 | plastic | 1.6355 | 23.891 | −32.519 |
| 4 | | 1.171187237 | 0.176 | | | | |
| 5 | Aperture | 1E + 18 | 0.090 | | | | |
| 6 | 3rd lens | 14.85277375 | 0.517 | plastic | 1.5445 | 55.961 | 1.839 |
| 7 | | −1.054796268 | 0.243 | | | | |
| 8 | 4th lens | −0.753667578 | 0.310 | plastic | 1.6355 | 23.891 | 1.374 |
| 9 | | −0.466292661 | 0.125 | | | | |
| 10 | 5th lens | 2.491627717 | 0.261 | plastic | 1.6355 | 23.891 | −1.228 |
| 11 | | 0.565274578 | 0.166 | | | | |
| 12 | Infrared rays filter | 1E+18 | 0.145 | BK_7 | 1.517 | 23.89 | |
| 13 | | 1E+18 | 0.425 | | | | |
| 14 | Image plane | 1E+18 | 0.000 | | | | |

Reference wavelength: 555 nm; the position of blocking light: he clear aperture of the second surface is 1.074 mm; the clear aperture of the seventh surface is 0.550 mm; the clear aperture of the eleventh surface is 1.145.

TABLE 6

Coefficients of the aspheric surfaces

| | Surface | | | | |
|---|---|---|---|---|---|
| | 1 | 2 | 3 | 4 | 6 |
| k | −2.394145E+01 | −1.711018E+01 | 0.000000E+00 | 0.000000E+00 | −4.440465E+02 |
| A4 | 1.075266E−01 | 5.004383E−02 | −4.232571E−01 | −4.530624E−01 | −1.498334E−01 |
| A6 | −8.472163E−02 | −6.507436E−02 | 1.785630E−03 | −8.828287E−01 | −3.376742E+00 |
| A8 | 4.034019E−02 | −1.300507E−01 | −2.119148E+00 | 5.609652E+01 | 3.639328E+01 |
| A10 | −2.095356E+01 | 5.495669E−01 | 5.794099E+00 | −8.021996E+02 | −2.396738E+01 |
| A12 | 6.643886E−01 | −3.772797E−01 | 1.433358E+01 | 5.764079E+03 | −8.904600E+03 |
| A14 | −8.982875E−01 | −6.0333942E−01 | −7.471523E+01 | −2.050736E+04 | 1.486657E+05 |
| A16 | 6.207288E−01 | 1.141976E+00 | 6.391191E+01 | 2.644244E+04 | −1.167773E+06 |
| A18 | −2.188432E−01 | −6.967751E−01 | 0.000000E+00 | 0.000000E+00 | 4.589857E+06 |
| A20 | 3.150344E−02 | 1.529107E−01 | 0.000000E+00 | 0.000000E+00 | −7.341800E+06 |

| | Surface | | | | |
|---|---|---|---|---|---|
| | 7 | 8 | 9 | 10 | 11 |
| k | 1.707761E+00 | −1.511830E−01 | −4.693982E+00 | 1.419530E+01 | −7.565456E+00 |
| A4 | −3.351104E−03 | 2.247877E−01 | −1.801112E+00 | −1.307624E+00 | −7.443779E−01 |

TABLE 6-continued

| Coefficients of the aspheric surfaces | | | | | |
|---|---|---|---|---|---|
| A6  | 1.199041E+00  | −2.395828E+00 | 7.238279E+00  | 3.951689E+00  | 1.588520E+00 |
| A8  | −1.478839E+01 | 3.596671E+01  | −1.464858E+01 | −7.541878E+00 | −2.361927E+00 |
| A10 | 8.635234E+01  | −1.573099E+02 | 3.308455E+01  | 8.458061E+00  | 2.110800E+00 |
| A12 | −3.208815E+02 | 3.555173E+02  | 9             | 10            | 11 |
| A14 | 6.681199E+02  | −4.280946E+02 | −4.692983E+00 | 1.419530E+01  | −7.565456E+00 |
| A16 | −6.302459E+02 | 2.073839E+02  | −1.801112E+00 | −1.307624E+00 | −7.443779E−01 |
| A18 | 0.000000E+00  | 0.000000E+00  | 7.238279E+00  | 3.951689E+00  | 1.588520E+00 |
| A20 | 0.000000E+00  | 0.000000E+00  | −1.464858E+01 | −7.541878E+00 | −2.361927E+00 |

An equation of the aspheric surfaces of the third embodiment is the same as that of the first embodiment; and the definitions are the same as well.

The exact parameters of the third embodiment based on Table 5 and Table 6 are listed in the following table:

| Third embodiment (Reference wavelength: 555 nm) | | | | | |
|---|---|---|---|---|---|
| ETP1 | ETP2 | ETP3 | ETP4 | ETP5 | BL |
| 0.407 | 0.284 | 0.444 | 0.259 | 0.331 | 0.7363 |
| ETP1/TP1 | ETP2/TP2 | ETP3/TP3 | ETP4/TP4 | ETP5/TP5 | EBL/BL |
| 0.990 | 1.037 | 0.859 | 0.835 | 1.268 | 0.9059 |
| ETL | EBL | EIN | EIR | PIR | EIN/ETL |
| 3.221 | 0.667 | 2.553 | 0.097 | 0.166 | 0.793 |
| SETP/EIN | EIR/PIR | SETP | STP | SETP/STP | SED/SIN |
| 0.675 | 0.584 | 1.724 | 1.773 | 0.973 | 1.216 |
| ED12 | ED23 | ED34 | ED45 | SED | SIN |
| 0.163 | 0.164 | 0.253 | 0.250 | 0.829 | 0.682 |
| ED12/IN12 | ED23/IN23 | ED34/IN34 | ED45/IN45 | | |
| 3.409 | 0.616 | 1.040 | 2.000 | | |
| \|f/f1\| | \|f/f2\| | \|f/f3\| | \|f/f4\| | \|f/f5\| | \|f1/f2\| |
| 0.21196 | 0.04790 | 0.84707 | 1.13389 | 1.26887 | 0.22597 |
| ΣPPR | ΣNPR | ΣPPR/\|ΣNPR\| | IN12/f | IN45/f | \|f2/f3\| |
| 2.4507 | 1.0590 | 2.3140 | 0.0306 | 0.0803 | 17.6850 |
| TP3/(IN23 + TP3 + IN34) | | (TP1 + IN12)/TP2 | | (TP5 + IN45)/TP4 | |
| 0.50380 | | 1.67344 | | 1.24433 | |
| HOS | InTL | HOS/HOI | InS/HOS | ODT % | TDT % |
| 3.19040 | 2.45413 | 2.46363 | 0.71529 | 2.52388 | 0.965601 |
| HVT11 | HVT12 | HVT21 | HVT22 | HVT31 | HVT32 |
| 0.67381 | 0 | 0 | 0 | 0.170472 | 0 |
| HVT41 | HVT42 | HVT51 | HVT52 | HVT52/HOI | HVT52/HOS |
| 0.00000 | 0.00000 | 0.52556 | 0.79745 | 0.40584 | 0.16473 |
| TP2/TP3 | TP3/TP4 | InRS51 | InRS52 | \|InRS51\|/TP5 | \|InRS52\|/TP5 |
| 0.53032 | 1.66591 | −0.027444 | 0.114868 | 0.10518 | 0.44024 |
| PhiA11 | PhiA12 | PhiA5 | PhiB | PhiC | PhiD |
| 2.668 mm | 2.148 mm | 2.90 mm | 2.3398 mm | 2.5398 mm | 2.7398 mm |

-continued

| Third embodiment (Reference wavelength: 555 nm) | | | | | |
|---|---|---|---|---|---|
| PhiA5/InTL | PhiA5/2HOI | PhiA11/2HOI | SFR (PhiA11/PhiA5) | RI9 | |
| 1.1817 | 1.1197 | 1.0301 | 0.92 | 30% | |
| MTFE0 | MTFE3 | MTFE7 | MTFQ0 | MTFQ3 | MTFQ7 |
| 0.8 | 0.65 | 0.57 | 0.54 | 0.18 | 0.14 |

The results of the equations of the third embodiment based on Table 5 and Table 6 are listed in the following table:

| Values related to the inflection points of the third embodiment (Reference wavelength: 555 nm) | | | | | | | |
|---|---|---|---|---|---|---|---|
| HIF111 | 0.3132 | HIF111/HOI | 0.2418 | SGI111 | −0.0112 | \|SGI111\|/(\|SGI111\| + TP1) | 0.0265 |
| HIF121 | 0.6824 | HIF121/HOI | 0.5269 | SGI121 | −0.0703 | \|SGI121\|/(\|SGI121\| + TP1) | 0.1462 |
| HIF211 | 0.3238 | HIF211/HOI | 0.2500 | SGI211 | 0.0333 | \|SGI211\|/(\|SGI211\| + TP2) | 0.1084 |
| HIF212 | 0.6654 | HIF212/HOI | 0.5138 | SGI212 | 0.0683 | \|SGI212\|/(\|SGI212\| + TP2) | 0.1995 |
| HIF221 | 0.3064 | HIF221/HOI | 0.2366 | SGI221 | 0.0325 | \|SGI221\|/(\|SGI221\| + TP2) | 0.1061 |
| HIF222 | 0.5108 | HIF222/HOI | 0.3945 | SGI222 | 0.0603 | \|SGI222\|/(\|SGI222\| + TP2) | 0.1805 |
| HIF311 | 0.1011 | HIF311/HOI | 0.0781 | SGI311 | 0.0003 | \|SGI311\|/(\|SGI311\| + TP3) | 0.0006 |
| HIF411 | 0.4848 | HIF411/HOI | 0.3743 | SGI411 | −0.1570 | \|SGI411\|/(\|SGI411\| + TP4) | 0.3362 |
| HIF421 | 0.4760 | HIF421/HOI | 0.3676 | SGI421 | −0.1922 | \|SGI421\|/(\|SGI421\| + TP4) | 0.3826 |
| HIF511 | 0.3249 | HIF511/HOI | 0.2509 | SGI511 | 0.0159 | \|SGI511\|/(\|SGI511\| + TP5) | 0.0576 |
| HIF521 | 0.3498 | HIF521/HOI | 0.2701 | SGI521 | 0.0739 | \|SGI521\|/(\|SGI521\| + TP5) | 0.2207 |

Fourth Embodiment

Figure 4A:
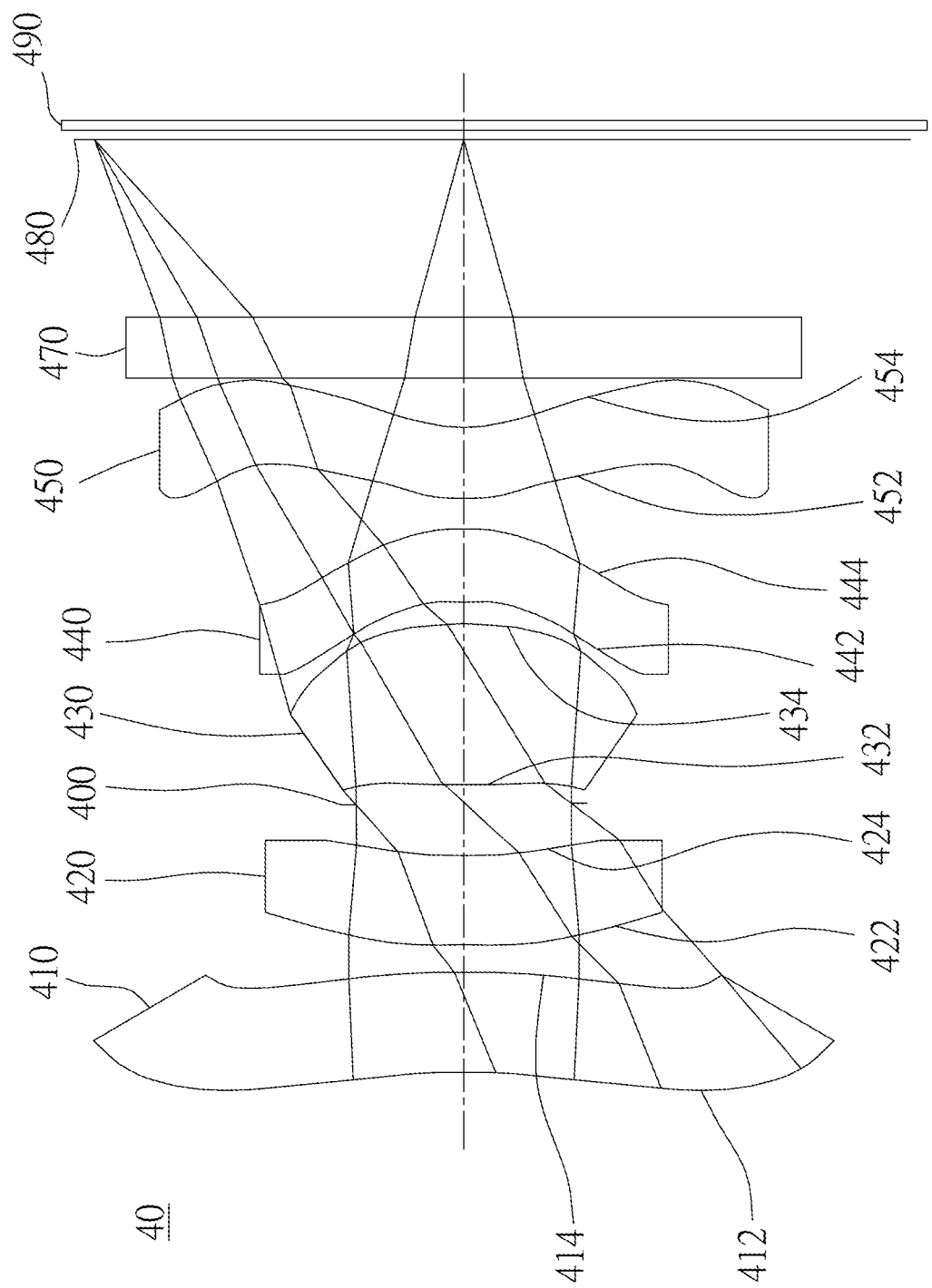
FIG. 4A is a schematic diagram of a fourth embodiment of the present invention.
Figure 4B:
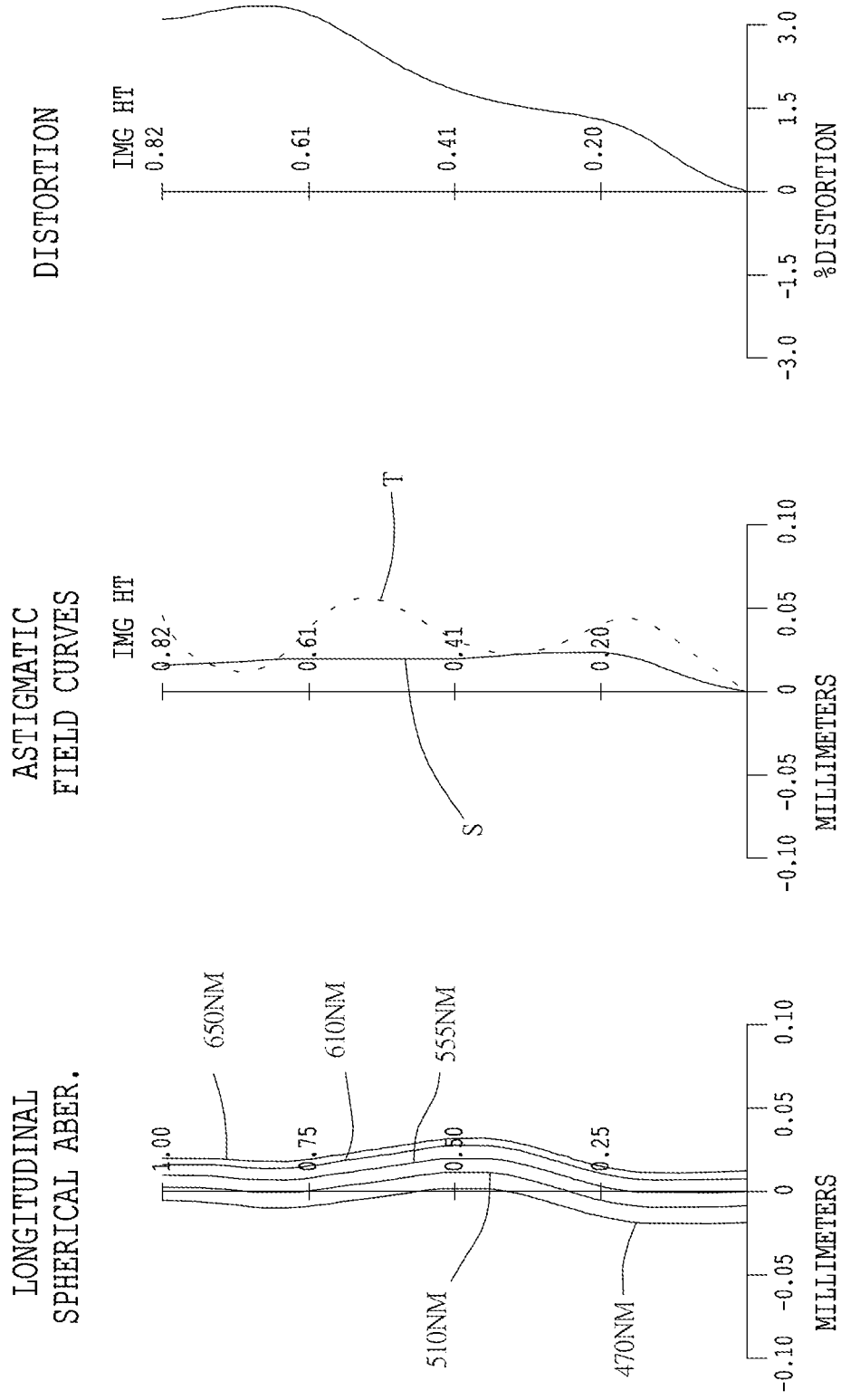
FIG. 4B shows curve diagrams of longitudinal spherical aberration, astigmatic field, and optical distortion of the optical image capturing system in the order from left to right of the fourth embodiment of the present application.
Figure 4C:
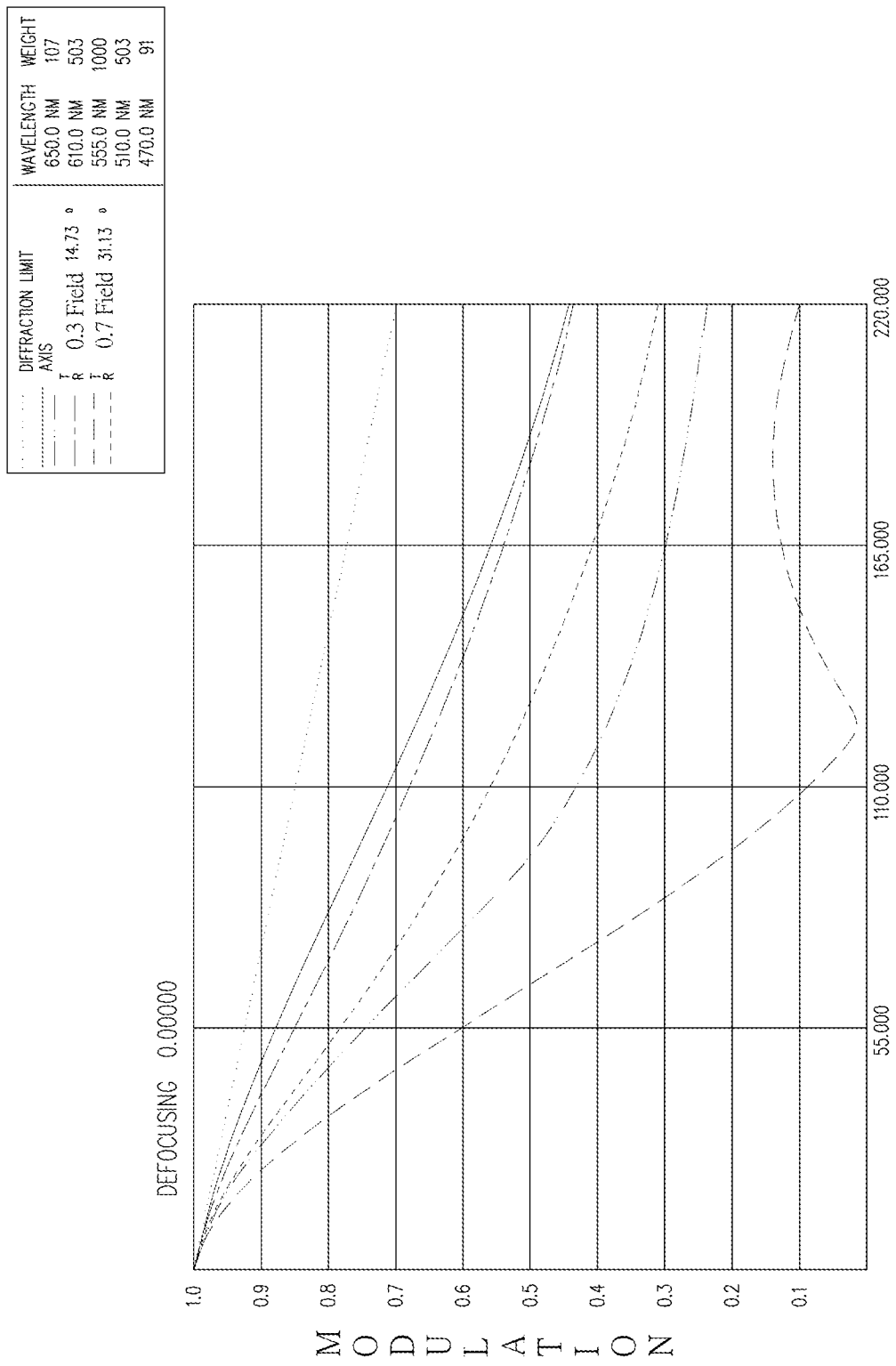
FIG. 4C shows a feature map of modulation transformation of the optical image capturing system of the fourth embodiment in visible spectrum.
Figure 4D:
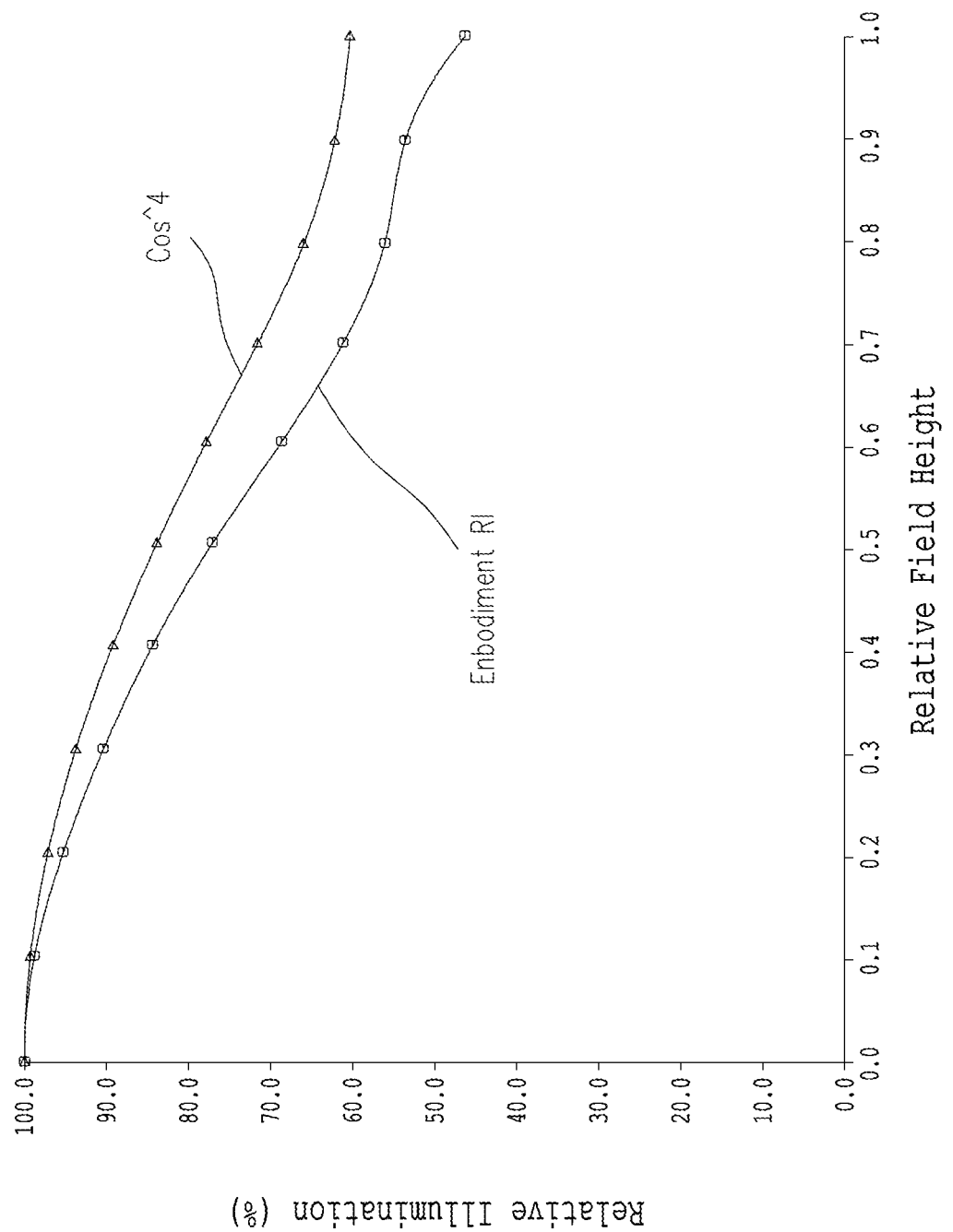
FIG. 4D is a graphic, showing the relative illuminance of each field of view on the image plane of the optical image capturing system of the fourth embodiment of the present invention.

As shown in FIG. 4A and FIG. 4B, an optical image capturing system 40 of the fourth embodiment of the present invention includes, along an optical axis from an object side to an image side, a first lens 410, a second lens 420, an aperture 400, a third lens 430, a fourth lens 440, a fifth lens 450, an infrared rays filter 470, an image plane 480, and an image sensor 490. FIG. 4C shows a modulation transformation of the optical image capturing system 40 of the fourth embodiment of the present application. FIG. 4D is a graphic, showing the relative illuminance of each field of view an the image plane of the optical image capturing system of the fourth embodiment of the present invention.

The first lens 410 has positive refractive power and is made of plastic. An object-side surface 412 thereof, which faces the object side, is a convex aspheric surface, and an image-side surface 414 thereof, which faces the image side, is a convex aspheric surface. The object-side surface 412 and the image-side surface 414 both have an inflection point.

The second lens 420 has positive refractive power and is made of plastic. An object-side surface 422 thereof, which faces the of side, is a convex aspheric surface, and an image-side surface 424 thereof, which faces the image side, is a concave aspheric surface. The object-side surface and the image-side surface both have an inflection point.

The third lens 430 has positive refractive power and is made of plastic. An object-side surface 432 thereof, which faces the object side, is a convex aspheric surface, and an image-side surface 434 thereof, which faces the image side, is a concave aspheric surface. The object-side surface 432 has an inflection point.

The fourth lens 440 has negative refractive power and is made of plastic. An object-side surface 442, which faces the object side, is a concave aspheric surface, and an image-side surface 444, which faces the image side, is a convex aspheric surface. The object-side surface 442 and the image-side surface 444 both have an inflection point.

The fifth lens 450 has positive refractive power and is made of plastic. An object-side surface 452, which faces the object side, is a convex surface, and an image-side surface 454, which faces the image side, is a concave surface. The object-side surface 452 and the image-side surface 454 both have an inflection point. It may help to shorten the back focal length to keep small in size.

The infrared rays filter 470 is made of glass and between the fifth lens 450 and the image plane 480. The infrared rays filter 470 gives no contribution to the focal length of the system.

The parameters of the lenses of the fourth embodiment are listed in Table 7 and Table 8.

TABLE 7

| f = 0.9177 mm; f/HEP = 1.93; HAF = 40.2315 deg | | | | | | |
|---|---|---|---|---|---|---|
| Surface | Radius of curvature (mm) | Thickness (mm) | Material | Refractive index | Abbe number | Focal length (mm) |
| 0 | Object | 1E+18 | 600 | | | |
| 1 | 1st lens | −1.184308122 | 0.241 | plastic | 1.6355 | 23.891 | 53.555 |
| 2 | | −1.235610651 | 0.057 | | | | |
| 3 | 2nd lens | 0.908142677 | 0.215 | plastic | 1.6355 | 23.891 | 27.228 |

TABLE 7-continued f = 0.9177 mm; f/HEP = 1.93; HAF = 40.2315 deg

| Surface | Radius of curvature (mm) | | Thickness (mm) | Material | Refractive index | Abbe number | Focal length (mm) |
|---|---|---|---|---|---|---|---|
| 4 | | 0.869438929 | 0.124 | | | | |
| 5 | Aperture | 1E+18 | 0.049 | | | | |
| 6 | 3$^{rd}$ lens | 4.27316199 | 0.383 | plastic | 1.5445 | 55.961 | 1.163 |
| 7 | | −0.722367077 | 0.055 | | | | |
| 8 | 4$^{th}$ lens | −0.368454108 | 0.170 | plastic | 1.6355 | 23.891 | −18.644 |
| 9 | | −0.448803108 | 0.072 | | | | |
| 10 | 5$^{th}$ lens | 0.360477164 | 0.170 | plastic | 1.6355 | 23.891 | 3.488 |
| 11 | | 0.350710739 | 0.117 | | | | |
| 12 | Infrared rays filter | 1E+18 | 0.145 | BK_7 | | | |
| 13 | | 1E+18 | 0.426 | | | | |
| 14 | Image plane | 1E+18 | 0.000 | | | | |

Reference wavelength: 555 nm; the position of blocking light: the clear aperture of the first surface is 0.821 mm; the clear aperture of the seventh surface is 0.388 mm; the clear aperture of the eleventh surface is 0.677 mm.

TABLE 8

Coefficients of the aspheric surfaces

| | Surface | | | | |
|---|---|---|---|---|---|
| | 1 | 2 | 3 | 4 | 6 |
| k | −1.788962E+01 | −3.634530E+01 | 7.830158E−01 | −2.774909E+01 | −1.800000E+03 |
| A4 | 1.067004E+00 | 9.269361E−01 | −1.107369E−01 | 2.177464E+00 | 5.624783E+00 |
| A6 | −3.124203E+00 | −1.425227E+00 | −2.384623E+01 | −3.314413E+01 | −9.991888E+02 |
| A8 | −4.598062E+00 | −1.394784E+02 | 2.758191E+01 | −7.184930E+02 | 8.099465E+04 |
| A10 | 7.001059E+01 | 1.820143E+03 | 2.018095E+03 | 3.021844E+04 | −4.044182E+06 |
| A12 | −2.612422E+02 | −1.106251E+04 | −1.506170E+04 | −3.793327E+05 | 1.250419E+08 |
| A14 | 5.790262E+02 | 3.834898E+04 | 4.587788E+04 | 2.040964E+06 | −2.410429E+09 |
| A16 | −8.055343E+02 | −7.592161E+04 | −6.124189E+04 | −4.079666E+06 | 2.812982E+10 |
| A18 | 6.346599E+02 | 7.905593E+04 | 0.000000E+00 | 0.000000E+00 | −1.816487E+11 |
| A20 | −2.120885E+02 | −3.344648E+04 | 0.000000E+00 | 0.000000E+00 | 4.979272E+11 |

| | Surface | | | | |
|---|---|---|---|---|---|
| | 7 | 8 | 9 | 10 | 11 |
| k | 7.255160E−01 | −6.565487E−01 | −3.486087E+00 | −6.071184E+00 | −4.983251E+00 |
| A4 | 3.211773E+00 | 1.025865E+01 | −5.795994E+00 | −3.767814E−01 | −6.757927E−01 |
| A6 | −2.241612E+02 | −3.295595E+02 | 3.956260E−01 | −5.968879E+01 | −2.692762E+01 |
| A8 | 3.342122E+03 | 4.542494E+03 | 7.584764E+02 | 1.049176E+03 | 4.096042E+02 |
| A10 | −3.464988E+04 | −3.036191E+04 | −7.247939E+03 | −9.593302E+03 | −3.046969E+03 |
| A12 | 2.604257E+05 | 1.125596E+05 | 3.264242E+04 | 5.330466E+04 | 1.324992E+04 |
| A14 | −1.163128E+06 | −2.296349E+05 | −7.544438E−04 | −1.877002E+05 | −3.536891E+04 |
| A16 | 2.162128E+06 | 2.136159E+05 | 7.278173E+04 | 4.064750E+05 | 5.687463E+04 |
| A18 | 0.000000E+00 | 0.000000E+00 | 0.000000E+00 | −4.892196E+05 | −5.030931E+04 |
| A20 | 0.000000E+00 | 0.000000E+00 | 0.000000E+00 | 2.488401E+05 | 1.872285E+04 |

An equation of the aspheric surfaces of the fourth embodiment is the same as that of the first embodiment, and the definitions are the same as well.

The exact parameters of the fourth embodiment based on Table 7 and Table 8 are listed in the following table:

| Fourth embodiment (Reference wavelength: 555 nm) | | | | | |
|---|---|---|---|---|---|
| ETP1 | ETP2 | ETP3 | ETP4 | ETP5 | BL |
| 0.243 | 0.212 | 0.335 | 0.176 | 0.175 | 0.6871 |
| ETP1/TP1 | ETP2/TP2 | ETP3/TP3 | ETP4/TP4 | ETP5/TP5 | EBL/BL |

-continued

| Fourth embodiment (Reference wavelength: 555 nm) | | | | | |
|---|---|---|---|---|---|
| 1.008 | 0.987 | 0.874 | 1.035 | 1.031 | 0.9169 |
| ETL | EBL | EIN | EIR | PIR | EIN/ETL |
| 2.242 | 0.630 | 1.612 | 0.060 | 0.117 | 0.719 |
| SETP/EIN | EIR/PIR | SETP | SIP | SETP/STP | SED/SIN |
| 0.708 | 0.512 | 1.142 | 1.180 | 0.968 | 1.317 |
| ED12 | ED23 | ED34 | ED45 | SED | SIN |
| 0.103 | 0.142 | 0.031 | 0.194 | 0.470 | 0.357 |
| ED12/IN12 | ED23/IN23 | ED34/IN34 | ED45/IN45 | | |
| 1.801 | 0.821 | 0.568 | 2.700 | | |
| \|f/f1\| | \|f/f2\| | \|f/f3\| | \|f/f4\| | \|f/f5\| | \|f1/f2\| |
| 0.01714 | 0.03371 | 0.78937 | 0.04923 | 0.26308 | 1.96687 |
| ΣPPR | ΣNPR | ΣPPR/\|ΣNPR\| | IN12/f | IN45/f | \|f2/f3\| |
| 0.3460 | 0.8065 | 0.4290 | 0.0621 | 0.0784 | 23.4194 |
| TP3/(IN23 + TP3 + IN34) | | (TP1 + IN12)/TP2 | | (TP5 + IN45)/TP4 | |
| 0.62723 | | 1.38392 | | 1.42059 | |
| HOS | InTL | HOS/HOI | InS/HOS | ODT % | TDT % |
| 2.22342 | 1.53628 | 2.70489 | 0.71356 | 3.25086 | 1.08352 |
| HVT11 | HVT12 | HVT21 | HVT22 | HVT31 | HVT32 |
| 0.54037 | 0.470954 | 0 | 0 | 0.151293 | 0 |
| HVT41 | HVT42 | HVT51 | HVT52 | HVT52/HOI | HVT52/HOS |
| 0.00000 | 0.00000 | 0.41692 | 0.48222 | 0.50720 | 0.18751 |
| TP2/TP3 | TP3/TP4 | InRS51 | InRS52 | \|InRS51\|/TP5 | \|InRS52\|/TP5 |
| 0.56151 | 2.24954 | 0.044406 | 0.07014 | 0.26118 | 0.41254 |
| PhiA11 | PhiA12 | PhiA5 | PhiB | PhiC | PhiD |
| 1.642 mm | 1.250 mm | 1.354 mm | 2.3398 mm | 2.5398 mm | 2.7398 mm |
| PhiA5/InTL | PhiA5/2HOI | PhiA11/2HOI | SFR (PhiA11/PhiA5) | RI9 | |
| 0.8813 | 0.8236 | 0.9988 | 1.2127 | 48% | |
| MTFE0 | MTFE3 | MTFE7 | MTFQ0 | MTFQ3 | MTFQ7 |
| 0.88 | 0.74 | 0.6 | 0.71 | 0.44 | 0.09 |

The results of the equations of the fourth embodiment based on Table 7 and Table 8 are listed in the following table:

Values related to the inflection points of the fourth embodiment
(Reference wavelength: 555 nm)

| | | | | | | | |
|---|---|---|---|---|---|---|---|
| HIF111 | 0.2270 | HIF111/HOI | 0.2761 | SGI111 | −0.0167 | \|SGI111\|/(\|SGI111\| + TP1) | 0.0650 |
| HIF121 | 0.3408 | HIF121/HOI | 0.4146 | SGI121 | −0.0273 | \|SGI121\|/(\|SGI121\| + TP1) | 0.1017 |
| HIF211 | 0.4092 | HIF211/HOI | 0.4978 | SGI211 | 0.0743 | \|SGI211\|/(\|SGI211\| + TP2) | 0.2566 |
| HIF221 | 0.2687 | HIF221/HOI | 0.3269 | SGI221 | 0.0315 | \|SGI221\|/(\|SGI221\| + TP2) | 0.1279 |
| HIF311 | 0.0877 | HIF311/HOI | 0.1066 | SGI311 | 0.0008 | \|SGI311\|/(\|SGI311\| + TP3) | 0.0022 |

-continued

Values related to the inflection points of the fourth embodiment
(Reference wavelength: 555 nm)

| HIF411 | 0.2845 | HIF411/HOI | 0.3461 | SGI411 | −0.1073 | \|SGI411\|/(\|SGI411\| + TP4) | 0.3865 |
| HIF421 | 0.2930 | HIF421/HOI | 0.3564 | SGI421 | −0.1029 | \|SGI421\|/(\|SGI421\| + TP4) | 0.3766 |
| HIF511 | 0.1834 | HIF511/HOI | 0.2231 | SGI511 | 0.0353 | \|SGI511\|/(\|SGI511\| + TP5) | 0.1720 |
| HIF521 | 0.2103 | HIF521/HOI | 0.2558 | SGI521 | 0.0468 | \|SGI521\|/(\|SGI521\| + TP5) | 0.2157 |

Fifth Embodiment

Figure 5A:
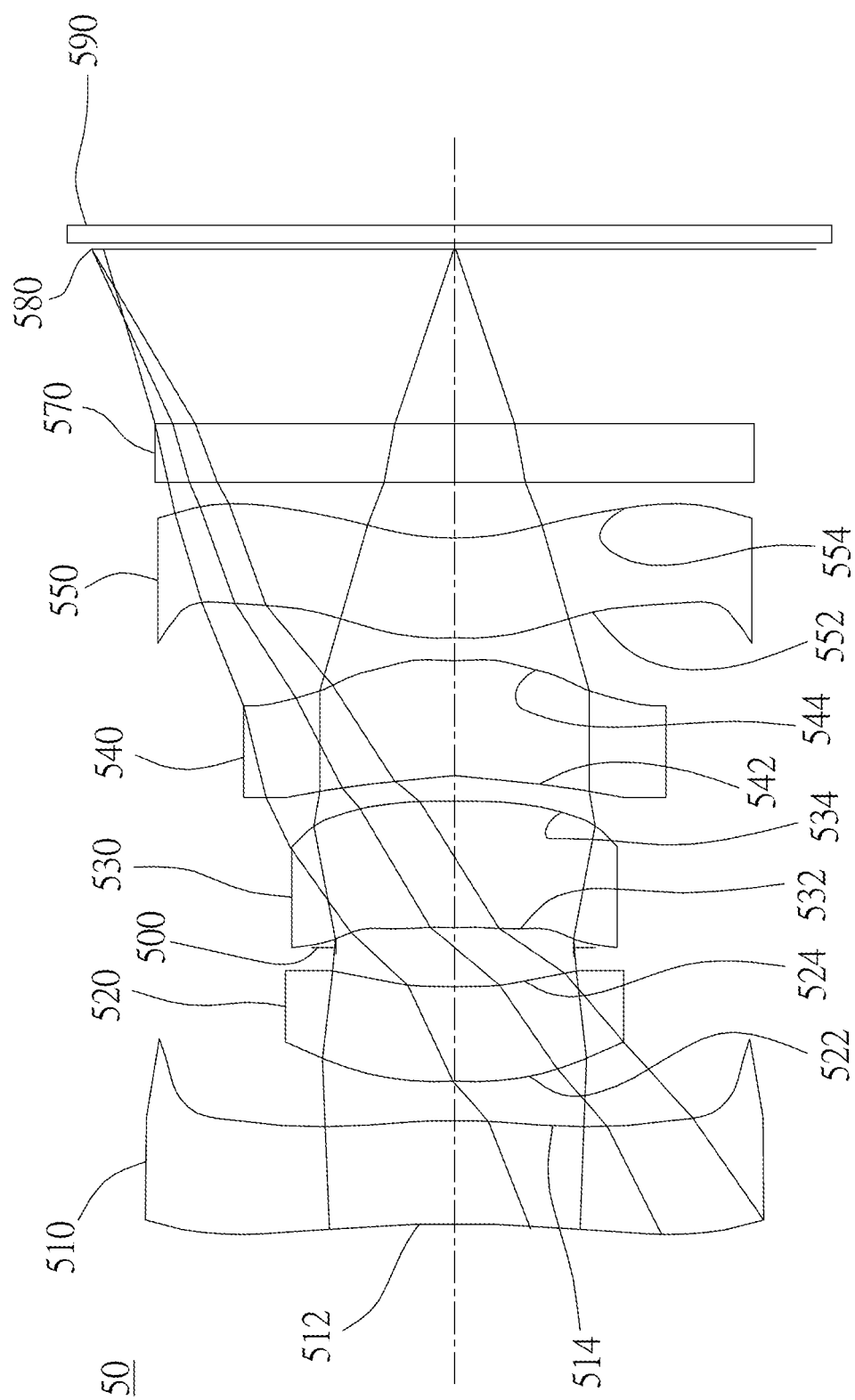
FIG. 5A is a schematic diagram of a fifth embodiment of the present invention.
Figure 5B:
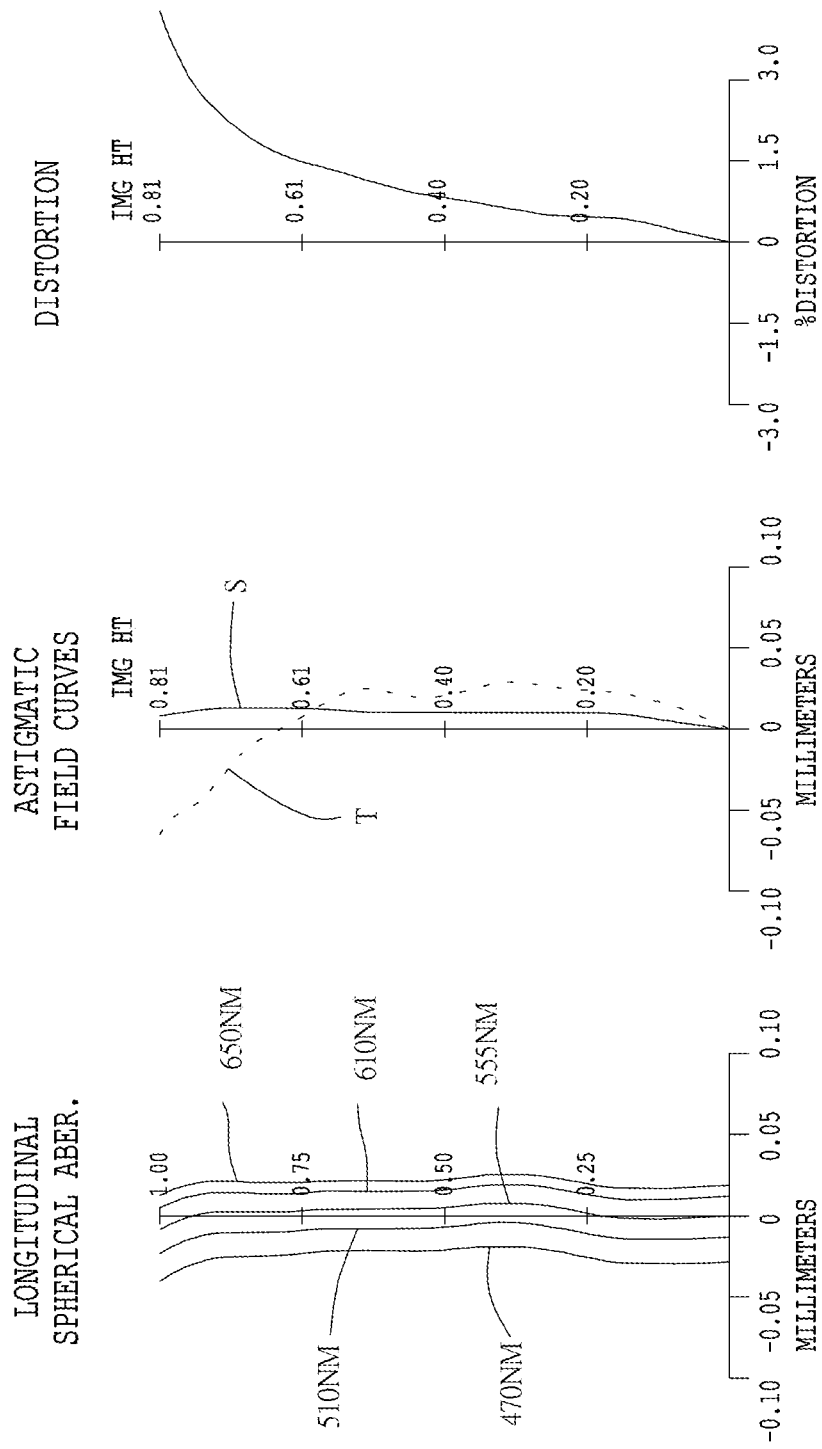
FIG. 5B shows curve diagrams of longitudinal spherical aberration, astigmatic field, and optical distortion of the optical image capturing system in the order from left to right of the fifth embodiment of the present application.
Figure 5C:
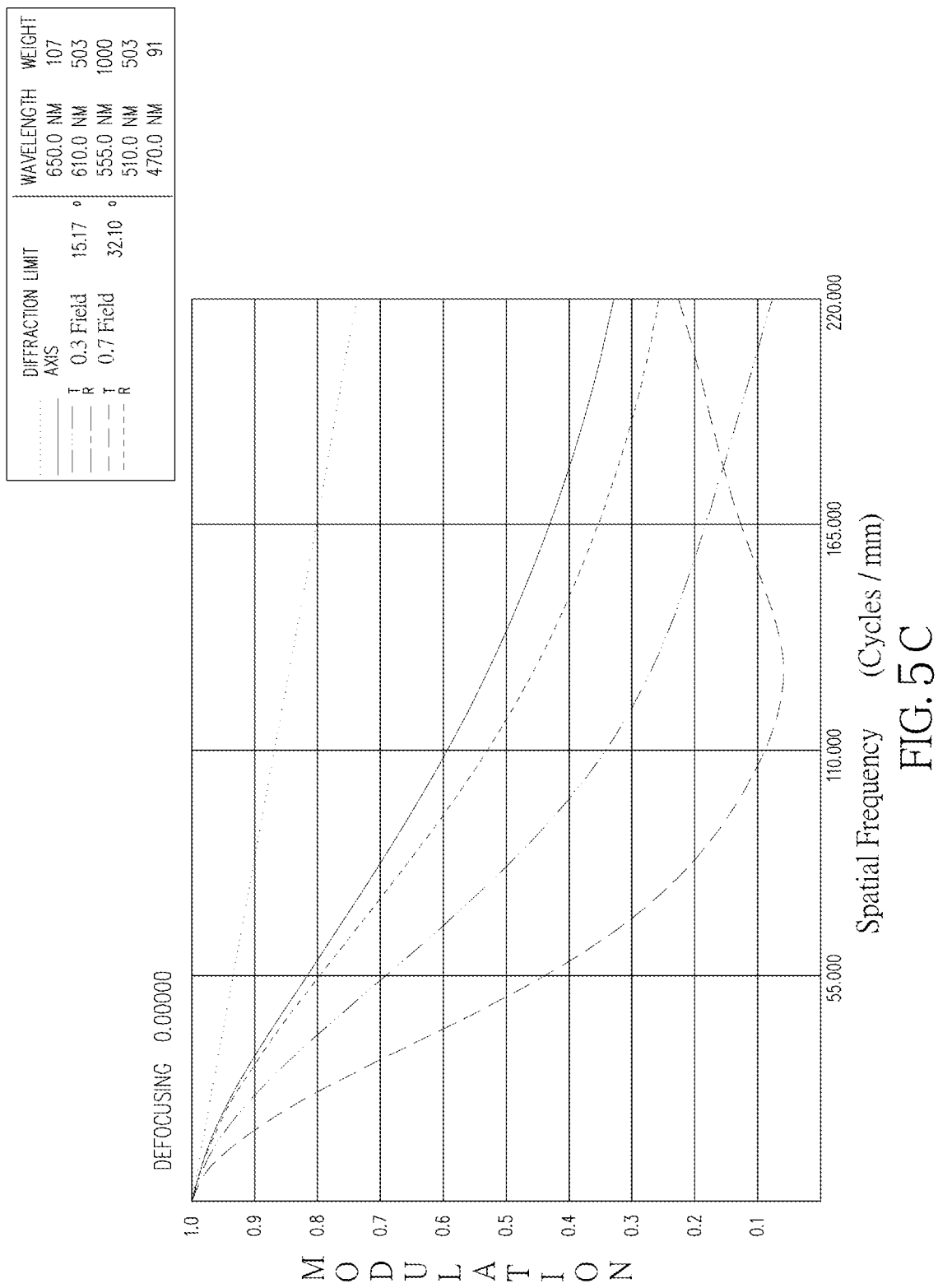
FIG. 5C shows a feature map of modulation transformation of the optical image capturing system of the fifth embodiment of the present application in visible spectrum.
Figure 5D:
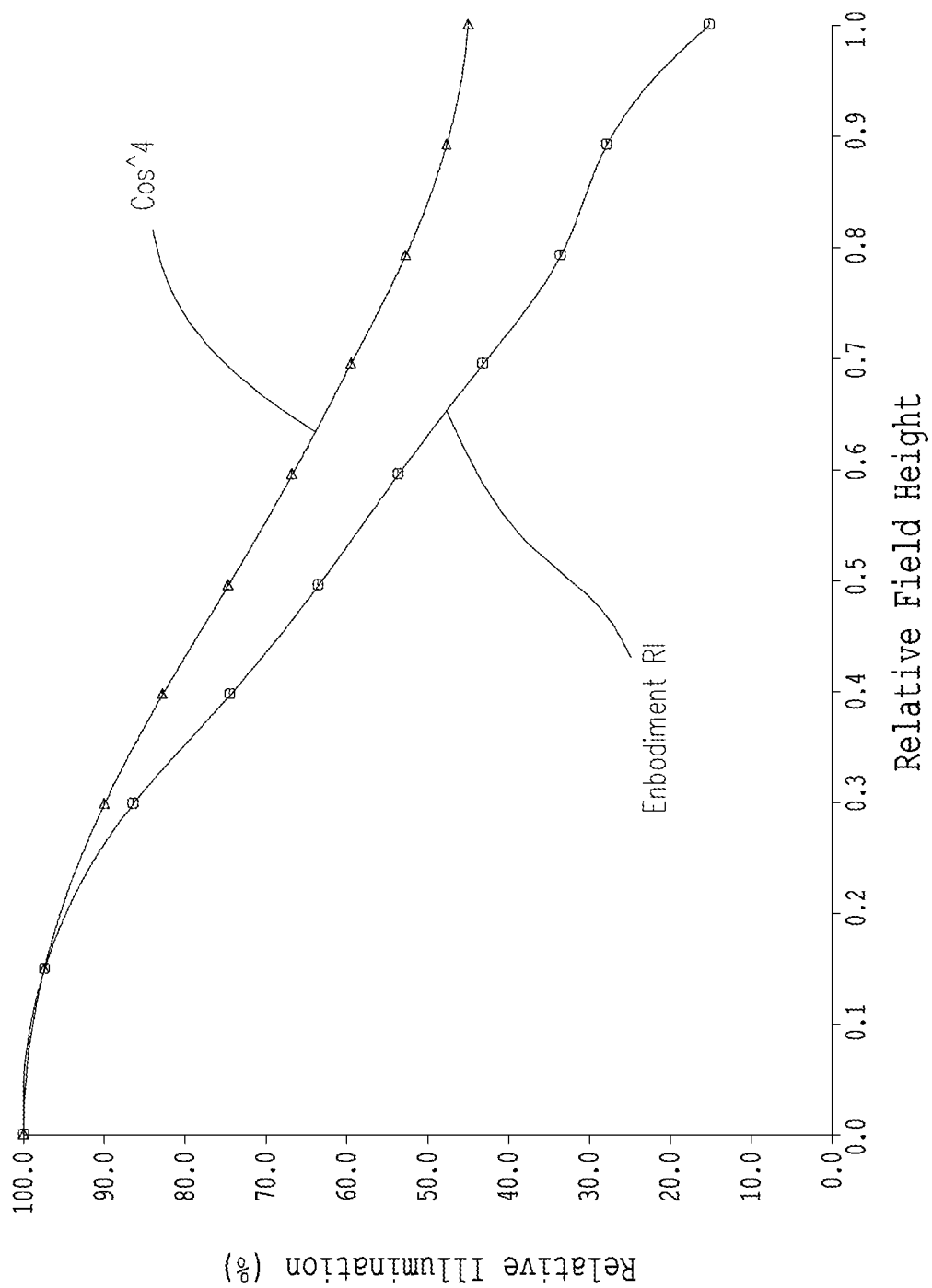
FIG. 5D is a graphic, showing the relative illuminance of each field of view on the image plane of the optical image capturing system of the fifth embodiment of the present invention.

As shown in FIG. 5A and FIG. 5B, an optical image capturing system of the fifth embodiment of the present invention includes, along an optical axis from an object side to an image side, a first lens 510, a second lens 520, an aperture 500, a third lens 530, a fourth lens 540, a fifth lens 550, an infrared rays filter 570, an image plane 580, and an image sensor 590. FIG. 5C shows a modulation transformation of the optical image capturing system 50 of the fifth embodiment of the present application. FIG. 5D is a graphic, showing the relative illuminance of each field of view on the image plane of the optical image capturing system of the fifth embodiment of the present invention.

The first lens 510 has positive refractive power and is made of plastic. An object-side surface 512, which faces the object side, is a concave aspheric surface, and an image-side surface 514, which faces the image side, is a convex aspheric surface. The object-side surface 512 and the image-side surface 514 both have an inflection point.

The second lens 520 has negative refractive power and is made of plastic. An object-side surface 522 thereof, which faces the object side, is a convex aspheric surface, and an image-side surface 524 thereof, which faces the image side, is a concave aspheric surface. The image-side surface 524 has an inflection point.

The third lens 530 has positive refractive power and is made of plastic. An object-side surface 532, which faces the object side, is a convex aspheric surface, and an image-side surface 534, which faces the image side, is a convex aspheric surface. The object-side surface 532 has an inflection point.

The fourth lens 540 has positive refractive power and is made of plastic. An object-side surface 542, which faces the object side, is a concave aspheric surface, and an image-side surface 544, which faces the image side, is a convex aspheric surface. The object-side surface 542 has an inflection point, and the image-side surface 544 has two inflection points.

The fifth lens 550 has positive refractive power and is made of plastic. An object-side surface 552, which faces the object side, is a convex surface, and an image-side surface 554, which faces the image side, is a concave surface. The object-side surface 552 and the image-side surface 554 both have an inflection point. It may help to shorten the back focal length to keep small in size.

The infrared rays filter 570 is made of glass and between the fifth lens 550 and the image plane 580. The infrared rays filter 570 gives no contribution to the focal length of the system.

The parameters of the lenses of the fifth embodiment are listed in Table 9 and Table 10.

TABLE 9 f = 0.9030 mm; f/HEP = 1.7; HAF = 40.00 deg

| Surface | Radius of curvature (mm) | Thickness (mm) | Material | Refractive index | Abbe number | Focal length (mm) |
| --- | --- | --- | --- | --- | --- | --- |
| 0 | Object | 1E+18 | 600 | | | |
| 1 | 1$^{st}$ lens | −1.131646864 | 0.252 | plastic | 1.6355 | 23.891 | 8.267 |
| 2 | | −1.013441845 | 0.094 | | | | |
| 3 | 2$^{nd}$ lens | 0.986808917 | 0.231 | plastic | 1.5146 | 56.55 | −13.721 |
| 4 | | 0.797139618 | 0.099 | | | | |
| 5 | Aperture | 1E+18 | 0.050 | | | | |
| 6 | 3$^{rd}$ lens | 71.07078692 | 0.309 | plastic | 1.5839 | 29.89 | 2.290 |
| 7 | | −1.369142672 | 0.060 | | | | |
| 8 | 4$^{th}$ lens | −0.719151856 | 0.285 | plastic | 1.66099 | 20.39 | 3.159 |
| 9 | | −0.621138242 | 0.050 | | | | |
| 10 | 5$^{th}$ lens | 0.542167537 | 0.250 | plastic | 1.66099 | 20.39 | 2.985 |
| 11 | | 0.607702642 | 0.133 | | | | |
| 12 | Infrared rays filter | 1E+18 | 0.145 | BK7 | 1.517 | 64.13 | |
| 13 | | 1E+18 | 0.430 | | | | |
| 14 | Image plane | 1E+18 | 0.000 | | | | |

Reference wavelength: 555 nm; the position of blocking light: the clear aperture of the first surface is 0.700 mm; the clear aperture of the seventh surface is 0.370 mm; the clear aperture of the eleventh surface is 0.634 mm.

TABLE 10

| Coefficients of the aspheric surfaces | | | | | |
|---|---|---|---|---|---|
| | Surface | | | | |
| | 1 | 2 | 3 | 4 | 6 |
| k | −1.577805E+01 | −3.629086E+01 | 3.163522E+00 | −2.773366E+01 | −9.000000E+01 |
| A4 | 1.756886E+00 | 2.667434E+00 | 4.983611E+00 | 5.954982E+00 | 7.889556E−01 |
| A6 | −6.335507E+00 | −5.068617E+00 | −7.682746E+01 | −1.245706E−02 | −7.935082E+02 |
| A8 | 1.147805E+01 | −1.425127E+02 | 6.466928E+02 | 1.833648E+03 | 7.237678E+04 |
| A10 | 1.783111E+01 | 1.733986E+03 | −3.793202E+03 | −2.280469E+04 | −3.837723E+06 |
| A12 | −1.793278E+02 | −1.024847E+04 | 1.255143E+04 | 2.020647E+05 | 1.221827E+08 |
| A14 | 5.213151E+02 | 3.570743E+04 | −9.931236E+03 | −1.140885E+06 | −2.388795E+09 |
| A16 | −7.917778E+02 | −7.292807E+04 | −3.367059E+04 | 2.922761E+06 | 2.805844E+10 |
| A18 | 6.346599E+02 | 7.905593E+04 | 0.000000E+00 | 0.000000E+00 | −1.816487E+11 |
| A20 | −2.120885E+02 | −3.344648E+04 | 0.000000E+00 | 0.000000E+00 | 4.979272E+11 |

| | Surface | | | | |
|---|---|---|---|---|---|
| | 7 | 8 | 9 | 10 | 11 |
| k | 1.068485E+01 | 6.152743E−02 | −6.407161E+00 | −1.369983E+01 | −1.092816E+01 |
| A4 | 1.672706E+00 | 7.414467E+00 | −3.527685E+00 | 4.672355E+00 | 2.210473E+00 |
| A6 | −4.992824E+01 | −6.835214E+01 | 4.323083E+01 | −9.856946E+01 | −4.699122E+01 |
| A8 | −2.383010E+02 | 2.740242E+01 | −3.806678E+02 | 1.193184E+03 | 4.655018E+02 |
| A10 | 7.870165E+03 | 5.275082E+03 | 2.668916E+03 | −9.786811E+03 | −3.019869E+03 |
| A12 | −5.707490E+04 | −4.098092E+04 | −1.142378E+04 | 5.323972E+04 | 1.274316E+04 |
| A14 | 1.733465E+05 | 1.274569E+05 | 2.765639E+04 | −1.872901E+05 | −3.427596E+04 |
| A16 | −1.593243E+05 | −1.493878E+05 | −3.039594E+04 | 4.060209E+05 | 5.608946E+04 |
| A18 | 0.000000E+00 | 0.000000E+00 | 0.000000E+00 | −4.892196E+05 | −5.030931E+04 |
| A20 | 0.000000E+00 | 0.000000E+00 | 0.000000E+00 | 2.488401E+05 | 1.872285E+04 |

An equation of the aspheric surfaces of the fifth embodiment is the same as that of the first embodiment, and the definitions are the same as well.

The exact parameters of the fifth embodiment based on Table 9 and Table 10 are listed in the following table:

| Fifth embodiment (Reference wavelength: 555 nm) | | | | | |
|---|---|---|---|---|---|
| ETP1 | ETP2 | ETP3 | ETP4 | ETP5 | BL |
| 0.258 | 0.220 | 0.301 | 0.261 | 0.245 | 0.6626 |
| ETP1/TP1 | ETP2/TP2 | ETP3/TP3 | ETP4/TP4 | ETP5/TP5 | EBL/BL |
| 1.022 | 0.955 | 0.972 | 0.916 | 0.982 | 0.9991 |
| ETL | EBL | EIN | EIR | PIR | EIN/ETL |
| 2.409 | 0.662 | 1.747 | 0.087 | 0.133 | 0.725 |
| SETP/EIN | EIR/PIR | SETP | STP | SETP/STP | SED/SIN |
| 0.736 | 0.654 | 1.285 | 1.327 | 0.968 | 1.306 |
| ED12 | ED23 | ED34 | ED45 | SED | SIN |
| 0.157 | 0.081 | 0.066 | 0.158 | 0.462 | 0.354 |
| ED12/IN12 | ED23/IN23 | ED34/IN34 | ED45/IN45 | | |
| 1.678 | 0.543 | 1.087 | 3.151 | | |
| $|f/f1|$ | $|f/f2|$ | $|f/f3|$ | $|f/f4|$ | $|f/f5|$ | $|f1/f2|$ |
| 0.10924 | 0.06581 | 0.39428 | 0.28582 | 0.30248 | 0.60247 |
| ΣPPR | ΣNPR | ΣPPR/|ΣNPR| | IN12/f | IN45/f | $|f2/f3|$ |
| 0.6541 | 0.5035 | 1.2991 | 0.1038 | 0.0554 | 5.9909 |
| TP3/(IN23 + TP3 + IN34) | | (TP1 + IN12)/TP2 | | (TP5 + IN45)/TP4 | |
| 0.59585 | | 1.49861 | | 1.05224 | |

-continued

| Fifth embodiment (Reference wavelength: 555 nm) | | | | | |
|---|---|---|---|---|---|
| HOS | InTL | HOS/HOI | InS/HOS | ODT % | TDT % |
| 2.34365 | 1.68110 | 2.85116 | 0.71138 | 4.30919 | 3.26731 |
| HVT11 | HVT12 | HVT21 | HVT22 | HVT31 | HVT32 |
| 0.40705 | 0.290264 | 0 | 0 | 0.049907 | 0 |
| HVT41 | HVT42 | HVT51 | HVT52 | HVT52/HOI | HVT52/HOS |
| 0.40461 | 0.00000 | 0.49365 | 0.49323 | 0.60054 | 0.21063 |
| TP2/TP3 | TP3/TP4 | InRS51 | InRS52 | \|InRS51\|/TP5 | \|InRS52\|/TP5 |
| 0.74639 | 1.08542 | 0.0858426 | 0.0589371 | 0.34349 | 0.23583 |
| PhiA11 | PhiA12 | PhiA5 | PhiB | PhiC | PhiD |
| 1.4 mm | 1.10 mm | 1.268 mm | 2.3398 mm | 2.5398 mm | 2.7398 mm |
| PhiA5/InTL | PhiA5/2HOI | PhiA11/2HOI | SFR (PhiA11/PhiA5) | RI9 | |
| 0.7543 | 0.7713 | 0.8516 | 1.1041 | 15% | |
| MTFE0 | MTFE3 | MTFE7 | MTFQ0 | MTFQ3 | MTFQ7 |
| 0.82 | 0.69 | 0.44 | 0.59 | 0.35 | 0.09 |

The results of the equations of the fifth embodiment based on Table 9 and Table 10 are listed in the following table:

| Values related to the inflection points of the fifth embodiment (Reference wavelength: 555 nm) | | | | | | | |
|---|---|---|---|---|---|---|---|
| HIF111 | 0.1866 | HIF111/HOI | 0.2271 | SGI111 | −0.0122 | \|SGI111\|/(\|SGI111\| + TP1) | 0.0462 |
| HIF121 | 0.1327 | HIF121/HOI | 0.1614 | SGI121 | −0.0069 | \|SGI121\|/(\|SGI121\| + TP1) | 0.0265 |
| HIF211 | 0.2290 | HIF211/HOI | 0.2786 | SGI211 | 0.0299 | \|SGI211\|/(\|SGI211\| + TP2) | 0.1148 |
| HIF311 | 0.0335 | HIF311/HOI | 0.0407 | SGI311 | 0.0000 | \|SGI311\|/(\|SGI311\| + TP3) | 0.0000 |
| HIF411 | 0.2824 | HIF411/HOI | 0.3436 | SGI411 | −0.0355 | \|SGI411\|/(\|SGI411\| + TP4) | 0.1107 |
| HIF421 | 0.3064 | HIF421/HOI | 0.3727 | SGI421 | −0.0716 | \|SGI421\|/(\|SGI421\| + TP4) | 0.2007 |
| HIF422 | 0.4715 | HIF422/HOI | 0.5736 | SGI422 | −0.1163 | \|SGI422\|/(\|SGI422\| + TP4) | 0.2898 |
| HIF511 | 0.2596 | HIF511/HOI | 0.3158 | SGI511 | 0.0478 | \|SGI511\|/(\|SGI511\| + TP5) | 0.1604 |
| HIF521 | 0.2525 | HIF521/HOI | 0.3072 | SGI521 | 0.0417 | \|SGI521\|/(\|SGI521\| + TP5) | 0.1429 |

Sixth Embodiment

Figure 6A:
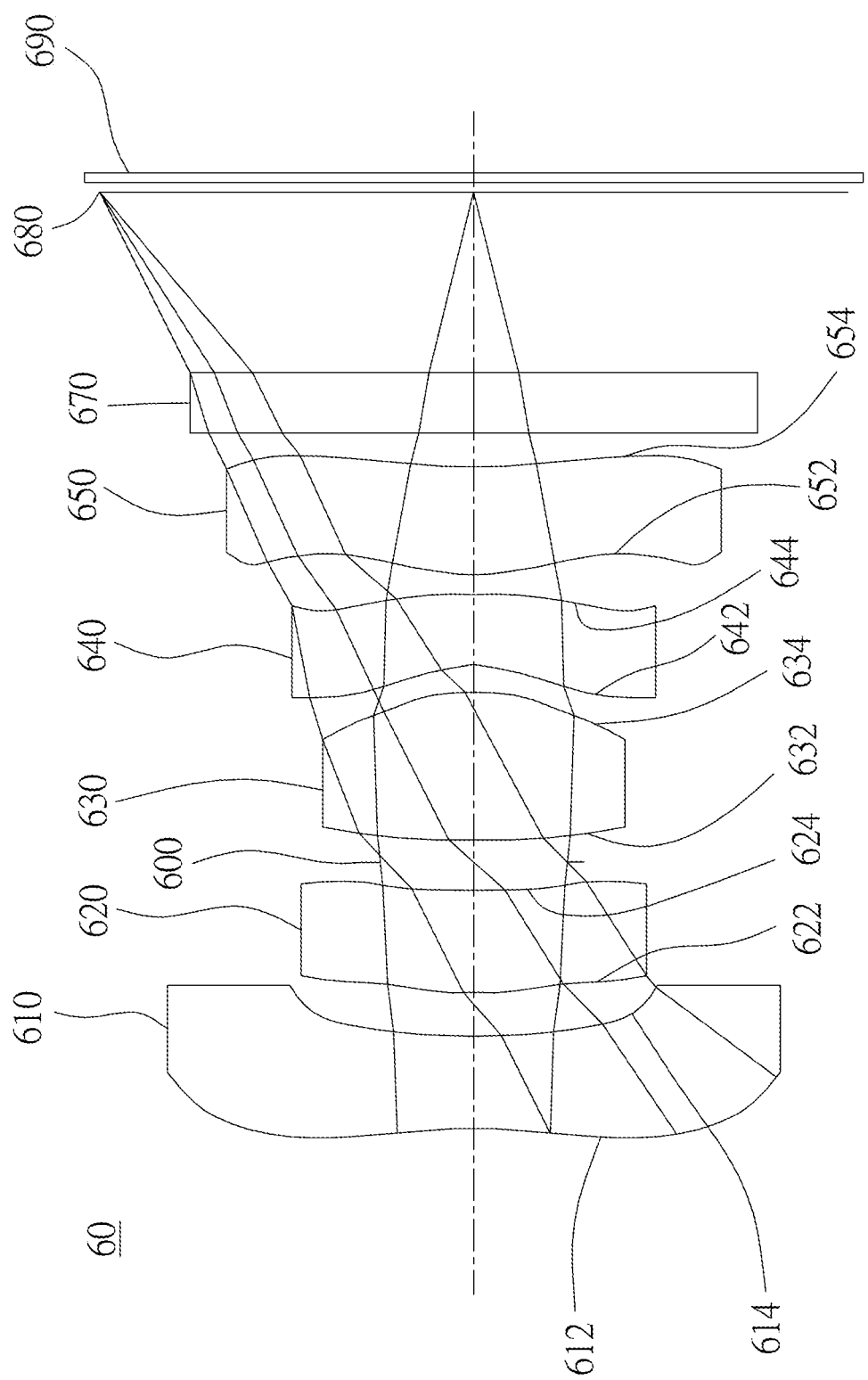
FIG. 6A is a schematic diagram of a sixth embodiment of the present invention.
Figure 6B:
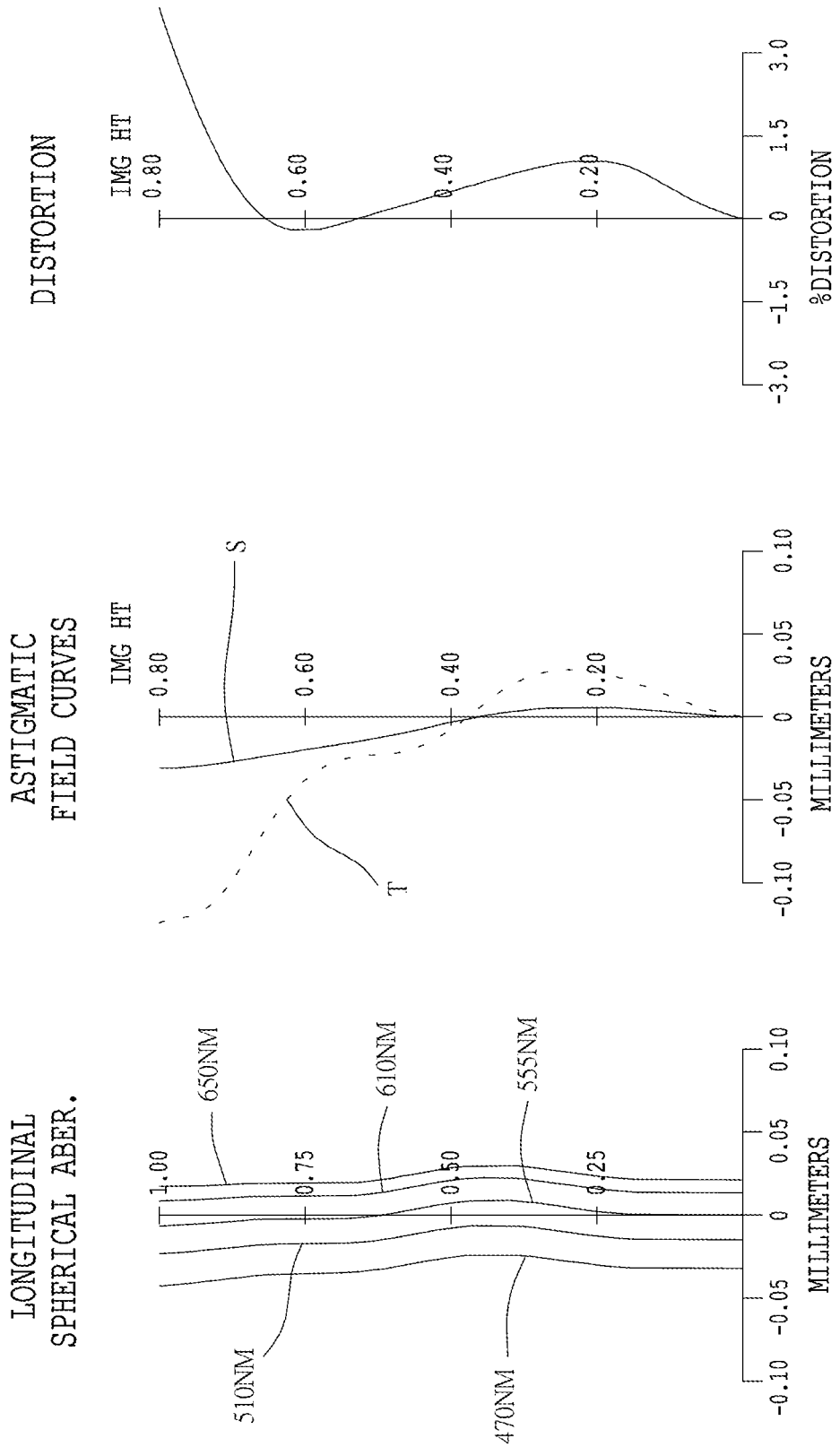
FIG. 6B shows curve diagrams of longitudinal spherical aberration, astigmatic field, and optical distortion of the optical image capturing system in the order from left to right of the sixth embodiment of the present application.
Figure 6:
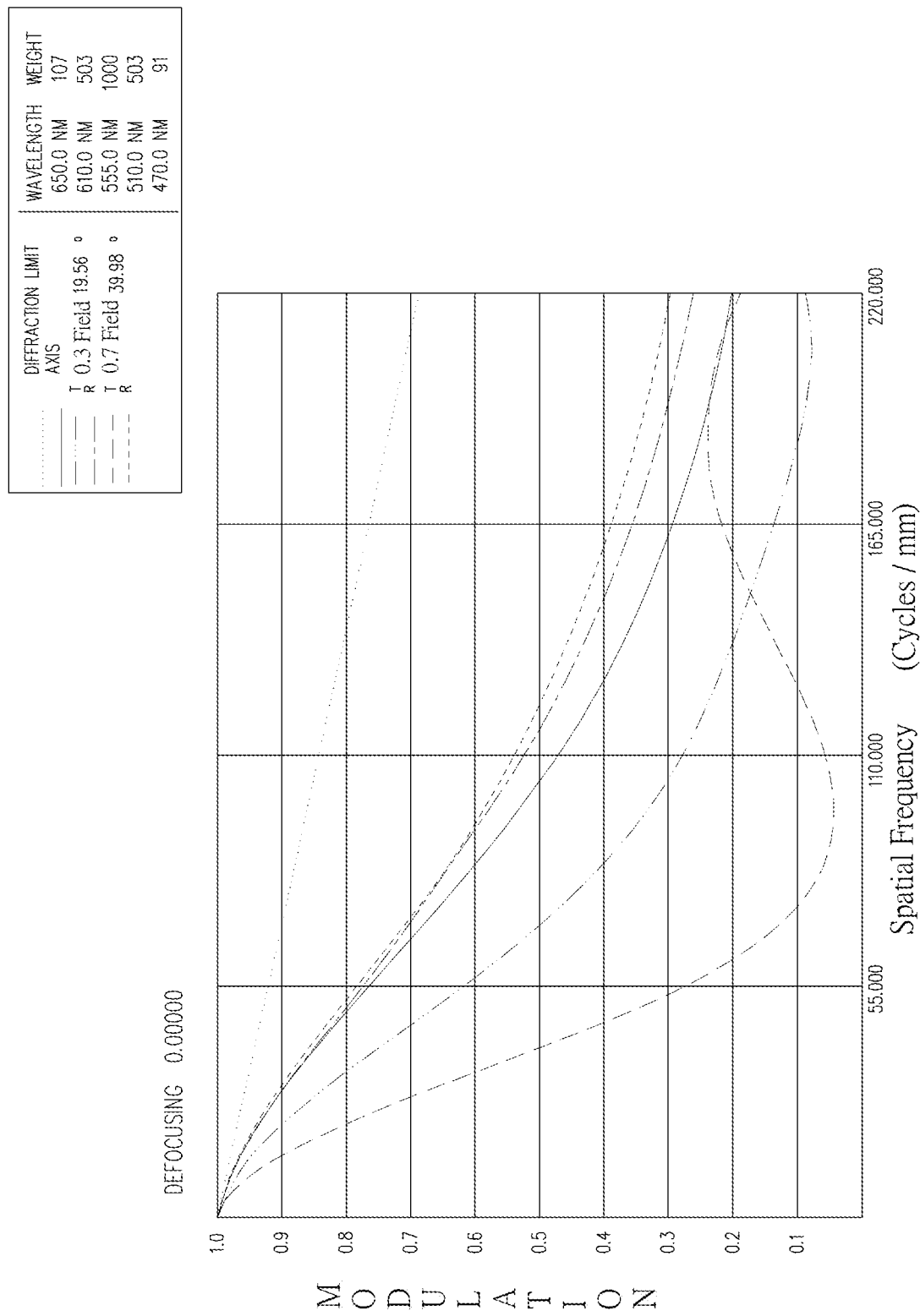
FIG. 6C shows a feature map of modulation transformation of the optical image capturing system of the sixth embodiment of the present application in visible spectrum.
FIG. 6D is a graphic, shoe g the relative illuminance of each field of view on the image plane of the optical image capturing system of the sixth embodiment of the present invention.
Figure 6D:
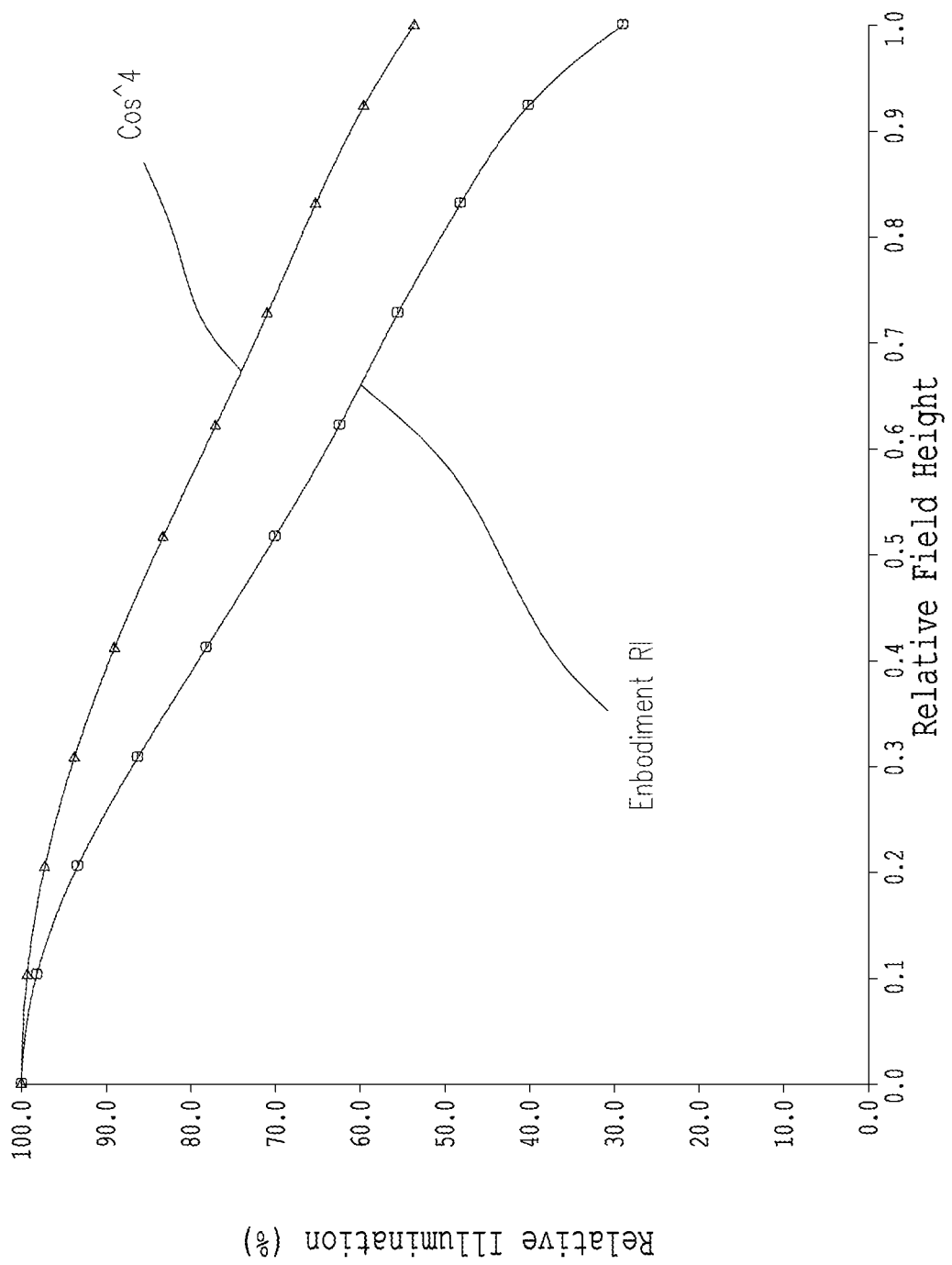

As shown in FIG. 6A and FIG. 6B, an optical image capturing system of the sixth embodiment of the present invention includes, along an optical axis from an object side to an image side, a first lens 610, a second lens 620, an aperture 600, a third lens 630, a fourth lens 640, a fifth lens 650, an infrared rays filter 670, an image plane 680, and are image sensor 690. FIG. 6C shows a modulation transformation of the optical image capturing system 60 of the sixth embodiment of the present application. FIG. 6D is a graphic, showing the relative illuminance of each field of view on the image plane of the optical image capturing system of the sixth embodiment of the present invention.

The first lens 610 has negative refractive power and is made of plastic. An object-side surface 612, which faces the object side, is a concave aspheric surface, and an image-side surface 614, which faces the image side, is a concave aspheric surface. The object-side surface 612 has an inflection point.

The second lens 620 has positive refractive power and is made of plastic. An object-side surface 622 thereof, which laces the object side, is a convex aspheric surface, and an image-side surface 624 thereof, which faces the image side, is a concave aspheric surface. The object-side surface 622 has two inflection points.

The third lens 630 has positive refractive power and is made of plastic. An object-side surface 632, which faces the object side, is a convex aspheric surface, and an image-side surface 634, which faces the image side, is a convex aspheric surface. The image-side surface 634 has an inflection point.

The fourth lens 640 has negative refractive power and is made of plastic. An object-side surface 642, which faces the object side, is a concave aspheric surface, and an image-side surface 644, which faces the image side, is a convex aspheric surface. The object-side surface 642 has two inflection points, and the image-side surface 644 has an inflection point.

The fifth lens 650 has positive refractive power and is made of plastic. An object-side surface 652, which faces the object side, is a convex surface, and an image-side surface 654, which faces the image side, is a concave surface. The object-side surface 652 has two inflection points, and the image-side surface 654 has an inflection point. It may help to shorten the back focal length to keep small site. In addition, it may reduce an incident angle of the light of an off-axis field of view and correct the aberration of the off-axis field of view.

The infrared rays filter 670 is made of glass and between the fifth lens 650 and the image plane 680. The infrared rays filter 670 gives no contribution to the focal length of the system.

The parameters of the lenses of the sixth embodiment are listed in Table 11 and Table 12.

TABLE 11 f = 0.6918 mm; f/HEP = 2.0; HAF = 47.500 deg

| Surface | Radius of curvature (mm) | | Thickness (mm) | Material | Refractive index | Abbe number | Focal length (mm) |
|---|---|---|---|---|---|---|---|
| 0 | Object | 1E+18 | 600 | | | | |
| 1 | 1$^{st}$ lens | −1.128860126 | 0.220 | plastic | 1.5839 | 23.891 | −1.096 |
| 2 | | 1.606981004 | 0.104 | | | | |
| 3 | 2$^{nd}$ lens | 0.671843727 | 0.244 | plastic | 1.5146 | 56.55 | 2.323 |
| 4 | | 1.338611087 | 0.067 | | | | |
| 5 | Aperture | 1E+18 | 0.050 | | | | |
| 6 | 3$^{rd}$ lens | 1.509129428 | 0.352 | plastic | 1.66099 | 20.39 | 0.501 |
| 7 | | −0.389344554 | 0.059 | | | | |
| 8 | 4$^{th}$ lens | −0.320037013 | 0.171 | plastic | 1.6425 | 22.465 | −0.571 |
| 9 | | −2.871080383 | 0.050 | | | | |
| 10 | 5$^{th}$ lens | 0.444093934 | 0.254 | plastic | 1.66099 | 20.39 | 0.874 |
| 11 | | 1.438642308 | 0.079 | | | | |
| 12 | Infrared rays filter | 1E+18 | 0.145 | BK_7 | 1.517 | 64.13 | |
| 13 | | 1E+18 | 0.430 | | | | |
| 14 | Image plane | 1E+18 | 0.000 | | | | |

Reference wavelength: 555 nm; the position of blocking light: the clear aperture of the first surface is 0.674 mm; the clear aperture of the ninth surface is 0.400 mm.

TABLE 12

Coefficients of the aspheric surfaces

| | Surface | | | | |
|---|---|---|---|---|---|
| | 1 | 2 | 3 | 4 | 6 |
| k | −7.403029E+01 | −3.579684E+01 | −4.788203E+01 | −2.770913E+01 | −8.982795E+01 |
| A4 | −8.003735E−02 | 4.043827E+00 | 9.963923E+00 | −2.087989E+00 | 5.673536E+00 |
| A6 | 1.890234E+01 | −8.290397E+01 | −3.919623E+02 | −4.656991E+01 | −8.691753E+02 |
| A8 | −1.933126E+02 | 1.902569E+03 | 7.053716E+03 | 4.669959E+03 | 7.705775E+04 |
| A10 | 1.135382E+03 | −3.016771E+04 | −7.848286E+04 | −1.905944E+05 | −3.976052E+06 |
| A12 | −4.138854E+03 | 2.882763E+05 | 5.430108E+05 | 4.412921E+06 | 1.246772E+08 |
| A14 | 9.527385E+03 | −1.456410E+06 | −2.077734E+06 | −5.096217E+07 | −2.412104E+09 |
| A16 | −1.340775E+04 | 3.021450E+06 | 3.312005E+06 | 2.294414E+08 | 2.814747E+10 |
| A18 | 1.054749E+04 | 7.905593E+04 | 0.000000E+00 | 0.000000E+00 | −.816487E+11 |
| A20 | −3.538088E+03 | −3.344648E+04 | 0.000000E+00 | 0.000000E+00 | 4.979272E+11 |

| | Surface | | | | |
|---|---|---|---|---|---|
| | 7 | 8 | 9 | 10 | 11 |
| k | −5.825106E+00 | −4.315085E+00 | −1.292159E+01 | −1.005665E+01 | −1.110766E+01 |
| A4 | −5.700904E+00 | 1.224275E+00 | −9.099750E+00 | −5.123700E−01 | 1.613057E+00 |
| A6 | 9.608276E+01 | 2.432317E+01 | 1.595357E+02 | −4.762587E+01 | −4.514594E+01 |
| A8 | −1.465108E+03 | 8.657915E+01 | −1.683136E+03 | 8.338114E+02 | 4.433599E+02 |
| A10 | 2.211483E+04 | −7.741109E+02 | 1.267144E+04 | −9.085982E+03 | −2.956217E+03 |
| A12 | −2.315804E+05 | −2.644728E+04 | −5.486986E+04 | 5.884864E+04 | 1.296384E+04 |
| A14 | 1.288438E+06 | 2.713011E+05 | 1.171353E+05 | −2.192950E+05 | −3.555790E+04 |

TABLE 12-continued

Coefficients of the aspheric surfaces

| | | | | | |
|---|---|---|---|---|---|
| A16 | −2.776099E+06 | −7.557494E+05 | −9.495795E+04 | 4.546191E+05 | 5.772082E+04 |
| A18 | 0.000000E+00 | 0.000000E+00 | 0.000000E+00 | −4.892196E+05 | −5.030931E+04 |
| A20 | 0.000000E+00 | 0.000000E+00 | 0.000000E+00 | 2.488401E+05 | 1.872285E+04 |

An equation of the aspheric surfaces of the sixth embodiment is the same as that of the first embodiment, and the definitions are the same as well.

The exact parameters of the sixth embodiment based on Table 11 and Table 12 are listed in the following table:

| Sixth embodiment (Reference wavelength: 555 nm) | | | | | |
|---|---|---|---|---|---|
| FTP1 | ETP2 | ETP3 | ETP4 | ETP5 | BL |
| 0.243 | 0.234 | 0.301 | 0.201 | 0.238 | 0.6038 |
| ETP1/TP1 | ETP2/TP2 | ETP3/TP3 | ETP4/TP4 | ETP5/TP5 | EBL/BL |
| 1.107 | 0.960 | 0.857 | 1.171 | 0.937 | 1.0633 |
| ETL | EBL | EIN | EIR | PIR | EIN/ETL |
| 2.236 | 0.642 | 1.594 | 0.067 | 0.079 | 0.713 |
| SETP/EIN | EIR/PIR | SETP | STP | SETP/STP | SED/SIN |
| 0.764 | 0.847 | 1.218 | 1.241 | 0.981 | 1.139 |
| ED12 | ED23 | ED34 | ED45 | SED | SIN |
| 0.110 | 0.118 | 0.058 | 0.090 | 0.376 | 0.330 |
| ED12/IN12 | ED23/IN23 | ED34/IN34 | ED45/IN45 | | |
| 1.061 | 1.005 | 0.982 | 1.800 | | |
| \|f/f1\| | \|f/f2\| | \|f/f3\| | \|f/f4\| | \|f/f5\| | \|f1/f2\| |
| 0.63109 | 0.29776 | 1.38002 | 1.21101 | 0.79154 | 0.47181 |
| ΣPPR | ΣNPR | ΣPPR/\|ΣNPR\| | IN12/f | IN45/f | \|f2/f3\| |
| 2.4693 | 1.8421 | 1.3405 | 0.1500 | 0.0723 | 4.6347 |
| TP3/(IN23 + TP3 + IN34) | | (TP1 + IN12)/TP2 | | (TP5 + IN45)/TP4 | |
| 0.66594 | | 1.32764 | | 1.77687 | |
| HOS | InTL | HOS/HOI | InS/HOS | ODT % | TDT % |
| 2.17499 | 1.57122 | 2.64597 | 0.70798 | 3.55764 | 3.77388 |
| HVT11 | HVT12 | HVT21 | HVT22 | HVT31 | HVT32 |
| 0.32763 | 0 | 0 | 0 | 0 | 0 |
| HVT41 | HVT42 | HVT51 | HVT52 | HVT52/HOI | HVT52/HOS |
| 0.35262 | 0.34074 | 0.32952 | 0.36828 | 0.40088 | 0.15150 |
| TP2/TP3 | TP3/TP4 | InRS51 | InRS52 | \|InRS51\|/TP5 | \|InRS52\|/TP5 |
| 0.69380 | 2.05183 | 0.0283731 | −0.003577 | 0.11153 | 0.01406 |
| PhiA11 | PhiA12 | PhiA5 | PhiB | PhiC | PhiD |
| 1.348 mm | 0.810 mm | 1.116 mm | 2.3398 mm | 2.5398 mm | 2.7398 mm |
| PhiA5/InTL | PhiA5/2HOI | PhiA11/2HOI | SFR (PhiA11/PhiA5) | RI9 | |
| 0.7103 | 0.6788 | 0.8199 | 1.2079 | 30% | |

-continued

| Sixth embodiment (Reference wavelength: 555 nm) | | | | | |
|---|---|---|---|---|---|
| MTFE0 | MTFE3 | MTFE7 | MTFQ0 | MTFQ3 | MTFQ7 |
| 0.77 | 0.62 | 0.28 | 0.47 | 0.28 | 0.05 |

The results of the equations of embodiment based on Table 11 and Table 12 are listed in the following table:

| Values related to the inflection points of the sixth embodiment (Reference wavelength: 555 nm) | | | | | | | |
|---|---|---|---|---|---|---|---|
| HIF111 | 0.1638 | HIF111/HOI | 0.1992 | SGI111 | −0.0089 | \|SGI111\|/(\|SGI111\| + TP1) | 0.0391 |
| HIF211 | 0.1519 | HIF211/HOI | 0.1849 | SGI211 | 0.0141 | \|SGI211\|/(\|SGI211\| + TP2) | 0.0548 |
| HIF212 | 0.2910 | HIF212/HOI | 0.3540 | SGI212 | 0.0290 | \|SGI212\|/(\|SGI212\| + TP2) | 0.1064 |
| HIF321 | 0.3029 | HIF321/HOI | 0.3685 | SGI321 | −0.0945 | \|SGI321\|/(\|SGI321\| + TP3) | 0.2118 |
| HIF411 | 0.1735 | HIF411/HOI | 0.2111 | SGI411 | −0.0373 | \|SGI411\|/(\|SGI411\| + TP4) | 0.1788 |
| HIF412 | 0.3586 | HIF412/HOI | 0.4362 | SGI412 | −0.0727 | \|SGI412\|/(\|SGI412\| + TP4) | 0.2980 |
| HIF421 | 0.2416 | HIF421/HOI | 0.2939 | SGI421 | −0.0221 | \|SGI421\|/(\|SGI421\| + TP4) | 0.1142 |
| HIF511 | 0.1672 | HIF511/HOI | 0.2034 | SGI511 | 0.0240 | \|SGI511\|/(\|SGI511\| + TP5) | 0.0862 |
| HIF512 | 0.4468 | HIF512/HOI | 0.5435 | SGI512 | 0.0308 | \|SGI512\|/(\|SGI512\| + TP5) | 0.1080 |
| HIF521 | 0.2204 | HIF521/HOI | 0.2682 | SGI521 | 0.0164 | \|SGI521\|/(\|SGI521\| + TP5) | 0.0607 |

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, in order along an optical axis from an object side to an image side, comprising:
a first lens having refractive power;
a second lens having refractive power;
a third lens having positive refractive power;
a fourth lens having refractive power;
a fifth lens having refractive power; and
an image plane;
wherein the optical image capturing system consists of the five lenses with refractive power; at least three lenses among the first to the fifth lenses has positive refractive power; each lens among the first lens to the fifth lens has an object-side surface, which faces the object side, and an image-side surface, which faces the image side; the object-side surface of the second lens is a convex surface, and the image-side surface of the second lens is a concave surface; the image-side surface of the fourth lens is a convex surface; the image-side surface of the fifth lens is a concave surface;
wherein the optical image capturing system further comprises an aperture disposed before the object-side surface of the third lens;
wherein the optical image capturing system satisfies:

$1.0 \leq f/HEP \leq 10$;

$0.5 \leq HOS/f \leq 30$;

$0 < PhiA5/InTL \leq 1.6$; and $0.5 \leq SETP/STP < 1$;

wherein f is a focal length of the optical image capturing system; HEP is an entrance pupil diameter of the optical image capturing system; HOS is a distance in parallel with the optical axis between the object-side surface of the first lens and the image plane; InTL is a distance in parallel with the optical axis from the object-side surface of the first lens to the image-side surface of the fifth lens; PhiA5 is a maximum effective diameter of the image-side surface of the fifth lens; ½ HEP is equal to a value smaller than or equal to a minimum of a maximum effective half diameter of any surface among the first to the fifth lens, where ETP1, ETP2, ETP3, ETP4, and ETP5 are respectively a thickness at the height of ½ HEP of the first lens, the second lens, the third lens, the fourth lens, and the fifth lens, wherein the maximum effective half diameter is a perpendicular distance between the optical axis and a crossing point on the corresponding surface where an incident light with a maximum viewing angle of the optical image capturing system passing a very edge of an entrance pupil of the optical image capturing system; SETP is a sum of the aforementioned ETP1 to ETP5; TP1, TP2, TP3, TP4, and TP5 are respectively a thickness of the first lens, the second lens, the third lens, the fourth lens, and the fifth lens on the optical axis; STP is a sum of the aforementioned TP1 to TP5.

2. The optical image capturing system of claim 1, wherein the optical image capturing system further satisfies:

$0 \text{ deg} < HAF \leq 100 \text{ deg}$;

where HAF is a half of a maximum view angle of the optical image capturing system.

3. The optical image capturing system of claim 1, wherein the optical image capturing system further satisfies:

$0 < PhiA5/2HOI \leq 1.5$;

wherein HOI is a maximum height for image formation perpendicular to the optical axis on the image plane.

4. The optical image capturing system of claim 1, wherein the optical image capturing system further satisfies:

$0 < PhiA11/2HOI \leq 1.5$;

wherein PhiA11 is a maximum effective diameter of the object-side surface of the first lens; HOI is a maximum height for image formation perpendicular to the optical axis on the image plane.

5. The optical image capturing system of claim 4, wherein the optical image capturing system further satisfies:

$0 < PhiA11/PhiA5 \leq 1.5$.

6. The optical image capturing system of claim 1, wherein the optical image capturing system further satisfies:

$$0.2 \leq EIN/ETL \leq 1;$$

where ETL is a distance in parallel with the optical axis between a coordinate point at a height of ½ HEP on the object-side surface of the first lens and the image plane; EIN is a distance in parallel with the optical axis between the coordinate point at the height of ½ HEP on the object-side surface of the first lens and a coordinate point at a height of ½ HEP on the image-side surface of the fourth lens.

7. The optical image capturing system of claim 1, wherein the optical image capturing system further satisfies:

$$0.2 \leq SETP/EIN \leq 1.$$

8. The optical image capturing system of claim 1, wherein the optical image capturing system further satisfies:

$$MTFE0 \geq 0.2;$$

$$MTFE3 \geq 0.01;\ \text{and}$$

$$MTFE7 \geq 0.01;$$

wherein MTFE0, MTFE3, and MTFE7 are respectively a value of modulation transfer function in a spatial frequency of 55 cycles/mm at the optical axis, 0.3 HOI, and 0.7 HOI on the image plane; HOT is a maximum height for image formation perpendicular to the optical axis on the image plane.

9. The optical image capturing system of claim 1, wherein the optical image capturing system further satisfies:

$$0.2 \leq InS/HOS \leq 1.1;$$

where InS is a distance between the aperture and the image plane on the optical axis.

10. An optical image capturing system, in order along an optical axis from an object side to an image side, comprising:
 a first lens having refractive power;
 a second lens having refractive power;
 a third lens having positive refractive power;
 a fourth lens having refractive power;
 a fifth lens having refractive power;
 an image plane; and
 a first lens positioning member, which includes a lens holder, wherein the lens holder is hollow and opaque; the lens holder has a barrel portion and a base portion which are connected to each other, wherein the barrel portion is adapted to receive the first to the fifth lenses, and the base portion is located between the fifth lens and the image plane; an outer peripheral edge of the base portion is greater than an outer peripheral edge of the barrel portion;
 wherein the optical image capturing system consists of the five lenses with refractive power; at least a surface of at least one lens among the first lens to the fifth lens has at least an inflection point; each lens among the first lens to the fifth lens has an object-side surface, which faces the object side, and an image-side surface, which faces the image side; the object-side surface of the second lens is a convex surface, and the image-side surface of the second lens is a concave surface; the image-side surface of the fourth lens is a convex surface; the image-side surface of the fifth lens is a concave surface;
 wherein the optical image capturing system further comprises an aperture disposed before the object-side surface of the third lens;
 wherein the optical image capturing system satisfies:

$$1.0 \leq f/HEP \leq 10;$$

$$0.5 \leq HOS/f \leq 30;$$

$$0\ \text{mm} < PhiD \leq 16\ \text{mm};\ \text{and}$$

$$0.2 \leq EIN/ETL < 1;$$

wherein f is a focal length of the optical image capturing system; PhiD is a maximum length of a shortest edge of a plane of the base portion perpendicular to the optical axis; HEP is an entrance pupil diameter of the optical image capturing system; HOS is a distance between the object-side surface of the first lens and the image plane on the optical axis; ½ HEP is equal to a value smaller than or equal to a minimum of a maximum effective half diameter of any surface among the first to the fifth lens, where ETL is a distance in parallel with the optical axis between a coordinate point at a height of ½ HEP on the object-side surface of the first lens and the image plane, wherein the maximum effective half diameter is a perpendicular distance between the optical axis and a crossing point on the corresponding surface where an incident light with a maximum viewing angle of the optical image capturing system passing a very edge of an entrance pupil of the optical image capturing system; EIN is a distance in parallel with the optical axis between the coordinate point at the height of ½ HEP on the object-side surface of the first lens and a coordinate point at a height of ½ HEP on the image-side surface of the fifth lens.

11. The optical image capturing system of claim 10, wherein the optical image capturing system further satisfies:

$$0 < PhiA5/InTL \leq 1.6;$$

wherein PhiA5 is a maximum effective diameter of the image-side surface of the fifth lens; InTL is a distance in parallel with the optical axis from the object-side surface of the first lens to the image-side surface of the fifth lens.

12. The optical image capturing system of claim 10, wherein the optical image capturing system further satisfies:

$$0\ \text{deg} < HAF \leq 100\ \text{deg};$$

where HAF is a half of a maximum view angle of the optical image capturing system.

13. The optical image capturing system of claim 10, wherein the optical image capturing system further satisfies:

$$0 < PhiA5/2HOI \leq 1.5;$$

wherein PhiA5 is a maximum effective diameter of the image-side surface of the fifth lens; HOI is a maximum height for image formation perpendicular to the optical axis on the image plane.

14. The optical image capturing system of claim 10, wherein the optical image capturing system further satisfies:

$$0 < PhiA11/2HOI \leq 1.5;$$

wherein PhiA11 is a maximum effective diameter of the object-side surface of the first lens; HOI is a maximum height for image formation perpendicular to the optical axis on the image plane.

15. The optical image capturing system of claim 14, wherein the optical image capturing system further satisfies:

$0 < PhiA\text{-}11/PhiA5 \le 1.5;$ wherein PhiA5 is a maximum effective diameter of the image-side surface of the fifth lens.

16. The optical image capturing system of claim 10, wherein the optical image capturing system further satisfies:

$0.2 \le EBL/BL \le 1.1;$ where EBL is a horizontal distance in parallel with the optical axis between a coordinate point at the height of ½ HEP on the image-side surface of the fifth lens and image surface; BL is a horizontal distance in parallel with the optical axis between the point on the image-side surface of the fifth lens where the optical axis passes through and the image plane.

17. The optical image capturing system of claim 10, further comprises a light filter located between the fifth lens and the image plane, wherein the optical image capturing system satisfies:

$0.1 \le EIR/PIR < 1;$ where EIR is a distance in parallel with the optical axis between a coordinate point at the height of ½ HEP on the image-side surface of the fifth lens and the light filter; PIR is a distance in parallel with the optical axis between the point on the image-side surface of the fifth lens where the optical axis passes through and the light filter.

18. The optical image capturing system of claim 10, wherein the optical image capturing system further satisfies:

$MTFQ0 \ge 0.2;$ $MTFQ3 \ge 0.01;$ and $MTFQ7 \ge 0.01;$ where HOI is a maximum height for image formation perpendicular to the optical axis on the image plane; MTFQ0, MTFQ3, and MTFQ7 are respectively values of modulation transfer function in a spatial frequency of 110 cycles/mm at the optical axis, 0.3 HOI, and 0.7 HOI on an image plane.

19. The optical image capturing system of claim 10, wherein at least one lens among the first lens to the fifth lens is a light filter, which is capable of filtering out light of wavelengths shorter than 500 nm.

20. An optical image capturing system, in order along an optical axis from an object side to an image side, comprising:
a first lens having refractive power;
a second lens having refractive power;
a third lens having positive refractive power;
a fourth lens having refractive power;
a fifth lens having refractive power;
an image plane;
a first lens positioning member, which includes a lens holder, wherein the lens holder is hollow and opaque; the lens holder has a barrel portion and a base portion which are connected to each other, wherein the barrel portion is adapted to receive the first to the fifth lenses, and the base portion is located between the fifth lens and the image plane; an outer peripheral edge of the base portion is greater than an outer peripheral edge of the barrel portion; and
a second lens positioning member, which is provided in the lens holder, and includes a positioning portion and a connecting portion; the positioning portion is hollow, and is adapted to directly contact with any one of the lenses to accommodate it, so that the first to the fifth lenses are arranged on the optical axis; the connecting portion is provided at an outside of the positioning portion to directly contact with an inner peripheral edge of the barrel portion;
wherein the optical image capturing system consists of the five lenses having refractive power; at least a surface of at least one lens among the first lens to the fifth lens has at least an inflection point thereon; each lens among the first lens to the fifth lens has an object-side surface, which faces the object side, and an image-side surface, which faces the image side; the object-side surface of the second lens is a convex surface, and the image-side surface of the second lens is a concave surface; the image-side surface of the fourth lens is a convex surface; the image-side surface of the fifth lens is a concave surface;
wherein the optical image capturing system further comprises an aperture disposed before the object-side surface of the third lens;
wherein the optical image capturing system satisfies:

$1.0 \le f/HEP \le 10;$ $0.5 \le HOS/f \le 30;$ $0 < PhiA5/InTL \le 1.6;$ $PhiC < PhiD;$ $0 \text{ mm} < PhiD \le 16 \text{ mm};$ and $0.2 \le EIN/ETL < 1;$ wherein f is a focal length of the optical image capturing system; PhiC is a maximum outer diameter on a plane of the connecting portion perpendicular to the optical axis; PhiD is a maximum length of a shortest edge of a plane of the base portion perpendicular to the optical axis; HEP is an entrance pupil diameter of the optical image capturing system; HOS is a distance between the object-side surface of the first lens and the image plane on the optical axis; InTL is a distance in parallel with the optical axis from the object-side surface of the first lens to the image-side surface of the fifth lens; PhiA5 is a maximum effective diameter of the image-side surface of the fifth lens; ½ HEP is equal to a value smaller than or equal to a minimum of a maximum effective half diameter of any surface among the first to the fifth lens, where ETL is a distance in parallel with the optical axis between a coordinate point at a height of ½ HEP on the object-side surface of the first lens and the image plane, wherein the maximum effective half diameter is a perpendicular distance between the optical axis and a crossing point on the corresponding surface where an incident light with a maximum viewing angle of the optical image capturing system passing a very edge of an entrance pupil of the optical image capturing system; FIN is a distance in parallel with the optical axis between the coordinate point at the height of ½ HEP on the object-side surface of the first lens and a coordinate point at a height of ½ HEP on the image-side surface of the fifth lens.

21. The optical image capturing system of claim 20, wherein the optical image capturing system further satisfies:

$0 \text{ deg} < HAF \le 100 \text{ deg};$ where HAF is a half of a maximum view angle of the optical image capturing system.

22. The optical image capturing system of claim 20, wherein the optical image capturing system further satisfies:

$$0 < PhiA5/2HOI \leq 1.5;$$

wherein HOI is a maximum height for image formation perpendicular to the optical axis on the image plane.

23. The optical image capturing system of claim 20, wherein the optical image capturing system further satisfies:

$$0 < PhiA11/2HOI \leq 1.5;$$

wherein PhiA11 is a maximum effective diameter of the object-side surface of the first lens; HOI is a maximum height for image formation perpendicular to the optical axis on the image plane.

24. The optical image capturing system of claim 23, wherein the optical image capturing system further satisfies:

$$0 < PhiA11/PhiA5 \leq 1.5.$$

25. The optical image capturing system of claim 20, further comprising an image sensor and a driving module, wherein the image sensor is disposed on the image plane; the driving module is coupled with the lenses to move the lenses; the optical image capturing system further satisfies:

$$0.2 \leq InS/HOS \leq 1.1;$$

where InS is a distance between the aperture and the image plane on the optical axis.

* * * * *